US012779758B2

(12) United States Patent
Kern et al.

(10) Patent No.: US 12,779,758 B2

(45) Date of Patent: Nov. 3, 2026

(54) INDUSTRIAL EXTRUDER, PROCESS AND METHOD THEREOF

(71) Applicant: Bühler AG, Uzwil (CH)

(72) Inventors: Christian Kern, Stuttgart (DE); Jerôme Oesch, Wil (CH); Yi Chen, Wil (CH); Richard Vonlanthen, Winterthur (CH); Christoph Schill, Steckborn (CH); William Robert Mitchell, Zürich (CH); Roman Kleiber, Zürich (CH)

(73) Assignee: BÜHLER AG, Uzwil (CH)

(*) Notice: Subject to any disclaimer, the term of this patent is extended or adjusted under 35 U.S.C. 154(b) by 61 days.

(21) Appl. No.: 18/862,633

(22) PCT Filed: May 4, 2023

(86) PCT No.: PCT/EP2023/061861

§ 371 (c)(1), (2) Date: Nov. 4, 2024

(87) PCT Pub. No.: WO2023/213975

PCT Pub. Date: Nov. 9, 2023

(65) Prior Publication Data

US 2025/0289173 A1 Sep. 18, 2025

(30) Foreign Application Priority Data

May 4, 2022 (CH) ................................ 000522/2022

(51) Int. Cl.
*B29C 48/92* (2019.01)

(52) U.S. Cl.
CPC .... *B29C 48/92* (2019.02); *B29C 2948/92295* (2019.02); *B29C 2948/9258* (2019.02);
(Continued)

(58) Field of Classification Search
None
See application file for complete search history.

(56) References Cited

U.S. PATENT DOCUMENTS

| | | | |
|---|---|---|---|
| 2010/0149902 | A1 | 6/2010 | Amurri et al. |
| 2016/0158985 | A1 | 6/2016 | Fitzpatrick |

(Continued)

FOREIGN PATENT DOCUMENTS

| | | | |
|---|---|---|---|
| EP | 0265601 | A2 | 5/1988 |
| EP | 1319492 | A1 | 6/2003 |

OTHER PUBLICATIONS

Janmenjoy et al., "Intelligent food processing: Journey from artificial neural network to deep learning", Elsevier, Computer Science Review, vol. 38, Sep. 2, 2020, pp. 1-28.

(Continued)

*Primary Examiner* — Jacob T Minskey
*Assistant Examiner* — Adrien J Bernard
(74) *Attorney, Agent, or Firm* — XSENSUS LLP

(57) ABSTRACT

Proposed is an industrial smart extruder and extrusion method, the industrial, intelligent extruder acting as a conveying device that uniformly squeeze solid to viscous masses out of a forming orifice under high pressure and temperature according to the operating principle of the Archimedean screw. Material is processed by hot extrusion or cold extrusion or warm extrusion or friction extrusion or micro extrusion by the extruder, and the material extruded by the extruder at least includes food products or metals or polymers or ceramics or concrete, or modelling clay. The industrial, intelligent extruder includes a smart device with a ML- or AI-based core engine controlling and/or steering and/or optimizing the operation of the extruder automatically.

12 Claims, 40 Drawing Sheets

(52) U.S. Cl.
CPC ............... *B29C 2948/92704* (2019.02); *B29C 2948/92885* (2019.02)

(56) References Cited

U.S. PATENT DOCUMENTS

| | | | |
|---|---|---|---|
| 2020/0293011 | A1 | 9/2020 | Kanaya et al. |
| 2022/0072756 | A1 | 3/2022 | Maenishi et al. |

OTHER PUBLICATIONS

International Search Report and Written Opinion mailed on Aug. 31, 2023, received for PCT Application PCT/EP2023/061861, filed on May 4, 2023, 12 pages.

Double flight corotating
intermeshing screws

Twin double counterrotating
intermeshing screws

Velocity profile in the die exit region

Extrude swelling, $D_2/D_1 > 1$

With vacuum attachment and a vent stuffer

With vacuum attachment

INDUSTRIAL EXTRUDER, PROCESS AND METHOD THEREOF

CROSS-REFERENCE TO RELATED APPLICATIONS

This application is the national stage entry of PCT/EP2023/061861, filed May 4, 2023, which claims priority to Swiss application no. 000522/2022, filed May 4, 2022. The entire contents of all prior applications are hereby incorporated by reference.

FIELD OF THE INVENTION

The present invention relates to the field of an extruder system and process. In particular, the invention relates to industrial extruder systems comprising a feeder, an extruder, a shaping opening (die), collection means, and an extruder control, the feeder feeding plastically deformable and/or viscous input material to the extruder, the extruder continuously pressing the input material to and out of the shaping opening forming an output material as extrudate, according to the operating principle of the Archimedean screw, which process is called extrusion. The invention further relates to both processing and compounding extruders. Processing extruders can be used for shaping (usually piston and single-shaft extruders), while compounding extruders are used for chemical and physical modification (reacting, mixing, degassing, etc.) of materials (co-rotating close-knit twin-shaft extruders, buss co-kneaders, etc.). The inventive extrusion process may relate to hot extrusion, cold extrusion, warm extrusion, friction extrusion and/or micro extrusion. The extruded material can, inter alia, comprise food products, metals, polymers, ceramics, concrete, or modelling clay. Finally, this the invention relies on technical solutions coping with the potential and challenges of applying ML-based techniques to hybrid food processing operations, in particular to solutions coping with the potential of physics-informed ML modeling techniques for food processing applications and appropriate optimized and/or automated structures. In general, the invention provides a valuable contribution in advancing the ML-based technology for food processing applications.

BACKGROUND OF THE INVENTION

Generally, for industrial extrusion it is known that extruders squeeze an input material comprising ingredients, applying pressure until it is ejected from the extruder out of a sharpening opening (die). There are many different variations of extrusion equipment but most typically they include a hopper for holding and feeding raw ingredient, and a hydraulically or mechanically driven means for applying pressure. Most extruders include a die for shaping the extruded end product (extrudate). The means for applying pressure typically include a single or twin-screw auger powered by an electric motor, or a ram driven by hydraulic pressure. Screws commonly used in extruders include single flight metering screws, single barrier screws, double barrier screws, variable pitch flights, multi-start flights, slotted flights and two stage screws such as for vented extruders.

Extruders are often used in polymer processing, where extrusion is a technical process where molten polymer is forced through a die and is used to produce components of a fixed cross-sectional area such as tubes and rods. A polymer is a substance or material consisting of very large molecules, or macromolecules, composed of many repeating subunits. Due to their broad spectrum of properties, both synthetic and natural polymers play essential and ubiquitous roles in everyday life. Polymers range from familiar synthetic plastics such as polystyrene to natural biopolymers such as DNA and proteins that are fundamental to biological structure and function. Polymers, both natural and synthetic, can be created via polymerization of many small molecules, known as monomers. Their consequently large molecular mass, relative to small molecule compounds, produces unique physical properties including toughness, high elasticity, viscoelasticity, and a tendency to form amorphous and semicrystalline structures rather than crystals. Food polymers are polymers from edible plants, animals, and microorganisms that can be used in food systems, including proteins, polysaccharides, and peptides. Generally, food polymers can be classified into three groups based on their sources: (1) plant-based food polymers, such as starch, dietary fiber, and cereal protein; (2) animal-based food polymers, such as meal protein; (3) microorganism-based food polymers, such as fungus polysaccharides. The oils and/or lipid from plant and animals could also be considered as food polymers although their molecular weights are relatively small. As such, food polymers represent a dominant area in natural polymers and play an important role in food structure, food functional properties, food processing, and shelf life.

In particular, extruders are popular in food processing due to the creation of a rapid, continuous process that can be used in the food industry to make numerous food products such as snacks, breakfast cereals, pellet products, pet foods, and pre-gelatinized flours, among others. It is a system that encompasses multiple unit operations such as mixing, kneading, cooking, forming, and cutting all into a single piece of equipment. This results in having a relatively simple process with high efficiency and low cost compared to other processing methods. Thus, extrusion processing is a commonly used processing technology in the food industry with a wide number of applications. Within the extrusion processing step, the input material, build by food ingredients, is subjected to high shear, temperature, and pressure for a short period of time. This helps to transform the ingredients from solid powders to a melt state inside of the extruder. The melted ingredients are then forced through a die at the end of the extruder into the atmosphere. The melt coming out of the extruder encounters a sudden drop in pressure, resulting in rapid expansion as well as a decrease in temperature, helping it to transform into a cooked product. A schematic of the transformation is again given by FIG. 1. The final quality and texture of the extruded product depends on various factors, including the ingredient mixture and its properties, extrusion processing conditions, and post-processing conditions. Because of the great flexibility of extrusion processing, it has found very diverse applications in the food industry, some of which can be seen in table 1. Extrusion processing is beneficial largely because of its applicability in various food processes, its flexibility, its reduced cost benefits, high production rate, and quality products compared to other ordinary food processes.

| Application of extrusion cooking | |
|---|---|
| Bread crumbs | Degermination of spices |
| Precooked starches | Flavor encapsulation |
| Anhydrous decrystalization of sugar to make confectioneries | Enzymatic liquefaction of starch for fermentation into ethanol |

-continued

| Application of extrusion cooking | |
|---|---|
| Bread crumbs | Degermination of spices |
| Chocolate conching | Quick-cooking pasta products |
| Pre-treated malt and starch for brewing | Oilseed treatment for subsequent oil extraction |
| Stabilization of rice bran | Preparation of specific doughs |
| Gelatin gel confectioneries | Destruction of aflatoxins or gossypol in peanut meal |
| Caramel, licorice, chewing gum | Precooked soy flours |
| Corn and potato snack | Gelation of vegetable proteins |
| Coextruded snacks with internal filling | Restructuring of minced meat |
| Flat crispbread, biscuits, crackers, cookies | Preparation of sterile baby foods |
| Pre-cooked flours, instant rice puddings | Oilseed meals |
| Cereal-based instant dried soup mixes or drink bases | Sterile cheese processes |
| Transformation of casein into caseinate | Animal feeds |
| Pre-cooked instant weaning foods or gruels | Texturized vegetable proteins |

Table 1 Shows Examples of the Diverse Applications of Extrusion Processing in the Food Industry FIG. 2 illustrates a broad block diagram of what a food extrusion processing production line can encompass. The process begins with characterizing and receiving the raw ingredients. The raw ingredients used are crucial to the product consistency at the end of the processing line. The raw ingredients then undergo mixing and/or preconditioning (cf. FIG. 30), which can be done with the equipment such as ribbon blenders and preconditioners to ensure uniformity as they enter the extruder. However, mixing and preconditioning is optional for certain products. Extrusion processing (cf. FIG. 31) then follows, which is the main cooking step where the raw ingredients are transformed into the cooked and formed products. Post-extrusion processing operations, such as cutting the extruded products into appropriate sizes, drying the products to the desired moisture, as well as seasoning or coating to provide the desired flavor and taste to the products before they go on to packaging. Along with these major sets of processing, there may be additional steps depending on the type of products being produced and their intended uses.

Extrusion processes are usually defined as either 'hot', 'warm' or 'cold' extrusion. Hot extrusion is done at an elevated temperature to keep the material from work hardening and to make it easier to push the material, particularly if it is passed through a die. Warm extrusion is done above room temperature, but below the recrystallization temperature of the mate-rial. It is often used to achieve a balance between required forces, ductility, and final extrusion properties. Cold extrusion is carried out at or near room temperature. Cold extrusion has certain advantages over hot extrusion including lack of material oxidation, more precise tolerances and good surface finish.

As mentioned, in food industry, extruders are widely used. They are used for simple forming applications, such as pasta, or to more complex operations involving significant modifications of the extruded material. The extrusion feed material can e.g. include various solid and liquid ingredients resulting in ill-defined transformation reactions and rheology/viscosity fields.

The major parts of an extruder include the feeder, barrel, screw(s), and die, although many more parts can be added for increased product versatility. The feeder is used for continuously feeding the mixture into the extruder at a constant rate to ensure consistency. Feeders often feed the material in either gravimetrically or volumetrically and it is possible to use more than one feeder at a time for different ingredients. The barrel encases the screw or a set of screws. Often, the barrel is jacketed for heating and for cooling. The heating can also be accomplished by providing electrical heating units on the barrel or by steam. The inner layer of barrels is often smooth in twin-screw systems while it may be grooved or fluted in single-screw systems. The barrel may also have various injection ports or additional feeding ports along it. Injection ports may be used for water or other liquid ingredients while added feeding ports may have additional powder ingredients being forced in through the side of the barrel, so they experience less cooking by bypassing a large section of the extruder. The role of the screw(s) is to assist in imparting shear to the ingredient mixture and forcing the dough of the mixed ingredients out from the extruder through the die. The screws are also responsible for the buildup of pressure that occurs at the end of the extruder as well as added mixing of the ingredients. The die functions to hold the material in the screws, providing time for the screws to impart shear energy onto the sample. The die also controls the final shape of the product and can be varied tremendously. The last essential part of the extruder is the motor, which provides the energy needed to rotate the screws. Other optional parts can e.g. include a preconditioner, which can be used to pre-hydrate the ingredient mix and, in some cases, pre-cook the materials before feeding into the extruder. A die cutter is also frequently used to help cut the final extrudates coming out of the die.

There are two major types of extruders: single-screw and twin-screw (corotating and counterrotating). These come with a wide range of screw diameter and length/diameter (LID) ratio with or without steam preconditioning. Given the current process know-how limitations, it may not always be easy to optimally select and design the extruder for a specific application. The various known extrusion processes can be broken down based on their function and operating parameters, by addressing different process needs, and/or differing by their logical approach to the selection or design process. Fundamental is the understanding of the material characteristics, rheology, transformation reactions, and interactions between the system design and operating parameters.

For example, a prior art discussion can start by the use of a single-screw extruder for plasticating/melting synthetic polymers, since most of the extrusion theoretical development is based on this application. Comparing plastic to food extrusion can then be used to learn from and appropriately analyze the single-screw food extrusion process. Twin-screw extruders, corotating and counterrotating, are also found in various forms and may be compared with single-screw extruders and with each other.

Food extruders utilize thermal and mechanical energy. Understanding the energy consumption and input requirements is very important to improved performance and economical system design. Water is a common ingredient in almost all the food extrusion formulations. A part of the water can sometimes be applied in the form of steam, thus supplementing the total extruder energy. This option can have a significant impact on the extruder selection, design, and performance as well as on the product characteristics. Combined extrusion cooking and forming of unexpanded products is a common process that is used to make snacks, cereals, and other products. Accelerated cooling before the final forming step is critical in such operations. This is typically achieved by evaporating part of the liquid water in a venting stage either within the extruder or in between a cooker and a forming extruder. When the extruded product is developed on a small production basis, scale-up becomes part of the total extruder's selection and design process. Understanding the scale-up process is important to identify its important factors, limitations, and complimenting process options. Finally, it should be noted that the extruder's design parameters and operating variables are generally interactive, thus impacting the extruder performance and the product characteristics. As such, one may be able to choose more than one system design and operation to make the same product. The optimum selection is likely to be governed by availability, flexibility, and economics.

Plastic and Food Extrusion Operation Modelling

Nonfood polymers can be divided into three main groups: thermoplastics, thermosets, and elastomers. Thermoplastic materials often when they are heated and solidify when they are cooled. Their chemical composition does not generally change during the extrusion process. Thermosets undergo a cross-linking reaction when the temperature increases above a certain limit. This causes the formation of a three-dimensional network, which remains intact when the temperature is reduced. The cross-linking reaction is irreversible and therefore, thermosets cannot be recycled as thermoplastic materials. Elastomers or rubbers are materials capable of very large deformations when subjected to hear force but recover their original shape when the applied force is removed.

In the prior art, the development of the polymer extrusion technology has mainly concentrated on the use of extruders for thermoplastics. In most cases, only a single polymer ingredient is extruded. The process involves conveying, plasticating (melting), and melt metering to the die.

Two types of polymerization reactions, "addition" and "condensation," produce plastic polymers. In the first type, individual monomers such as ethylene add to each other directly without any change in composition and form a long chain molecule. In the second type, two or more monomers react with each other with the elimination of a small part of them (usually water) to form a linear chain molecule. The reacting monomers in this reaction type usually carry two functional groups, which can react with each other continuously. Examples of this type of polymers are polyamides (nylons) and polyester. All of the linear or slightly branched polymers produced by addition or condensation reactions are thermoplastic. This mean that they can be repeatedly softened at an elevated temperature and solidified again by cooling. No chemical changes occur during these thermal treatment processes.

The extruder is normally used to convey the solid polymer, melt, mix, and form a finished product shape such as sheet, pipe, and rod. It is also used in compounding and in the production of plastic raw materials such as pellets for further processing operations. In addition to the continuous operations, the extruder is also used in a semicontinuous manner in the case of injection molding machines by reciprocating the screw forward when the mold filling cycle starts.

Extrusion food ingredients are mostly composed of biopolymer of carbohydrate (starch, fiber sugars, and others) and proteins. Other ingredients such as water, oils/fat, minerals, and vitamins are also included in the feed mix. The structure of the biopolymers is not well defined and varies with the sources. In food extrusion, the process usually involves feeding a mix of solid and liquid ingredients. These ingredients react in complex and ill-defined processes involving, in many cases, irreversible changes in the physical and chemical structures. Inside the extruder, the ingredients form a fluid-like material resulting from either: (1) A low temperature dough formation process in the presence of adequate fluids (water and/or oil). Water is always present, and it acts as a plasticizer, reducing the glass transition and melting temperature. The components of the formed dough may undergo structural modification if adequate energy is provided. For example, the starch granule will undergo a gelatinization/melting process if a certain temperature range is exceeded. The latter can result in a significant viscosity rise due to the increase in the water absorption capacity of the gelatinized starch; (2) At low water/oil concentration, softening and melting processes of the biopolymers (carbohydrates and proteins) can be achieved by applying adequate energy. This can be in the form of solid friction and viscous heat dissipation of mechanical energy, steam energy, and/or heat transfer through the barrel. Typically, the food material in this case also undergoes irreversible physical and chemical changes.

The heated melt in most food extrusion cases behave as non-Newtonian pseudoplastic material. Its viscosity decreases with increasing shear rate and temperature. It also decreases by increasing the concentration of water and other viscosity reducing agents.

Food extrusion can be divided into two general categories: forming and cooking. For forming applications, low shear extruders are basically used to mix and form the desired product shape with minimum energy input. The product applications include pasta, cold formed snack, and other unexpended precooked pellets. The crew typi-cally has a deep channel (0.2-0.3 D) with no compression ratio and operates at a relatively low speed (below 50 rpm).

Cooking extrusion applications normally utilize medium and high shear single and twin-screw corotating extruders. Significant energy can be provided to the product through viscous heat dissipation, heat transfer through the barrel, and sometimes with steam injection. The screws run at relatively high speeds (>100 rpm) with shallower channel depth and a compression ratio of up to 4:1 for single-screw extruders. These extruders are used for cooking as well as forming expanded products.

Both single and twin-screw extruders are used for plastic and food extrusions. Twin-screw extruders have significant advantages over single-screw extruders in feeding, mixing, heat transfer, residence time distribution, and pumping performance. However, they are more expensive. The main areas of twin-screw application in polymer extrusion are: (i) profile extrusion of thermally sensitive material, e.g., polyvinyl chloride (PVC); and (ii) compounding and difficult polymer processing operations that require good mixing of various compounds, devolatilization, and chemical reaction.

Single-Screw Extrusion

FIGS. **4*a/b* show an example of: (a) a thermoplastic single-screw extruder, (b) a thermoplastic single-screw. FIG. 5** provides a description of the screw terminology using a single-screw extruder screw elements.

Twin-Screw Extrusion

Regarding the twin-screw extrusion, the prior art discussion will be limited to intermeshing twin-screw extruders. There are two types depending on the manner one screw rotates with respect to the other screw: corotating and counterrotating extruders. One major difference between single-screw and twin-screw extruders is the type of transport that takes place within the extruder. Single-screw extruders depend entirely on frictional drag flow in the solid conveying zone and viscous drag flow in the melt-conveying zones. The transport in a twin-screw extruder is less dependent on the frictional properties of the material due to the action of the second screw in the intermeshing region. This provides a degree of positive displacement transport. Intermeshing counterrotating twin-screw extruders provide the most positive displacement action.

The channel in a corotating twin-screw extruder cannot be physically completely closed in the intermeshing region (see FIGS. 6 to 8). That is dictated by the nature of such screw rotation. Due to the surface wiping of the screw surface in the intermeshing region, the material is wiped off one screw surface, changes direction, and moves to the other screw (see FIG. 9). The pressure difference within the extruder acts on the material and can cause backward movement since the channel is open in the axial direction.

In fully intermeshing counterrotating extruders, the screw channel is closed in both radial and axial directions. The material is physically prevented from moving to the other screw by the flight of the second screw in the intermeshing region. It is thus forced to move as "C"-shaped closed chambers (along each screw) by one screw pitch for every screw rotation (see FIGS. 6 and 9). These extruders are thus not vulnerable to pressure flow and are capable of generating higher die pressure than other extruders under similar circumstances. Material mixing is limited to the flow profile within the "C"-shaped closed chambers and leakage flow between the screws and barrel parts.

The material flow in a corotating twin-screw extruder follows the figure "8" profile with a corresponding change of direction and surface renewal. This results in a relatively uniform shear stress distribution around the screws (see FIG. 10). The screw configuration generally includes mixing and flow restricting elements. This creates a complex flow pattern that results in good mixing and heat transfer, large melting capacity, and good melt temperature control. The flow pattern complexity makes it more difficult to model and scale up. In the prior art, successful scale-up has been partly achieved by modular extruder design where the screw configuration can be easily adjusted to obtain the desired performance characteristics.

The shear stress distribution around the crew in counter-rotating extruder i not uniform (see FIG. 10). The trapped material in the intermeshing region pushes the two screws outward toward the barrel, potentially causing excessive wear. This limits their operation to melt extrusion with relatively low viscosity and at low screw speeds. Their strength coincides in their high degree of positive displacement conveying. Twin-screw extruders are generally starved fed, and the feeding system controls their output. The degree of screw filling will depend on the flow rate, material viscosity, screw design, screw speed, and pressure profile generated by either the restrictive screw elements or the die assembly. The mechanical energy input thus depends on the extruder design, shear rate, and material viscosity. It is to be noted that the material flow profile within the corotating twin-screw extruder is complex and technically much more difficult to capture by modelling or simulation than that of the single-screw extruders.

In prior art, twin-screw extruders were first used for food cooking applications in the 1970s. Their use has since increased at the expense of single-screw extruders and due to the expansion in food extrusion applications in general. As mentioned earlier, corotating twin-screw extruders have a greater positive displacement and mixing capability than single-screw extruders. This has enabled the development of improved process capability and flexibility with more consistent food product quality. They have been adopted in low and medium as well as high viscosity applications. Modular extruder design and good process control have widened their use to applications requiring multi-process and functional zones. These include multiple liquid injections, downstream solid feeding, and venting ports. They can be designed with relatively long barrels, providing the long residence time needed for certain transformations and reactions. The flexibility in extruder design has also accelerated the development and optimization of new and more difficult products despite the fact that their exact flow behavior is not well understood. FIG. 11 demonstrates an example of possible capabilities of a twin-screw extruder for a multi-process extrusion system. It shows two dry mix feeders, a liquid and a direct steam injection ports, a side feeder for other solid components, a vent port with a vent stuffer, an injection port for thermally sensitive liquid ingredients, a start-up/throttle valve, the die plate, and die face cutter assembly. In practice, most of the extrusion systems are much simpler and may not include some of the units shown in FIG. 11.

Counterrotating extruders have been used for low viscosity applications that require high pressure forming capabilities. such as candy and liquorish. They typically rely to a significant extent on the barrel heat transfer to heat and cook the material. The trapped material in the C-shaped chambers can be heated to high tem-peratures without the steam blowing back to the feed port. The pressure within these chambers can be raised and maintained to a higher level than the corresponding local steam saturation pressure.

Considerable efforts have been carried out in the prior art to provide modelling and simulation structures capturing corotating twin-screw extruders. The emphasis in most of these has been the establishment of empirical relationships correlating the effect of feed composition and operating conditions on the product characteristics. The twin-screw design typically incorporates mixing discs, paddles, or reverse screw elements. The added complexity of food composition makes the task of detailed engineering modelling even more difficult. In the prior art, there are only very few modelling approaches. For example, there is a prior art simulation modelling of a twin-screw corotating extruder, however, the modelling structure being only unidirectional and accounts only for non-Newtonian and non-isothermal melt rheology.

Forming

The forming process is understood as the process of passing the melt through a specifically designed die opening. A certain pressure drop takes place across the die, depending on the die geometry, the melt viscosity, and the flow rate with $\Delta P \approx Q\mu/K$ where K is the die conductance factor, which equals the reciprocal of die resistance. However, such relations typically assume a laminar flow through the die with no material slippage on the metal surface. Slippage results in a plug flow-like pattern and can be promoted by the use of smooth and low friction die material. Die heating may further decrease the friction factor, thus increasing the slippage further. Material slippage is expected to result in a lower pressure drop across the die. This may impact the total extruder fill, mixing intensity, and energy input. From a product forming point of view, the main advantage of die slippage is the formation of a smooth and intact product surface. That is why Teflon inserts are often used in pasta product dies.

Food melts rheology analysis at different shear rate (volumetric output) is more complicated than that of thermoplastic materials. One needs to take account of the changes in the melt characteristics with changing feed rate as it impacts the time-temperature history in the extruder.

In most food extrusion operations, the extrudate swells after exiting the die, as illustrated in FIG. 12. The polymer's large and complex molecular structure gives rise to an elastic nature. In the prior art, this is believed to be largely responsible for this phenomenon. Swelling is a form of elastic recovery from deformation the polymer gets exposed to in the die. Swelling increases with abrupt die flow entry and by shortening of the die land length. It also increases with increasing the shear rate within the die. In the prior art, in a circular die, the shear rate is typically modelled by an approximation as $\gamma=Q/\pi r^3$.

With complex extruded food product shapes, the design and development of the dies of the prior art have been based more on logical and practical methods rather than on analytical methods. These shapes are further advanced in cold extrusion such as pasta and half product. Streamlining of material flow in cooking extrusion application is important to avoid material stagnation. Such material can cause quality defects, process instability, and potential blockage of small die areas.

Mixing

The basic mechanism of mixing in polymer extruders is a convective motion in the laminar flow region. The mixing action generally take place by shear and elon-gational flow. It is called distributive mixing when the mixed components do not exhibit a yield point. Distributive mixing can be described by the extent of deforma-tion or strain the fluid elements are exposed to. Dispersive mixing, on the other hand, is like a milling action and in solves the breakdown of solid particles and agglomer-ates. The actual stress is important in this form of mixing, to overcome the yield stress of the solid component. Distributive mixing always exists when dispersive mixing takes place, but not necessarily vice versa.

Distributive mixing in extruders is generally simulated by determining the velocity profiles occurring in the screw channel. In most of the simulation approaches, the fluid is considered Newtonian, the components have the same flow properties, and the flow through the flight clearance is neglected. The mixing performance improves with increasing pressure-to-drag flow ratio (throttle ratio). In choke fed extruders, this will reduce the extruder output. In all the cases, it will increase the average residence time and widen the residence time distribution (more back mixing).

Special mixing elements have been designed for a single-screw extruder to promote distributive mixing. Distributive mixing element types include pin, dulmage, saxton, pineapple, slotted flight, and a cavity transfer mixing section. The quantitative analysis of these mixing elements is quite difficult, and development of these devices has been mostly empirical using experimental evaluation methods. When used in a thermoplastic single-screw extruder, they are typically placed at the discharge end of the metering section. Modular single-screw and twin-screw extruder use kneading paddles, cut flight crews, and discs to promote distributive mixing. These elements are placed in any logical location within the extruder.

Dispersive mixing known to be critical in compounding and some food extrusion applications. The breakdown stress of agglomerates depends on their size, shape, and nature. The stresses acting on the agglomerate will depend on the flow and rheologi-cal properties of the polymer field. The higher the viscosity, the greater will be the dispersive mixing. High-speed solid-solidi mixing can also cause a higher level of agglomerate breakdown than liquid-solid mixing. Several dispersive screw elements have been used in extruders. These include the Union Carbide, Egan, Dray, and Blister rings. In all of these cases, the agglomerates must pass over a specifically designed clearance between the mixing element and the barrel. They are subjected to a high shear stress, which breaks them down and enhances mixing.

Twin-screw extruder can be provided wide kneading paddles to promote dispersive mixing. It is not possible to create tight clearance dam areas in intermeshing twin-screw extruders with side-by-side equal diameter discs. In this case, the maximum disc diameter is equal to the center distance between the two crew shafts. The created tolerance/gap with the barrel will be equal to half of the screw channel depth. A tight clearance dam can be best created by placing two sets of intermeshing discs (following each other) on the screw shafts (see FIG. 14).

Modelling of Pressure Development within the Extruder

As mentioned earlier, many of the food single and twin-screw extruders are normally starved fed. Their throughput is determined by the feeding system. Accordingly, the screws in the solid conveying section remain partly full of negligible mechanical work done on the feed material. The screw filling takes place in the successive sections due to: (i) reduced conveying capacity of the forwarding screws or kneading elements, or (ii) placement of obstructions in the form of kneading elements, discs, reverse screws, or die plate. As the resistance to the flow increases, the feed material (solid and liquid) is compacted, mixed, and transformed into a fluid/melt through a hydration process accompanied by solid-solid/solid-fluid friction and dissipation of mechanical energy. This transformation/melting process can involve a significant temperature rise, depending on the generated friction field and material viscosity.

The length of the conveying screw section to generate the necessary pressure for overcoming restrictions is affected by the screw design, effective material viscosity, and the screw speed. The pressure gradient for a Newtonian fluid can be modelled using:

$$\frac{dP}{dx} \approx K_1 DN\mu/H^2\tan\varphi$$

where $K_1$ is a constant and is influenced by the number of screw flights, the degree of intermeshing and gaps between the screws and between the screw tips and the barrel; D is the screw diameter; N is the screw speed; $\mu$ is the material viscosity; H is the flight height; and $\varphi$ is the screw flight helix angle. It can be seen from the last relation that for a given extruder, the length of the melt pumping section length decreases with increasing screw speed, melt viscosity, and decreasing screw channel depth and helix angle. This equation applies to situations where the material is in a fluid (melt) form either completely or partially (acting as the continuous phase).

The pressure gradient across the resistance sections, being made of kneading elements, discs, reverse screw, or die plate, for a Newtonian fluid can be again modelled by the relation $\Delta P \approx Q\mu/K$, where Q is the melt volumetric flow rate and K is the conductance factor of the restrictive section. For a reverse kneading/screw element section, K will be affected by the formed helix angle, the channel depth, the screw gaps, and the screw diameter. At steady state, this section will always be full, and material forward flow takes place by a pressure drop within the section. The pressure flow should be greater than the drag flow component of the restrictive elements of this section.

For a discharge die obstruction such as a circular orifice, K can e.g. be modelled as $K=\pi \cdot r^4/8L$, where r is the die radius and L is the die land length. The pressure drop within a resistance section increases with increasing flow rate, viscosity, and the restrictive value of the section. FIG. 15 shows an exemplary twin-screw extruder showing the simulated pressure and temperatures within the extruder.

Modelling of Energy Consumption and Supply within the Extruder

Modelling of energy consumption and supply is complex throughout the various processes and sources within the extruder. The following points have to be considered:

(a) Energy supply within the extruder: The energy supplied in the extruder is mostly consumed by the product. Some inevitable losses also take place from the barrel, the gear box, and the motor. The energy consumed by the product is typically simulated modelling the following changes: (1) Enthalpy rise $q_h$ (e.g. in kW). In cooking extrusion applications, the enthalpy increases accounts for the maximum consumed energy; (2) Heat of reaction/transformation such as heat of starch gelatinization and molecular breakdown. Gelatinization energy has been determined for different starches, and it is typically estimated to be in the range of 10-20 KJ/kg. These values are typically measured at excess water concentrations, accounting only for the gelatinization endotherm. In high viscosity extrusion applications (at low moisture concentration), starch and other biopolymers undergo a fractionation (depolymerization) process that is also expected to consume some energy. This energy is hard to measure and difficult to quantify; (3) Potential Energy $q_p$ (e.g. in kW).

The material kinetic energy is typically assumed to be too small and thus is ignored. Energy losses may by contributed (1) from the barrel by a circulating liquid in the barrel jacket, $q_{cl}$, (e.g. in kW); (2) from the barrel in the form of convection cooling by the surrounding air; (3) from the gear box and the motor. This comes in the form of forced cooling to remove generated heat and maintain the gear box and motor at acceptable temperatures. The losses can be estimated by calculating the applied cool-ing load. They are generally in the range of 5%-15% of the motor energy, depending on the extruder size and operation.

(b) Energy supply: Energy is supplied to the material from the extruder motor, barrel heat transfer, and in some case through direct steam injection.

(c) Mechanical energy input: The mechanical energy is provided by the extruder Motor. It is mostly consumed by the material in the filled sections of the extruder through friction and viscous heat dissipation. For a Newtonian fluid, the mechanical energy input (E) can be modelled by relation for $\int dE \approx \int C\mu \cdot N^2 dx$, where C is a constant representing the screw design. The food material generally exhibits a pseudoplastic non-Newtonian flow behavior. Together with the effect of moisture (M) and fat (F) content and temperature (T), the viscosity is typically empirically modelled using $\mu_0$ is a reference (initial) viscosity and $\gamma$ is the shear rate within the screws. The latter is linearly proportional to the screw speed.

It can be observed that viscous heat dissipation can be increased by increasing the length of the screw filled section, the material viscosity, and the screw speed. It is to be noted that increasing the screw speed results in a decrease of the melt pumping sections length. On the other hand, the resistance sections (discs, reverse kneading element, and screws) will always be full and their fill length is constant, regardless of the screw speed or the feed rate.

In the prior art, the gross specific mechanical energy input (kWh/kg) for a direct current (DC) motor with constant maximum torque is estimated or approximated using a modelling structure as e.g. S=(% N·% T·p)/F where N is the maximum extruder crew speed (rpm), T is the maximum motor torque (Nm), P is the total installed motor power (kW), and F is the feed rate (kg/h). The screw speed and torque are proportional to the motor's armature voltage and current, respectively. For an alternative current (AC) motor, the actual power should be obtained from a watt meter.

(d) Heat transfer through the barrel: The rate of heat transfer (kW) to or through the extruder barrel can be modelled or approximated using the modelling structure $a_h = U \cdot A \cdot \Delta T_{lm}$ where U is the convection heat transfer coefficient (kW/(m2° C.), A is the internal barrel surface area ($m^2$), and $\Delta T_{lm}$ is the logarithmic temperature difference (° C.) between the internal barrel surface and the material in contact.

The heat transfer coefficient in the non-filled sections is relatively small due to the lack of close contact with the surface. The heat transfer coefficient i affected by the material's physical properties and the mixing pattern. It generally increases with decreasing viscosity and increasing screw speed. Levine and Miller (2007) presented a review of the published research works on barrel heat transfer. The heat transfer coefficient has been estimated to be in the range of 50-300 $W/m^{2°}$ C.

The role of barrel heating becomes more important and significant in low viscosity extrusion cooking applications such as those containing high moisture, sugar, and/or fat concentration. The rate of mechanical energy input decreases in such application. In high melt viscosity application, motor mechanical energy is typically the main source.

Heat can also be transferred from the material by applying cooling to the barrel jacket. Product cooling results in melt viscosity rise, causing an increase in the rate of mechanical energy input. The net product cooling is therefore lower than the over-all cooling load taken out from the barrel.

Barrel heat transfer per unit output can be greater in small extruders than in larger ones. In both cases, barrel temperature control is important even when the heat transfer rate is insignificant. As mentioned earlier, the material friction coefficient with the metal surface may be influenced by the surface temperature.

(e) Steam injection into the barrel: Water is typically a natural constituent of the total food formula. A portion of the total water can be directly injected into the extruder in the form of steam. This can bring a significant amount of energy, thus supplementing and/or substituting part of the motor and barrel heating energy. In the prior art, e.g., steam energy $q_s$ (KW) modelling is used using a relation as $q_s = m_s \cdot \lambda_s$ $q_s$ where ms (kg/s) and as (KJ/kg) are the steam mass flow rate and enthalpy, respectively. Steam is usually injected in the non-filled sections of the extruder. Control of the steam flow rate is important to achieve steady state operation. It is also necessary to have a highly filled section between the injection port and the dry mix feed port to avoid steam blow back. This can be achieved by the use of reduced conveying capability screw elements (small pitch or cut flight screws) or restricting discs "shear locks."

Modelling of the Effect of Screw/Barrel Wear on the Extruder Performance

The extruder functions as a pump and a thermomechanical reactor. These functions are influenced by its screw design including the various gaps within the extruder. With use, the screw elements and barrel material undergo a process of wear. The wear rate will depend on the abrasive, adhesive, and corrosive nature; the parts material of construction; and the operating condition. The increase in the gap dimension of forward conveying sections decreases the extruder's pumping efficiency and increases the extent of back mixing and retention time. The total mechanical energy input to the product is likely to increase in this case. This may also reduce the extruder output if it is operating at or close to a choked feed manner.

Further, the restriction sections within the extruder and die assembly may also experience wear. The resulting larger gaps in this case will reduce the flow resistance of these sections, requiring a lower pressure drop across them. That may decrease the extruder fill length of the proceeding pumping section and the total energy input to the product.

For thermally sensitive materials such as food products, larger gaps and probable material stagnation could potentially result in product deterioration and quality defects, possible die blockages, and process instabilities.

Adjustments in the product formula (particularly the added water rate) and operating conditions can in some cases compensate for the gradual wear and prolong the useful life of extruder parts. The screw profile may also be altered so as to adjust the melt filled section length. In a scenario where the extruder length i longer than necessary, one can move the filled (working) sections up or down the screw to make use of the non-worn sections of the barrel Liner. This, however, needs adequate processing knowledge on the effect of screw configuration on the process and product performance. Eventually, a situation will be reached where the product and/or output specifications cannot be met, and parts replacement will have to be made. With new parts, the extruder conditions may ha e to be adjusted again if they have been altered during the parts wear lifetime.

Venting within the Extruder

Venting within a cooker extruder can be very useful for a number of objectives, such as accelerated cooling, removal of certain volatile components, and affecting certain changes within the product. A specifically designed screw is needed to allow for venting in a non-filled section. Typically, a high volumetric flow capacity screw section is positioned at the venting port succeeding a restrictive/low volumetric flow capacity screw section acting as a gas-tight seal (see FIG. 16).

The melt rheology and temperature affect the behavior of the melt and the extent of volatile removal from a venting section. Relatively low viscosity melts (for example, those of a high initial moisture content) can be successfully vented. With reduced initial moisture/fat content and/or excessive vapor release, the vented melt may produce highly expanded mass that is hard to convey forward. The use of a stuffer (see FIG. 17) can help in certain circumstances.

In application such a cooked half products, considerable product cooling is required to avoid product expansion and achieve good die face cutting. The optimum extrusion process design will depend on the nature of the formula and the desired degree of cooking. If this can be achieved at a relatively low temperature, cooking, cooling, and forming can be carried out in a single extruder with or without the use of a venting port.

In applications where a relatively high temperature (e.g. above 135° C. in the cooking section) and at high production capacities, the use of "two extruders" system is typically preferred. The first extruder cooks the material. Venting and cooling are achieved between the two extruders. The second extruder compresses the expanded material and forms the cooled product to the desired shape. The two extruders can be thus designed and operated independently. In this manner, the cooking and the forming extruders are utilized to their maximum throughput and efficiency without having to compromise, as it may be the case in a single cooking/forming extrusion system. Forming extruder are typically of a single-screw type similar to those used in the pasta product applications.

Conclusion of Simulation and Modelling Processes for Extruders and their Usability in Extrusion Automation and Automated Steering Operations of the Industrial Extruder Extruders are common devices in the plastic, metal, and food processing industries, and the utilization of extrusion processes is particularly widespread in product manufacturing and food processing. In particular, extruders are popular in food processing due to the creation of a rapid, continuous process that can be used in the food industry to make numerous food products such as snacks, breakfast cereals, pellet products, pet foods, and pre-gelatinized flours, among others. It is a system that encompasses multiple unit operations such as mixing, kneading, cooking, forming, and cutting all into a single piece of equipment.

Generally, major extruders can be classified as a single-screw or twin-screw type, the former being widely applied to general polymer processing and the latter for compounding various fibers, fillers, and polymer blends prior to final molding. A single-screw extruder consists of only one screw housed in the barrel that often has a fluted or grooved design. Additionally, the screw in a single-screw extruder is usually designed with a decreasing pitch to create compression. The amount of decreasing pitch is referred to as the compression ratio.

Twin-screw extruders can be further divided into two types based on the interactions of the two screws: intermeshing and non-intermeshing twin-screw extruders. In the twin-screw extruder family, fully intermeshing counter-rotating twin screw extruders have been found to have the best pumping abilities because of their positive displacement characteristics. Thus, the set of screws in the twin-screw extruder can be either co-rotating or counter-rotating. Co-rotating is more frequently used as it can impart more mechanical energy into the material than counter-rotating screws. The twin-screw extruder is more commonly used in the food industry because of its wide range of operating conditions and its ability to make wide range of food products, even though it requires a higher maintenance cost than a single-screw extruder. Twin-screw extruders have a wide flexibility for handling diverse ingredients and a higher production rate than single-screw extruders. Twin-screw extruders can be operated with a greater range of moisture content, which is a drawback for a single-screw extruder. The preconditioning systems can be used to expand the capabilities of both single- and twin-screw extruders. The twin-screw extruder has a higher efficiency in mixing, a self-wiping capability that can prevent residues from accumulating, and a heat transfer that is relatively faster and more uniform from the barrel to the ingredients.

In principle, extrusion is a multiple input and multiple output (MIMO) system. FIG. 3 demonstrates inputs and outputs associated with this concept. Various extrusion processing parameters can be broadly classified into three categories: (1) independent parameters (input parameters), (2) system parameters (dependent parameters) and (3) product properties (output parameters). Independent parameters are the parameters that the extruder operator has direct control over. These include the raw material (ingredient) properties and the extrusion operation parameters such as feed rate, barrel temperatures, screw configurations, screw speeds, die dimensions, and others. By modifying the independent parameters, the operator can achieve changes in the system parameters and final product properties. System parameters are the ones that the extruder operator does not have direct control over, but the operator can influence them by changing the independent parameters. The mean residence time, residence time distribution, back pressure, motor torque, and specific mechanical energy being applied to the material are the system parameters that can be measured. These impact the final product properties but can only be modified indirectly through varying the independent parameters. Product properties are parameters that help describe the final extruded product quality. This can include physical properties (expansion ratio, density, etc.), chemical properties (water absorption and solubility, etc.) and sensory properties (crispness, crunchiness, texture, etc.). To steer, optimize and/or control the extrusion processing, e.g. to manufacture food products consistently and/or optimize the energy consumption, the MIMO system needs to be captured, parametrized, and controlled.

In the modeling of food and polymer extrusion processing, the models are, as described above, generally deterministic approximations, transport phenomena based, of distributed parameters or locally lumped parameters. For engineering, the Jumped parameter approach is generally used. In the prior art, the main objective of engineering designs of extrusion is to predict the pressure and mean processing material temperature along the machine for a given screw/die geometry as a function of operating conditions. In these model structures, the screw channel is divided into short segments, where the input data come from the calculation in the previous segment, and the output data from the current segment are the input data for the next segment. In the segments, the local parameters are assumed to be constant. This locally lumped parameters concept is particularly used when dealing with plasticating processes, such as extrusion, where in addition to the melt flow, solids transport and melting are modeled.

Computer modeling is generally used to answer technical questions of food and polymer extrusion. It is used to study the impact of the input parameters variation on the material/process outputs and to show the trends on the material reaction to hundreds of potential input data configurations. It is used to get a process map for identifying the requested process parameters, according to the targeted materials and the selected screw profile, that is, distribution of the thermomechanical results (temperature, pressure, viscosity, filling) along the screw, detailed energy balance of the process, residence time analysis, etc. As another technical application, scale-up modules of the software are used for transferring of processes to machines with larger or smaller diameters (scaling of the process). Starting from the model process, the geometry of the target design and the associated process parameters are technically simulated/modeled on the basis of transfer rules. However, there are many shortcomings in practical use. The important one is that the global modelling structure which describe the complete extrusion process including solid transport, polymer melting and melt flow are based on the relatively simple 1D or 2D models, and do not allow looking into or technically capture more details of the process. Further, the physics within the extrude is not always completely understood and/or often too complex, to be captured and/or simulated by implementable modelling structures. But even if the physics would be known and could be modelled, the modelling approaches technically often fail due to the complexity and uncertainties of the multi-parameter process, thus achieving only a poor precision or require an immense processing power to allow operation in an acceptable time frame.

In the prior art, the document EP 1319492 A1 shows a system for controlling the thickness of sheets manufactured by the extrusion of a material from a die having a plurality of thickness adjusting means by repeated application of the steps 1) measuring the distribution of thickness of the sheets in lateral direction, 2) predicting a future variation in sheet thickness by an evaluation function and based on a process model representing a relation between the amount of operation and the sheet thickness and sheet thickness measured values and leading an operating amount time series to minimize the evaluation function, and 3) outputting at least the initial amount of operation of the led operating amount time series to the thickness adjusting means. The document US 2010/0149902 A1 discloses a system for producing an elastomeric composition includes the step of dosing into an extruder ingredients, the dosing step being regulated based on: i) actual weight values of the ingredients measured at dosing instants preceding a given dosing instant; ii) expected weight values of the ingredients calculated for corresponding dosing instants preceding the dosing instant; and iii) expected weight values of the ingredients calculated for a prediction time period of predetermined duration following the dosing instant. The system tries to minimize a prediction weight error between actual weight values measured during the prediction time period and the expected weight values calculated for the prediction time period, and a model weight error between actual weight values measured during the prediction time period and theoretical weight values of the ingredients corresponding to the target weight loss of the ingredients. J. Nayak "Intelligent food processing: Journey from artificial neural network to deep learning" Computer Science Review, 2020 shows a review on the advancements of food processing using ANNs, including ANN's from shallow learning to deep learning in the applications space. In particular, technology is discussed with the forefront of machine learning, deep learning, and image processing for food processing. Further, US 2020/0293011 A1 discloses production system comprising the processes of: (i) generating production condition candidates each of which is a candidate for a production condition under which the product is produced; (ii) determining, using a prediction model, a prediction of a production result of a case in which the product is produced under each of the one or more production condition candidates; and (iii) generating, by evaluating a result of the prediction based on a predetermined evaluation standard, an evaluation of each of the one or more production condition candidates. The process is repeated (ii) while changing between the production condition candidates, and determining a production condition candidate, (iii) satisfying a predetermined standard, to be the production condition under which the product is produced. US 2022/0072756 A1 discloses a resin-film manufacturing system with a lip gap control measuring a difference between a state of a target heat bolt (THB) at a start of current control and a state of each of all the heat bolts at a start of last control. When the difference between the states of THB at the starts of the current and last control is the smallest, a learning result of THB is set as an initial value of a control condition for THB, and when the difference between the states of THB is not the smallest, either one of a learning result of the heat bolt of which the difference between the states is smaller than the difference between the states of THB and the learning result of THB is set as the initial value of the control condition for THB. EP 0 265 601 A2 discloses an extruder for extruding a food product. Starting products and water are fed to the extruder and mixed in a mixing zone. The mixture is heated and plasticized by the supply of shear energy and foamed after passing through a nozzle. In order to achieve a constant product quality independent of changes in the properties of the starting products and external disturbance variables, the drive power applied by the drive motor of the shaft or shafts is measured at a constant shaft speed of the extruder, the mass throughput of the starting products supplied is measured, the quotient of these variables is measured, the mass throughput of the starting products supplied is measured, the quotient of the drive power applied by the drive motor of the shaft or shafts is measured, the mass throughput of the supplied starting products is measured, the quotient of these variables is formed, and a specific energy determined in this way is used as the control variable. Energy determined in this way is fed as a controlled variable to a control device, which keeps it constant in accordance with a predetermined setpoint value in such a way that the water supply to the mixing zone of the extruder or a steam supply are influenced as a control variable. Finally, US 2016/0158985 A1 discloses an injection molding system which includes a barrel connected to a hopper for receiving a material from the hopper. The system includes heaters outside the barrel and an extrusion screw inside the barrel. The system includes a motor coupled to one end of the extrusion screw to rotate the extrusion screw and a torque sensor on the motor, and a controller coupled to the motor and the heaters. The controller receives signals from the torque sensor. The controller includes a control algorithm to adjust the heaters according to the signal from the torque sensor to melt the material inside the barrel.

SUMMARY OF THE INVENTION

It is an object of the present invention to provide an industrialized system and method for automated and/or optimized controlling of industrial extrusion processes. The system should be enabled to optimize food and/or polymer processing through extrusion technique directed to all of the numerous unit operations involved including mixing, kneading, shearing, cooking, shaping, and forming. It should be noted that alone the extrusion cooking process is typically a complex, high-temperature, short-time process in which food materials are cooked in a tube by a combination of moisture, pressure, temperature, and mechanical shear, resulting in molecular transformation, gelatinization, protein denaturation, and disruption of bonds leading to products with new shapes and textures. The system should be further able to optimize the extrusion by leading to a lower energy consumption, to the reduction in anti-nutritional factors, increase in product microbiological safety, and thus to a better consumer acceptability. In addition, the system should also be able to automatically adapt and optimize raw material properties including thermo-physical properties and the nature of its flow under set of conditions within the extruder, which is vital to control the extruder behavior for high quality end products. The system should also be able to consider thermo-physical properties such as density, specific heat, thermal diffusivity, and thermal conductivity of the material which typically is fundamental in modeling for the design and optimization of food processing operation involving heat and mass transfer. The system should also be able to handle input measuring parameters as physicochemical properties which are often important for capturing and for characterizing or measuring changes in a processed material, as e.g. a food material, during extrusion and which may give accounts of thermal and mechanical effects and modifications thereof. Finally, the inventive system should be able to capture and dynamically react on the influence of extrusion variables (feed moisture content, screw speed, and barrel temperature) on the proximate, thermo-physical, physicochemical, extrudate, color, texture, and sensory properties of the processes material, as e.g. the food and/or polymer material.

According to the present invention, these objects are achieved, particularly, by the features of the independent claims. In addition, further advantageous embodiments can be derived from the dependent claims and related descriptions.

Generally known are extruder systems comprising a feeder, an extruder, a shaping opening (die), collection means, and an extruder control, the feeder feeding plastically deformable and/or viscous input material to the extruder the extruder continuously pressing the input material to and out of the shaping opening forming an output material as extrudate, wherein the collection mean collects the extrudate for further processing, wherein the extrusion process is controllably steered during operation by the extruder control, and wherein the extruder control comprises programmable logic for setting and adapting operational setting parameter values (208) of operational units (105) of the feeder (101), the extruder (102), the shaping opening (die), and the collection means.

This known extruder systems are controlled manually or semi-automatically, in particular the process parameters for controlling the system are set based on the experience and expertise of the operator of the extruder system by means of the extruder control. Due to increasing demands on the material characteristic parameter/properties of the extrudate on the one hand and an energy-efficient operation of the extruder system on the other hand, such an extruder control manually or semi-automatically operated by an operator cannot ensure optimal control of the extrusion process and the material characteristic parameter. For example, plant-based protein extrudates have very high demands and tight tolerances on the material characteristic parameters because these products are directly compared to meat/fish products, and on the other hand, the operational control parameters are in a non-linear relationship with the input parameters used for controlling the extrusion process. Furthermore, the presence of knowledge and experience with the extruder system requires the presence of the operator, in particular a change of operator causes an at least partial loss of the operator's knowledge and/or experience.

According to the present invention, this objective is achieved in particular by the elements of the independent claims. Further advantageous embodiments are also apparent from the dependent claims and the description.

In particular, these objectives are achieved by the invention in that a Extruder system, comprising a feeder, an extruder, a shaping opening (die), collection means, and an extruder control, the feeder feeding plastically deformable and/or viscous input material to the extruder, the extruder continuously pressing the input material to and out of the shaping opening forming an output material as extrudate, wherein the collection mean collects the extrudate for further processing, wherein the extrusion process is controllably steered during operation by the extruder control, and wherein the extruder control comprises programmable logic for setting and adapting operational setting parameter values of operational units (105) of the feeder, the extruder, the shaping opening (die), and the collection means, wherein that the extruder control further comprises a digital controller for signaling and steering the programmable logic, wherein for steering the programmable logic, the digital controller captures input parameter values at least comprising process parameter values/or and operational setting parameter values and/or material characteristics parameters values and/or environmental measuring parameter values, wherein the input parameter values comprise sensory parameter values measured by sensors associated with the feeder and/or the extruder and/or the shaping opening and/or the collection means, in that the extruder control comprises a repository storage unit (with an adaptive, digital database (504) holding a plurality of selectable, structured data records for storing digital recipes, each of the selectable data record at least comprising material characteristics parameters of the input material and target material characteristics parameters of the extrudate (300) and/or initial operational setting parameters giving an initial setting of operational setting parameters (201) for the operational (105) of the extruder system (1), wherein the input parameter values (200) further comprise parameter values of a selected data record (507), and in that the extruder system (1) comprises a digital signaling for steering the programmable logic (501) and associated operational units (507) by means of the digital controller (502) to controllably and steered extrude an extrudate (300) having material characteristics parameters values (202) within a predefined tolerance range of predefined target parameter values (206).

The digital controller has a database of recipes for extruding extruded data with predefined material properties, ensuring the production of the extruded data predefined in the recipe for setting and adapting operational setting parameter values to the extruder controller. Preferably, the recipe comprises initial operational control parameters for starting up the extruder system to start with optimal process parameters and thereby ensure a stable and energy efficient extrusion process. Furthermore, the input parameter comprises environmental measuring parameter for characterizing the environment of the extruder system for example temperature, humidity and weather forecast data of the extruder system's environment. Environment measuring parameter are considered in optimization of the energy consumption optimization of the extruder system.

The adaptive, digital database the extruder system is realized as a digital library, the repository storage unit having a network interface providing access via a data transmission network to the structured data records for selection and/or adaption and/or generation of the structured data records to ensure data exchange and data tracking of the data send, received, and generated by the digital controller and the repository storage. Structuring the data records enables the digital database search, filter data records according to structural criteria.

The digital controller comprises a machine learning unit monitoring and classifying input parameter value patterns and adapting the operational setting parameter values of operational units of the feeder and/or the extruder and/or the shaping opening (die) and/or the collection means to align measured material characteristics parameters values of the extrudate within the predefined tolerance ranges to enable the digital controller to build a model for the extruder system based on sample data, known as training data, in order to make predictions based on input parameter values for operational setting parameters for extruding an extrudate with having material characteristics parameters values within a predefined tolerance range of predefined target parameter values without being bound to a linear relationship between input parameter and operational setting parameter.

The machine learning unit at least comprises at least a Deep Learning (DL) structure comprising one or more Neural Network (NN) structures and/or one or more statistical modelling structures providing output parameter values based on the input parameter values indicating parameter values adaptions required to align the measured material characteristics parameters values of the extrudate within the predefined tolerance ranges to ensure that the machine learning model non-linear functions, piecewise linear functions, or step functions.

The machine-learning based Deep Learning structure at least comprise a cascade of multiple layers of nonlinear processing units for feature extraction and signal transformation, and wherein each successive layer uses the output of the previous layer as an input providing supervised learning at least for classification and/or unsupervised learning at least for pattern recognition ensuring a precise modelling of complex non-linear models. Increasing computational power enables an effective training of several dependent layers. Preferable supervised learning is applied if input data is collected or produced by simulation by example. Another preferable option is to apply unsupervised learning models, in contrast, work on their own to discover the inherent structure of unlabeled input parameter.

The extrusion process of the extruder system is autonomously adapted by the machine-learning unit by automatically adapting the operational setting parameter values of operational units of the feeder and/or the extruder and/or the shaping opening and/or the collection means to align measured material characteristics parameters values of the extrudate within the predefined tolerance ranges by time-based monitoring of the input measuring parameter values ensuring the operational units are controllable steered in the most effective way by the digital controller taking consideration the input parameter value.

Failures of the extruder system during the extrusion process are automatically detected by the machine-learning unit based on the measured and monitored input parameter values, wherein an alert signaling and/or steering signaling is generated upon detection of a predicted failure within the extrusion process ensuring a controlled extrusion process producing an extrudate according to the predefined material characterization parameter. Furthermore, a most effective use of the input material for the extrusion of extrudate by the extrusion system because of e intermediate interaction of the digital controller by the alert signaling and/or steering signaling. Furthermore, an inefficient spent of energy for a detection of a predicted failure within the extrusion process.

The Deep Learning of structure extruder system at least comprises a Convolutional Neural Network (CNN) structure as deep neural network ensuring of local spatial coherence in the input parameter, allowing to have fewer weights as some parameters are shared. This process, taking the form of convolutions, makes especially well-suited to extract extrusion process relevant information at a low computational cost of the input parameter, in particular electromagnetic based data including optical data, for example generated by a near infrared sensing unit.

Measured and/or captured input parameter value pattern are classified and selected by means of convolutional layers and pooling layers of the CNN structure, the pooling layers reducing the dimension of a feature map of the measured and/or captured input parameter value pattern and thus reducing the processing complexity within the machine learning unit to adapt the operational setting parameter values of operational units.

The repository storage unit of the extrusion system further comprises an operational data storage for storing historical operation data wherein historical operation data comprising historical input parameter values, historical material characteristics parameter values and predefined target parameter values, the machine learning unit being trained by applying historical operation data ensuring a supervised training with the historical operation data for a most effective modelling of the Deep Learning structure is most effective adapted to the historical behavior the extrusion system characterized by the historical operation data. Furthermore, a centralized database communication/exchanging data with numerous extruder system increases the data used for the training of centralized Deep Learning structure which can be accessed (read) by at least one extruder systems via the data transmission network and applied by the at least one extruder systems.

The material characteristic parameter comprises texture and/or density and/or color and/or anisotropy and/or chemical composition and/or thickness and/or degree of polymerization and/or moisture content and/or protein content and/or starch content and/or fiber content and/or particle size and/or surface structure and/or tolerance range ensuring a most adequate characterization of the extrudate produced by the extrusion system.

The operational setting parameter of the extrusion system comprises a screw speed of a screw of the extruder pressing the input material and/or addition rate by the feeder of at least one ingredient for composing the input material and/or conditioning setting of a conditioner of the extruder for cooling or heating the input material in the extruder and/or conditioner of the shaping opening and/or positioning size for the shaping opening area ensuring an effective generation of operational setting parameter values by the digital controller.

The target parameters of the extrusion system comprise at least one of the material characteristic parameters, and/or process parameters at least comprising energy consumption of the extruder system ensuring a most effective and sustainable extrusion process for producing the extrudate as specified by the material characteristic parameter and/or process parameter and energy consumption.

The material parameter values of the input material and/or an ingredient of the input material are automatically determined by the machine learning unit adapting a dosing process of the feeder by adapting operational setting parameters of the feeder.

An extruder network comprising two or more extruder systems and a central digital controller comprising a central repository having at least one adaptive central digital database containing structured data records for storing digital recipes and/or ingredients and/or products, and wherein at least one of the digital controller of the plurality of extruder systems is to be given read and/or write access to the structured central data records via the data transmission network for selecting and/or adapting and/or generating the structured central data records and wherein the central data records generated by an extruder system have at least one data classification parameter characterizing this generating extruder system or factors influencing the generating extruder system ensuring a centralized and structured data collection of recipes and/or ingredients and/or products accessible by one or more extruder system via the data transmission network. Furthermore, the central repository makes available knowhow generated by extruder systems via the central structured data records. Furthermore, a centralized digital controller enables trained centralized Deep Learning structures with structured data records of several extrusion systems independent of their geographical location and environmental conditions.

The data classification parameter of the extruder network, comprises the country of operation of the generating extruder system and/or the operator of the generating extruder system and/or the generating extruder system identification and/or the extruder type, in order to classify the centrally stored data records in the at least one central database with data identifying the generating extrusion system ensuring a deeper structure of the central data records for a multidimensional dimension enabling a more effective training of the at least one deep learning structure for generating operational setting parameter based on applied input parameter.

BRIEF DESCRIPTION OF THE DRAWINGS

The present invention will be explained in more detail by way of example in reference to the drawings in which:

FIG. 3 demonstrates exemplary the various inputs and outputs associated with the inventive extruder system.

FIG. 3 demonstrates exemplary the various inputs and outputs associated with the inventive extruder system. The various extrusion processing parameters can be broadly classified into three categories: (1) independent parameters (input parameters), (2) system parameters (dependent parameters) and (3) product properties (output parameters).

DETAILED DESCRIPTION OF THE INVENTION

Figure 1:
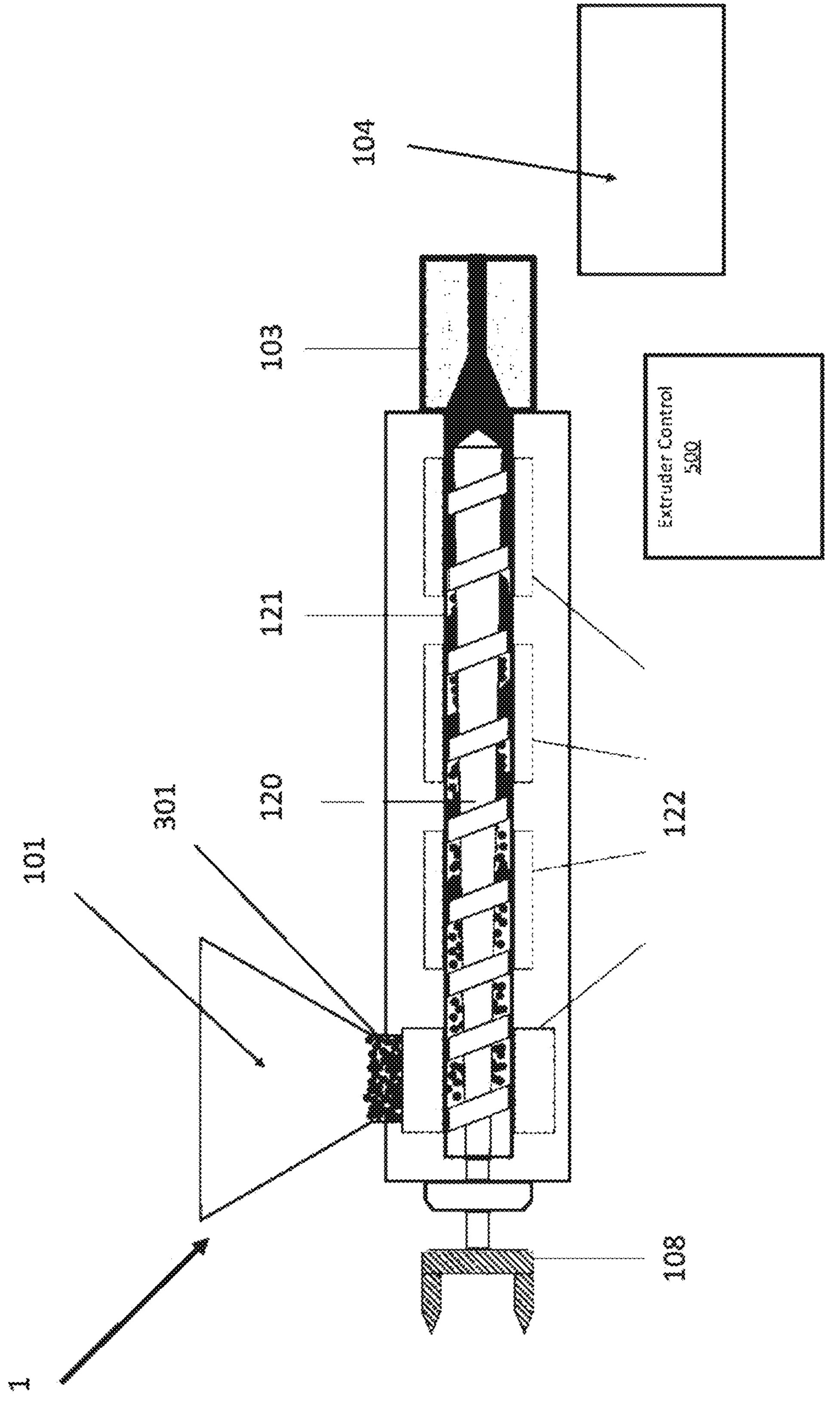
FIG. 1 shows a diagram illustrating schematically an exemplary simple schematic of extrusion processing, showing the transformation of raw ingredient (such as grain flour or starch) to finished product.
Figure 2:
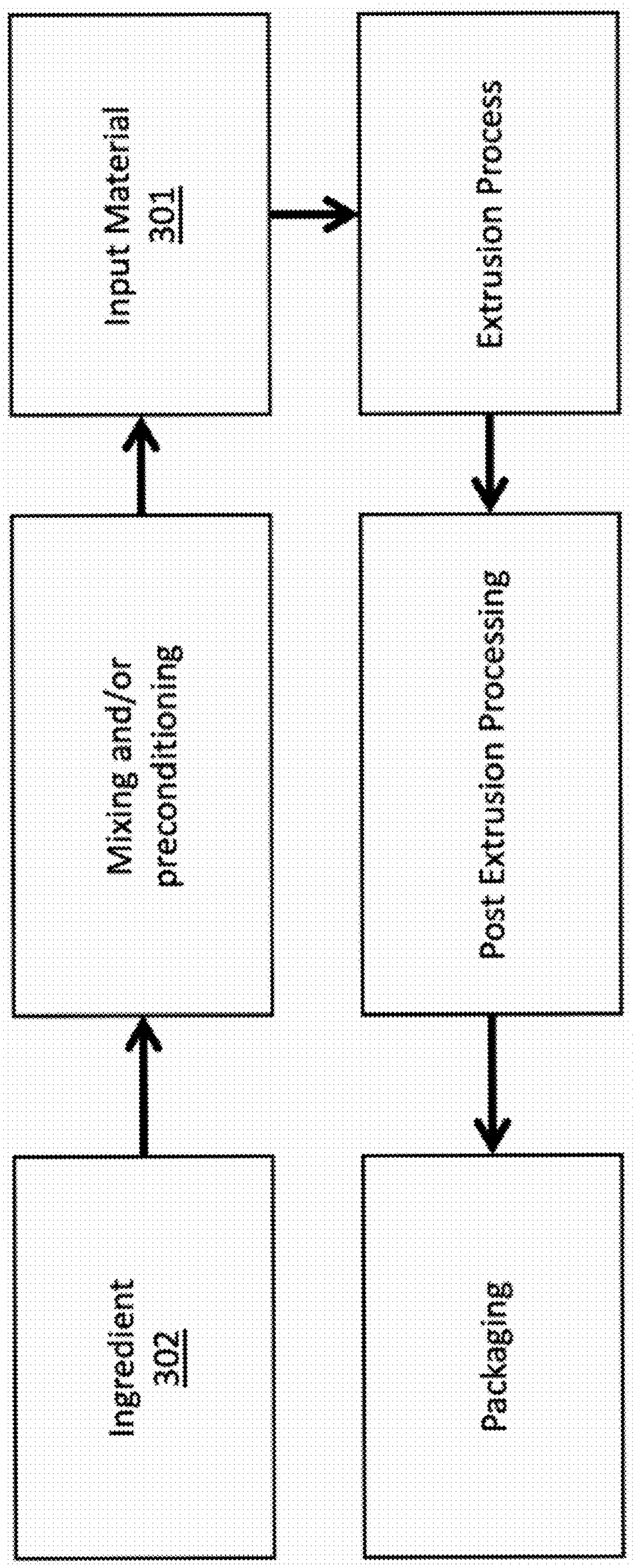
FIG. 2 shows a block diagram illustrating schematically an exemplary flow chart of an extrusion processing production line. The extrusion process begins with characterizing and receiving the ingredients. The ingredients used are crucial to the extrudate consistency at the end of the processing line. The ingredients then undergo mixing and/or preconditioning, which can be done with an equipment such as ribbon blenders and preconditioners to ensure uniformity as they enter the extruder. However, mixing and preconditioning is optional for certain products. Extrusion processing then follows, which is the main cooking step where the raw ingredients are transformed into the cooked and formed products. Post-extrusion processing operations, such as cutting the extruded products into appropriate sizes, drying the products to the desired moisture, as well as seasoning or coating to provide the desired flavor and taste to the products before they go on to packaging. Along with these major sets of processing, Convolutional Neural Networks CNN their intended uses.

FIGS. 1 to 8 illustrate, schematically, an architecture for a possible implementation of an embodiment of the inventive industrial extruder system 1 and extrusion process. The industrial extruder system 1 comprises a feeder 101, an extruder 102, a shaping opening 103 (die), collection means 104, and an extruder control 500, the feeder 101 feeding plastically deformable and/or viscous input material 301 to the extruder 102, the extruder 102 continuously pressing the input material (301) to and out of the shaping opening (103) forming an output material as extrudate 300 according to the operating principle of the Archimedean screw. Input material 301 is processed by hot extrusion or cold extrusion or warm extrusion or friction extrusion or micro extrusion by the extruder 1. The input material 301 extruded by the extruder system 1 can at least comprise food products or metals or polymers or ceramics or concrete or modelling clay. The collection means 104 collects the extrudate 300 for further processing, for example a post extrusion processing comprising cutting and/or drying and/or seasoning and/or frying and/or coating, according to FIG. 2.

The extrusion process is controllably steered during operation by the extruder control 500, and wherein the extruder control 500 comprises programmable logic 107 for setting and adapting operational setting parameter values 208 of operational units 105 of the feeder 101, the extruder 102, the shaping opening (die) 103, and the collection means 104. The programmable logic 107 comprises programmable logic controller of operational units, for example a programmable logic controller of a frequency converter for controlling the motor 108. The operational setting parameter 201 comprises a screw speed of a screw of the extruder pressing the input material 301 and/or addition rate by the feeder of at least one ingredient for composing the input material 301 and/or conditioning setting of the conditioner unit 122 of the extruder 102 for cooling or heating the input material 301 in the extruder 102 and/or conditioner of the shaping opening 103 and/or positioning size for the shaping opening 103 area.

In that the extruder control 500 further comprises a digital controller 502 for signaling and steering the programmable logic 501, wherein for steering the programmable logic 501, the digital controller 502 captures input parameter values 200 at least comprising process parameter values/or and operational setting parameter values (208) and/or material characteristics parameter values 202 and/or environmental measuring parameter values 209. The material characteristic parameter 202 comprises texture and/or density and/or color and/or anisotropy and/or chemical composition and/or thickness and/or degree of polymerization and/or moisture content and/or protein content and/or starch content and/or fiber content and/or particle size and/or surface structure and/or tolerance range. Further the input parameter values 200 comprise sensory parameter values 207 measured by sensors 111 with the feeder 101 and/or the extruder 102 and/or the shaping opening 103 and/or the collection means 104 as illustrate in FIG. 3.

Figure 3:
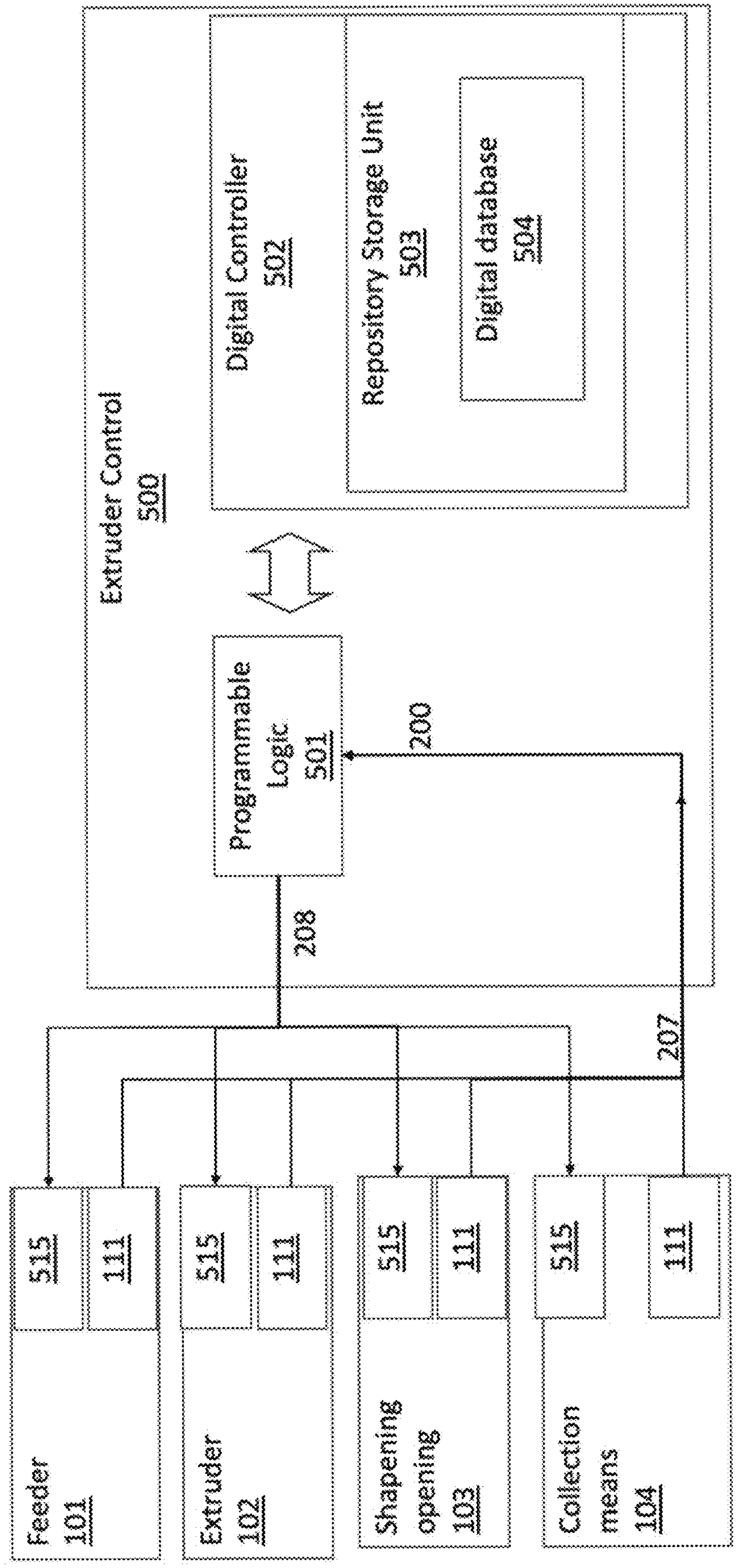
FIG. 3 shows a block diagram illustrating schematically an exemplary extrusion system as a multiple input and multiple output (MIMO) system.
Figure 4:
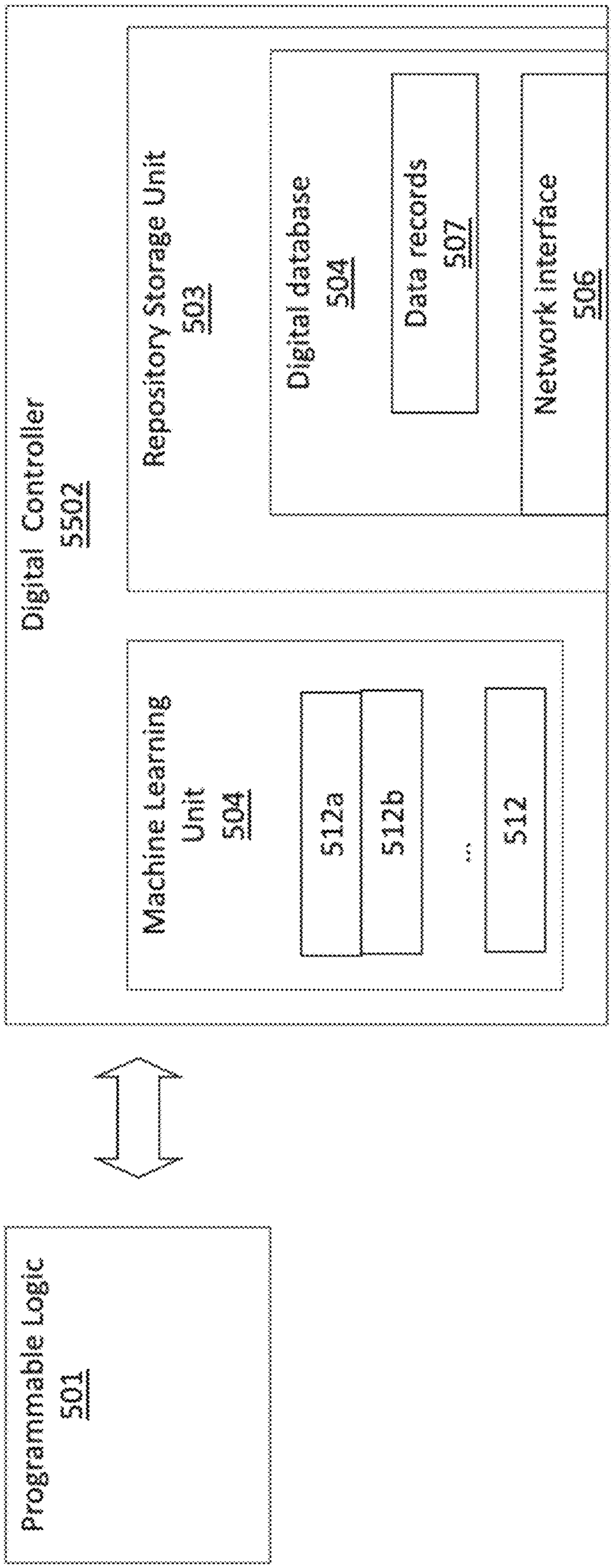
FIG. 4 shows a diagram illustrating schematically an exemplary of a digital controller comprising an interface to the programmable logic.
Figure 5:
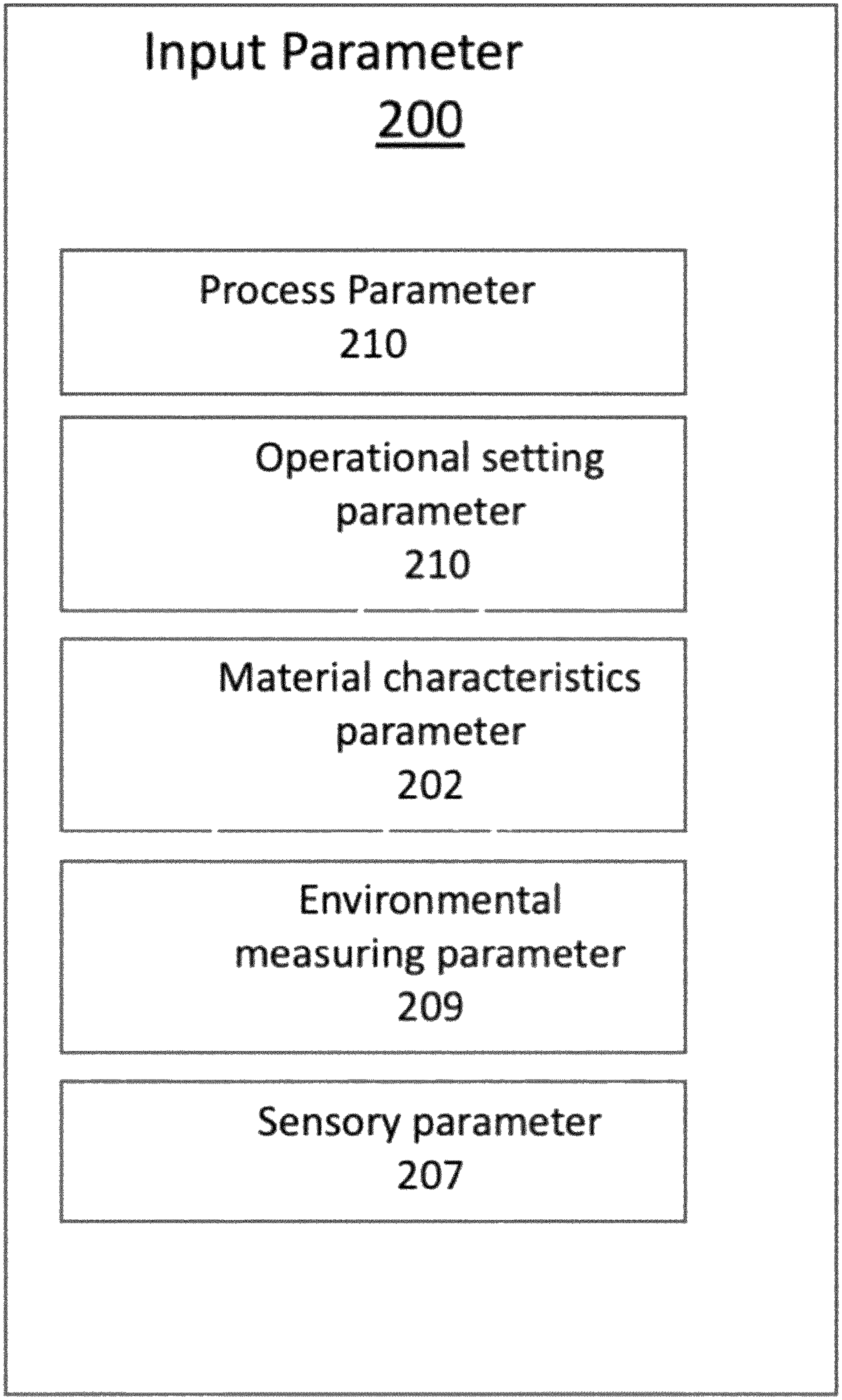
FIGS. 5 and 6 provides a description an input parameter and a digital recipe.
Figure 6:
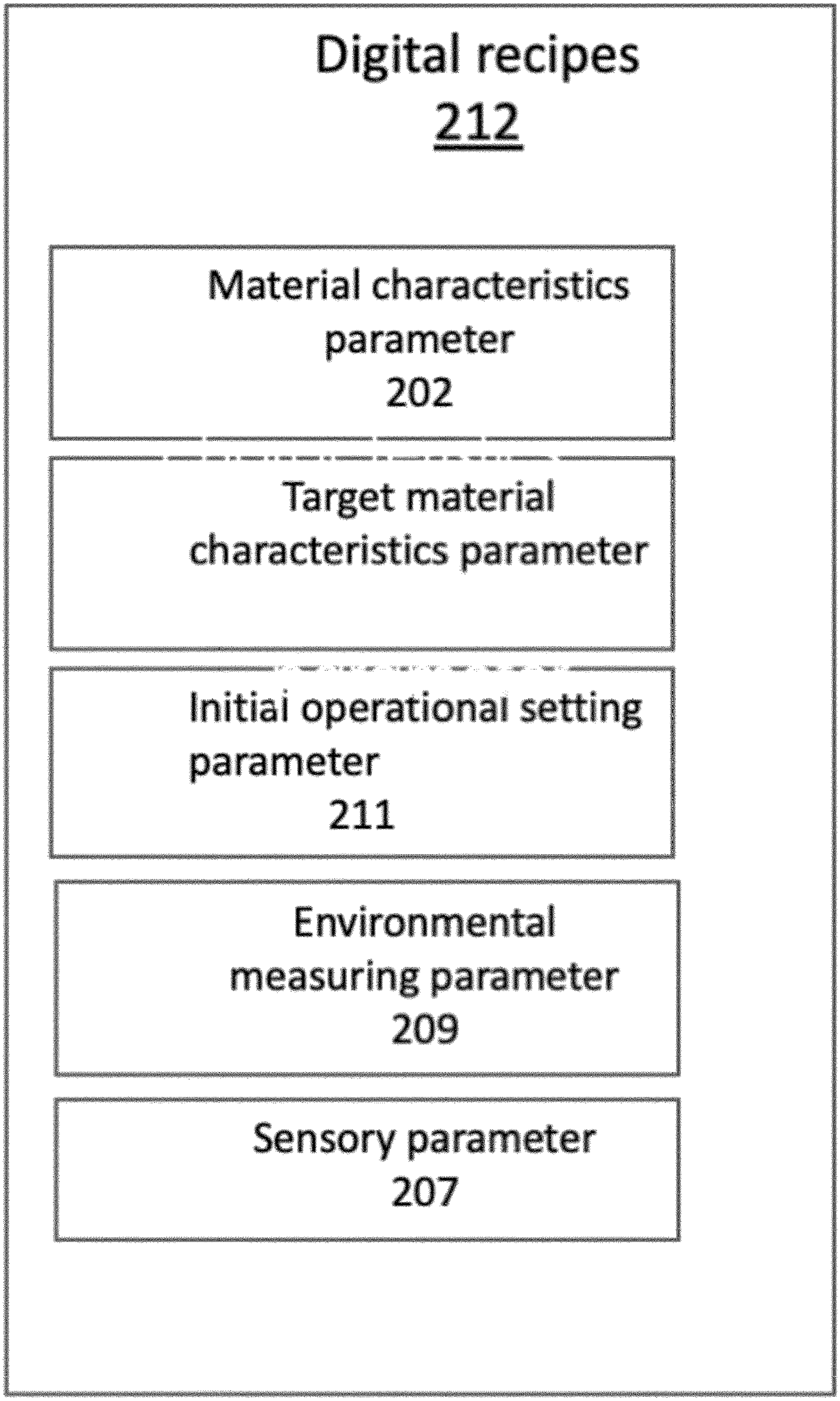

The extruder control 500 comprises a repository storage unit 503 with an adaptive, digital database 504 holding a plurality of selectable, structured data records 507 for storing digital recipes, each of the selectable data record 507 at least comprising material characteristics parameters 202 of the input material 301 and target material characteristics parameters 204 of the extrudate 300 and/or initial operational setting parameters giving an initial setting of operational setting parameters 201 for the operational 105 of the extruder system 1, wherein the input parameter values 200 further comprise parameter values of a selected data record 507 as illustrated FIG. 6. The extruder system 1 comprises a digital signaling for steering the programmable logic 501 and associated operational units 507 by means of the digital controller 502 to controllably and steered extrude an extrudate 300 having material characteristics parameters values 202 within a predefined tolerance range of predefined target parameter values 206 as illustrated in FIG. 3. 2. The digital database 504 is realized as a digital library, the repository storage unit 503 having a network interface 506 providing access via a data transmission network 505 to the structured data records 507 for selection and/or adaption and/or generation of the structured data records 507. Data transmission is the transfer and reception of data in the form of a digital bitstream or a digitized analog signal transmitted over a point-to-point or point-to-multipoint communication channel. Examples of such channels are copper wires, optical fibers, wireless communication using radio spectrum, storage media and computer buses.

Figure 7:
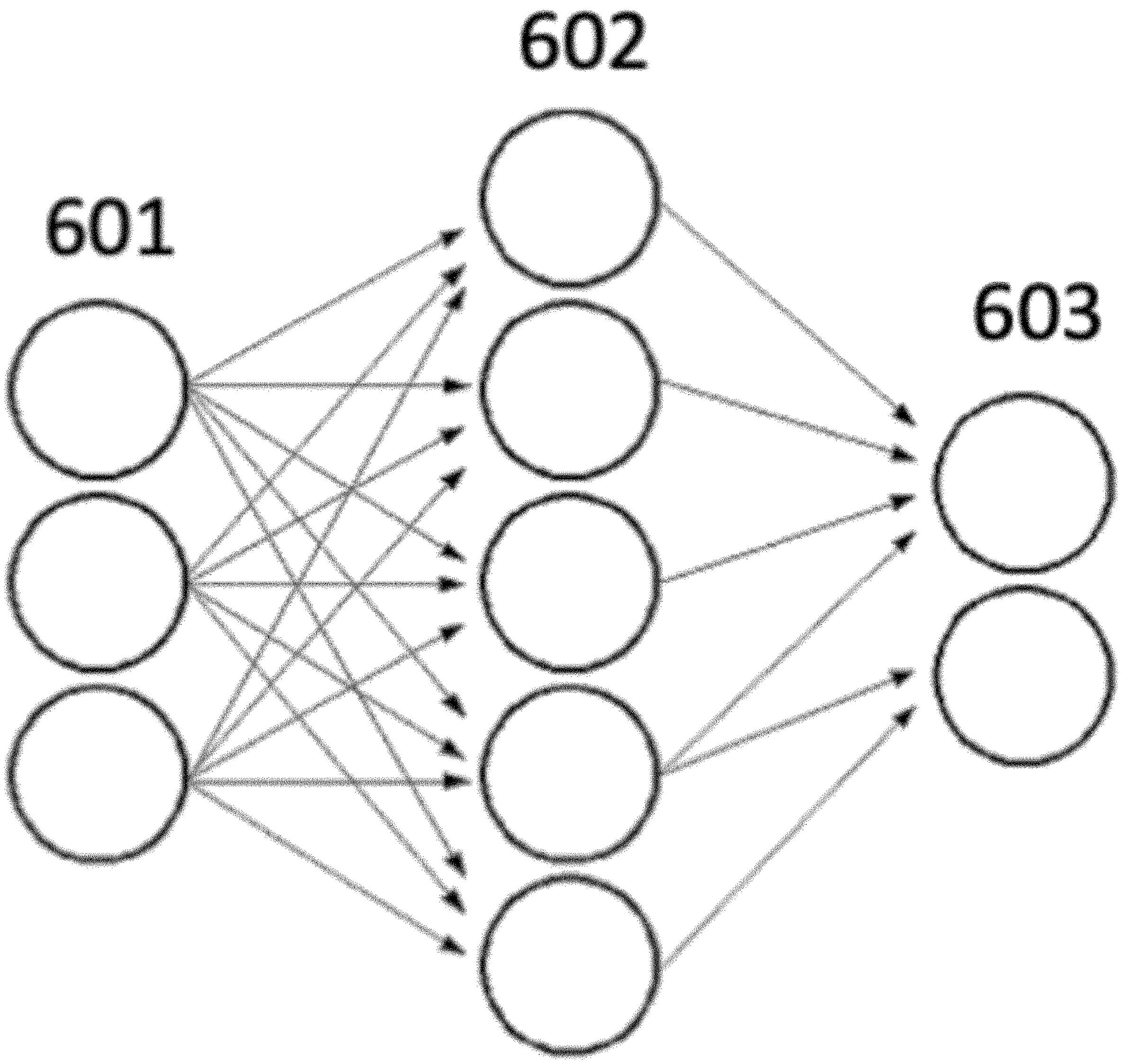
FIG. 7 shows a diagram illustrating schematically exemplary of a neural network.
Figure 8:
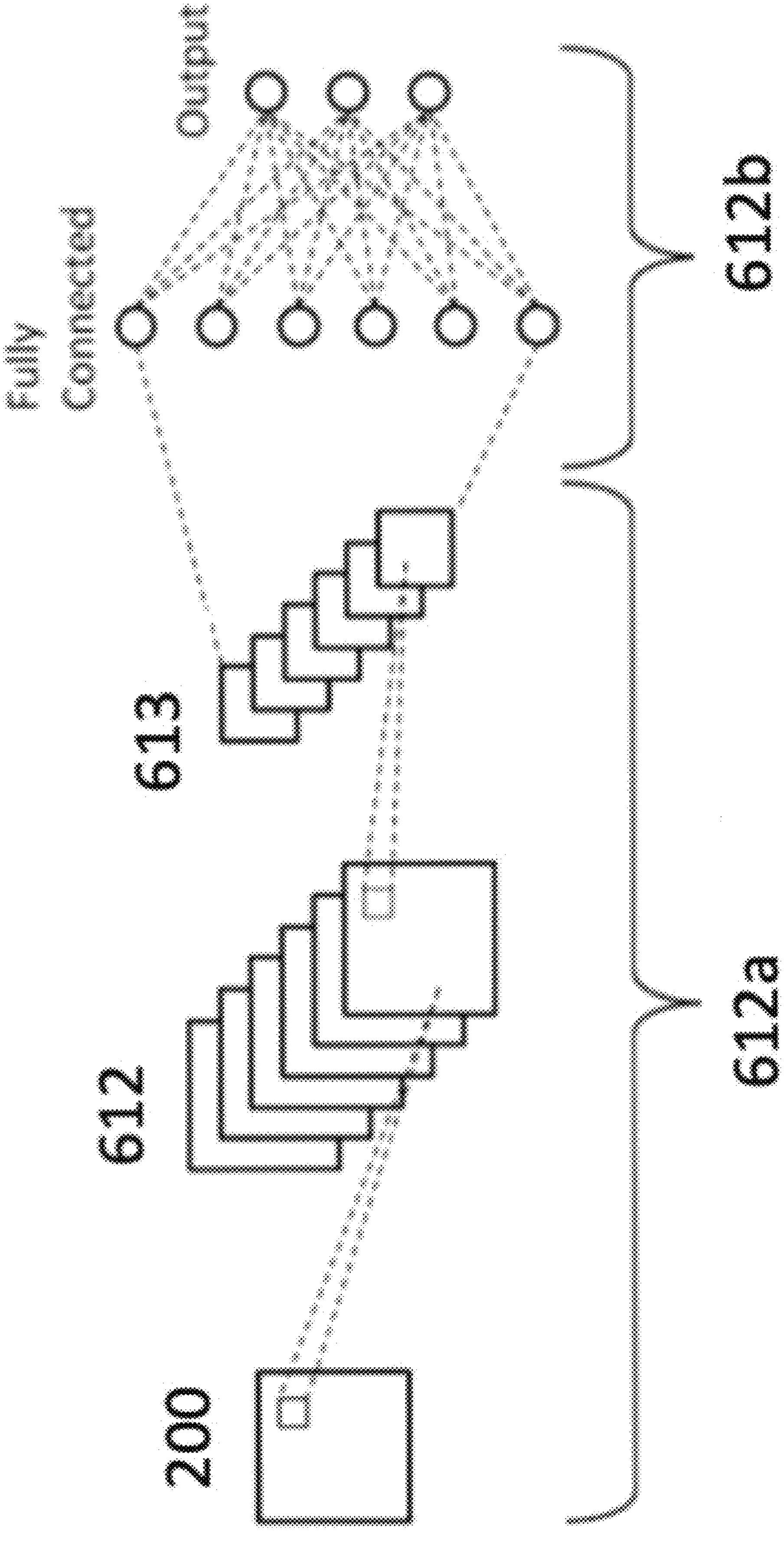
FIG. 8 shows a diagram illustrating schematically exemplary a Convolutional Neural Networks comprising a feature extraction layer and a classification layer.
Figure 9:
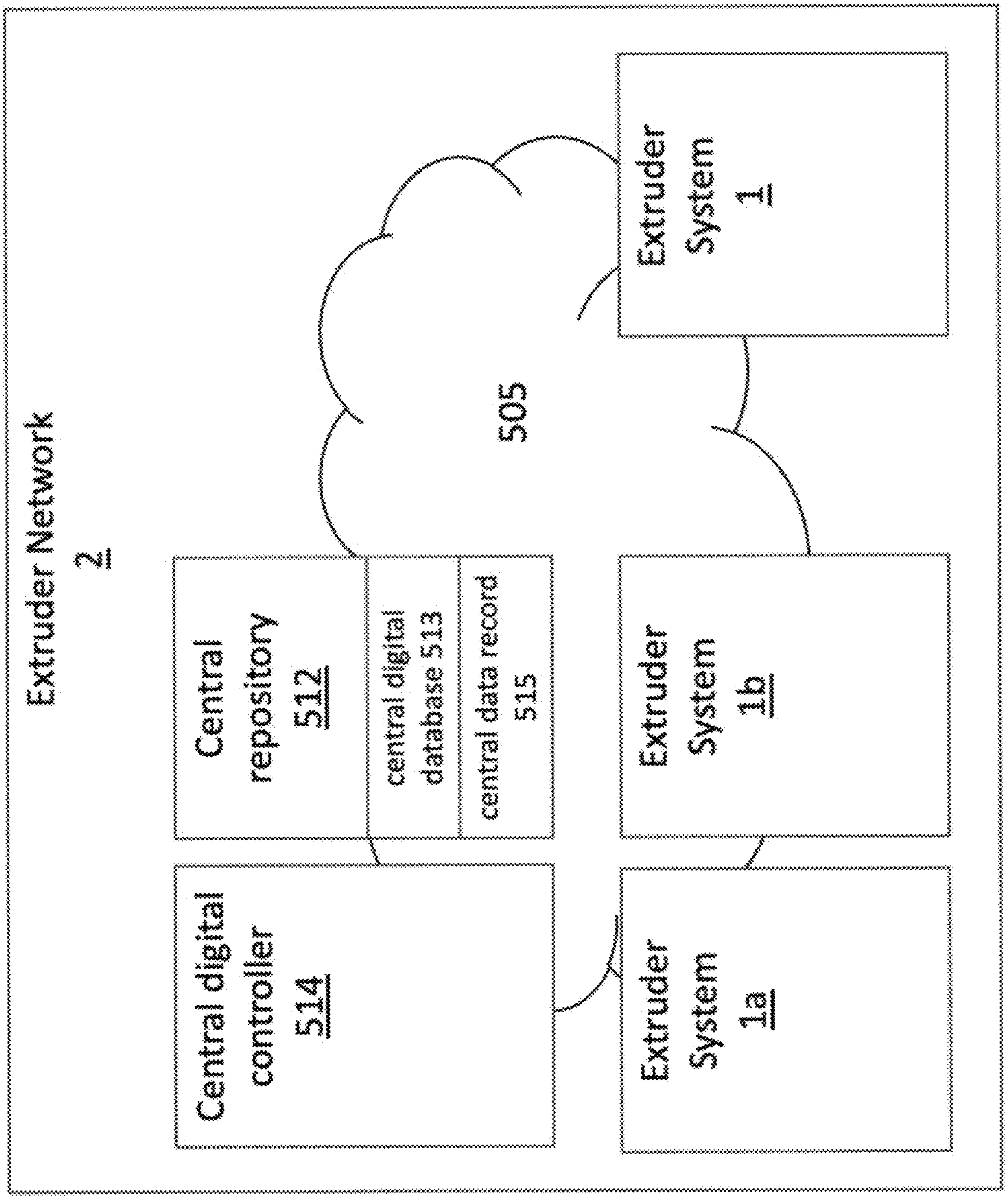
FIG. 9 shows a diagram illustrating schematically exemplary an extrusion network comprising several extruder systems communicating via a data transmission network.
Figure 10:
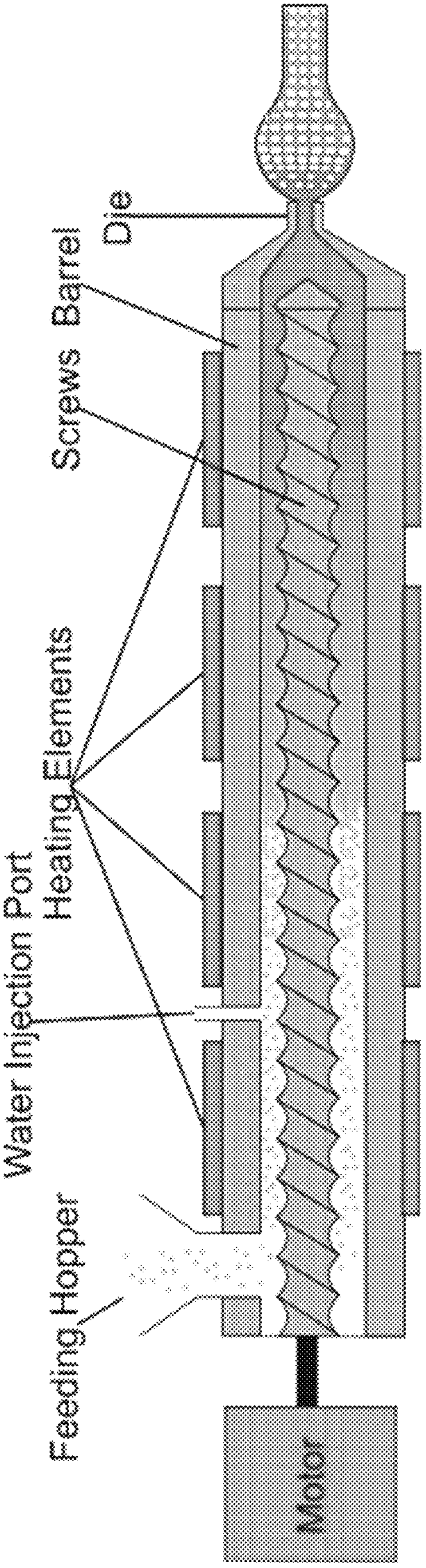
FIG. 10 shows a diagram illustrating schematically an exemplary simple schematic of extrusion processing, showing the transformation of raw ingredient (such as grain flour or starch) to finished product.
Figure 11:
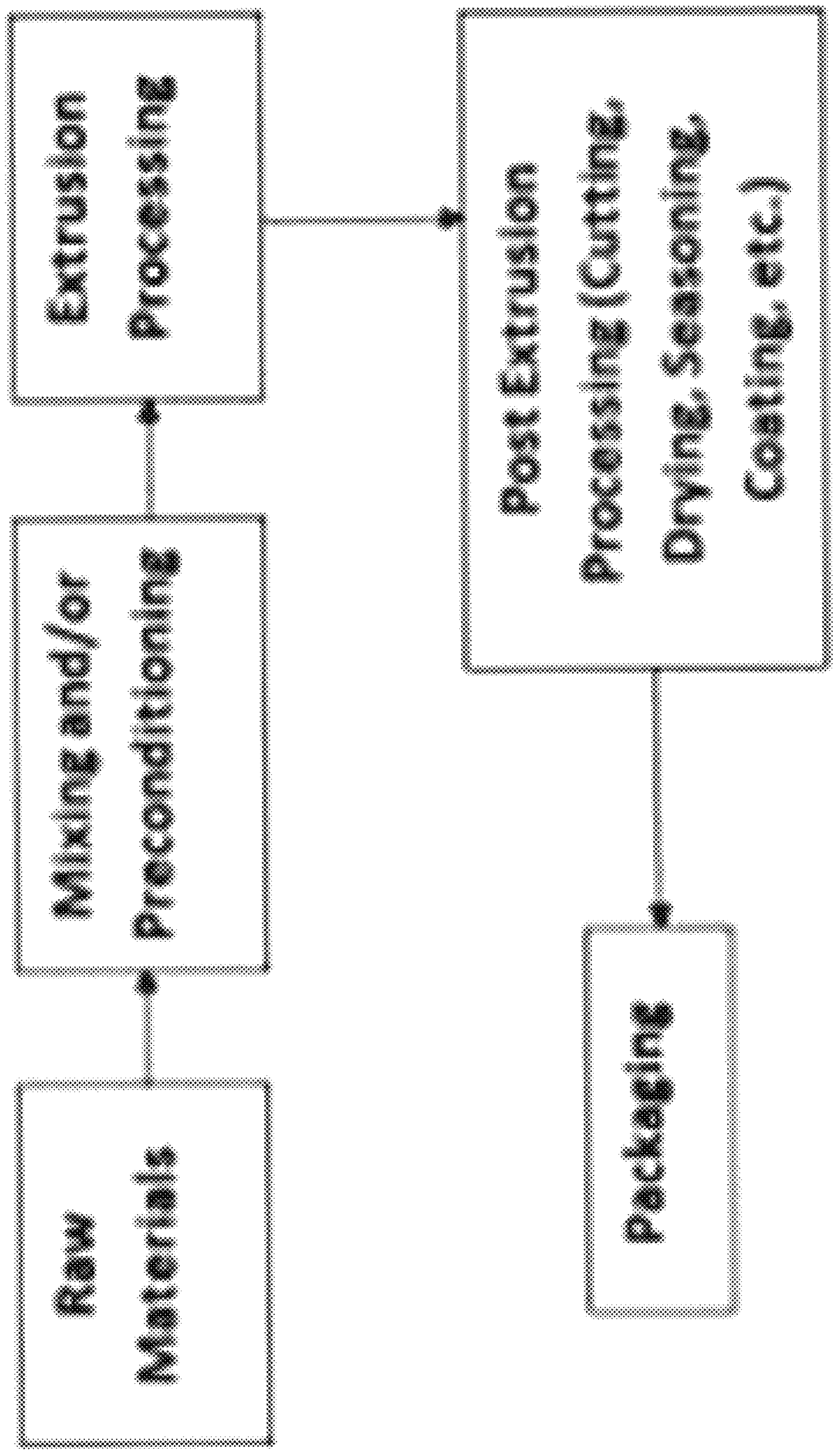
FIG. 11 shows a block diagram illustrating schematically an exemplary flow chart of an extrusion processing production line. The extrusion process begins with characterizing and receiving the raw ingredients. The raw ingredients used are crucial to the product consistency at the end of the processing line. The raw ingredients then undergo mixing and/or preconditioning, which can be done with the equipment such as ribbon blenders and preconditioners to ensure uniformity as they enter the extruder. However, mixing and preconditioning is optional for certain products. Extrusion processing then follows, which is the main cooking step where the raw ingredients are transformed into the cooked and formed products. Post-extrusion processing operations, such as cutting the extruded products into appropriate sizes, drying the products to the desired moisture, as well as seasoning or coating to provide the desired flavor and taste to the products before they go on to packaging. Along with these major sets of processing, there may be additional steps depending on the type of products being produced and their intended uses.
Figure 12:
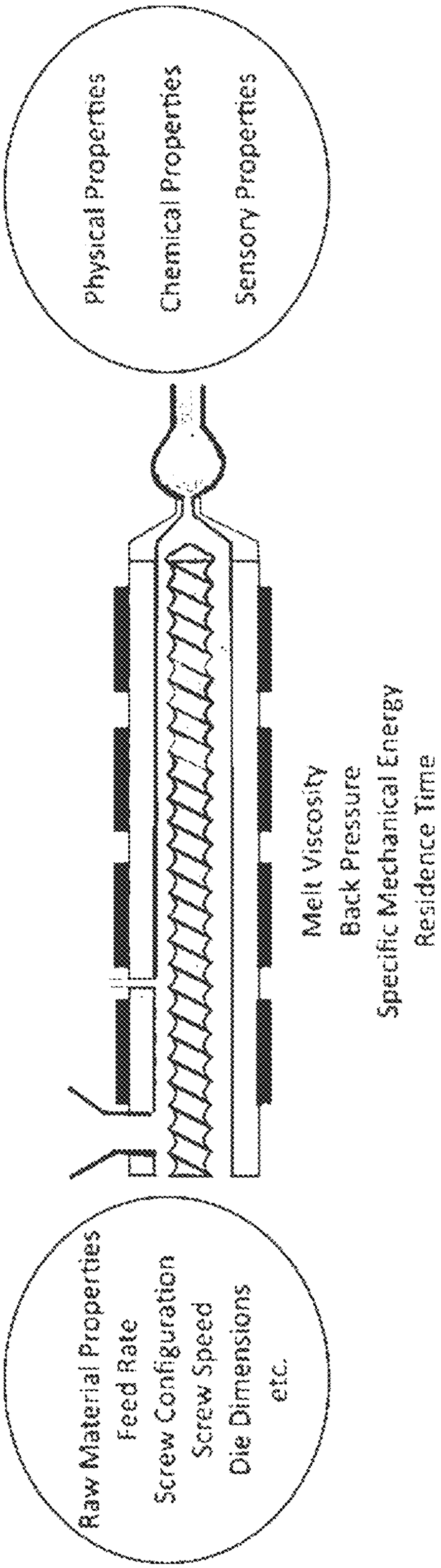
FIG. 12 shows a block diagram illustrating schematically an exemplary extrusion process as a multiple input and multiple output (MIMO) system.
Figure 13:
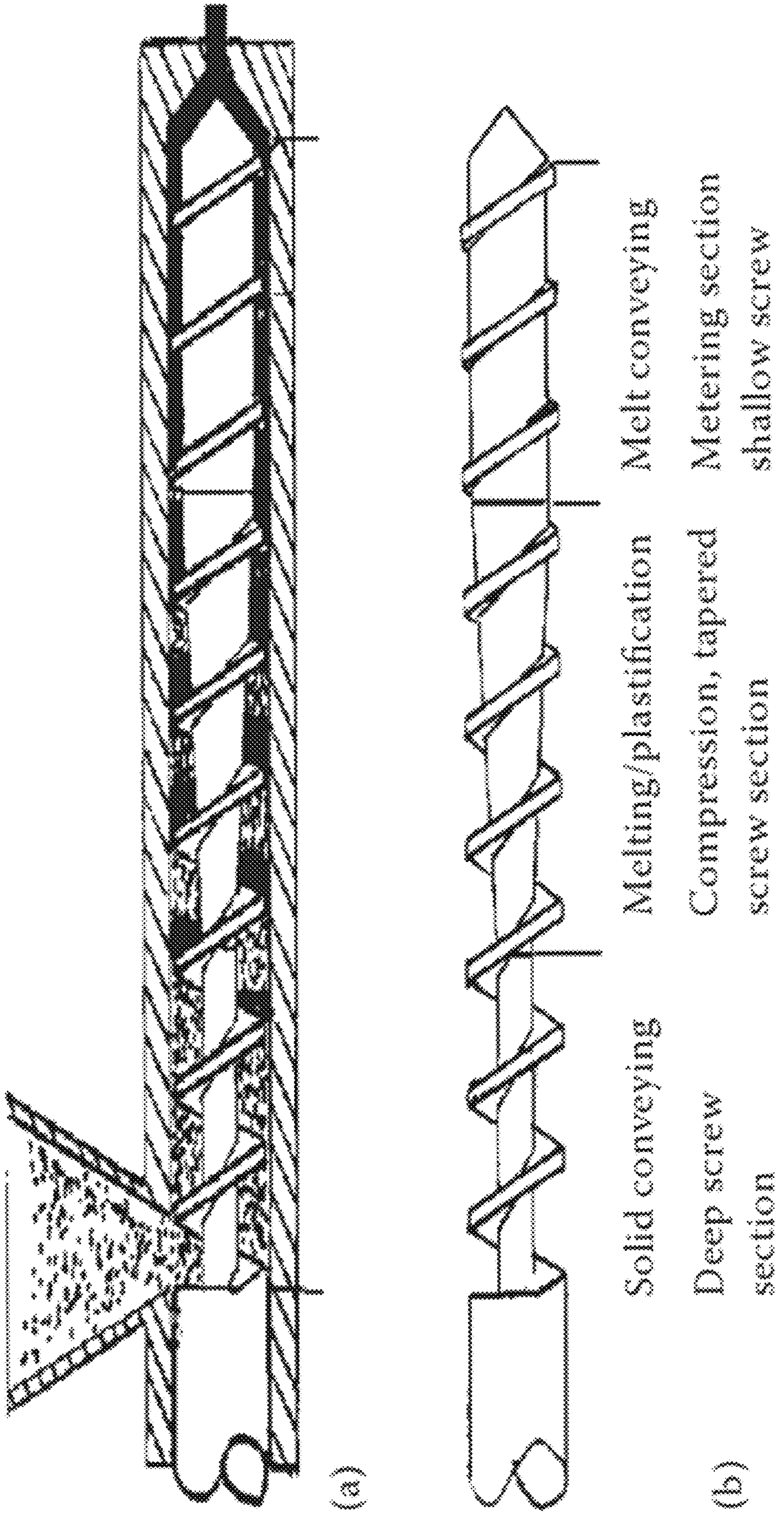
FIGS. 13*a/b* show a diagram illustrating schematically an exemplary (a) thermoplastic single-screw extruder, (b) thermoplastic single-screw.
Figure 14:
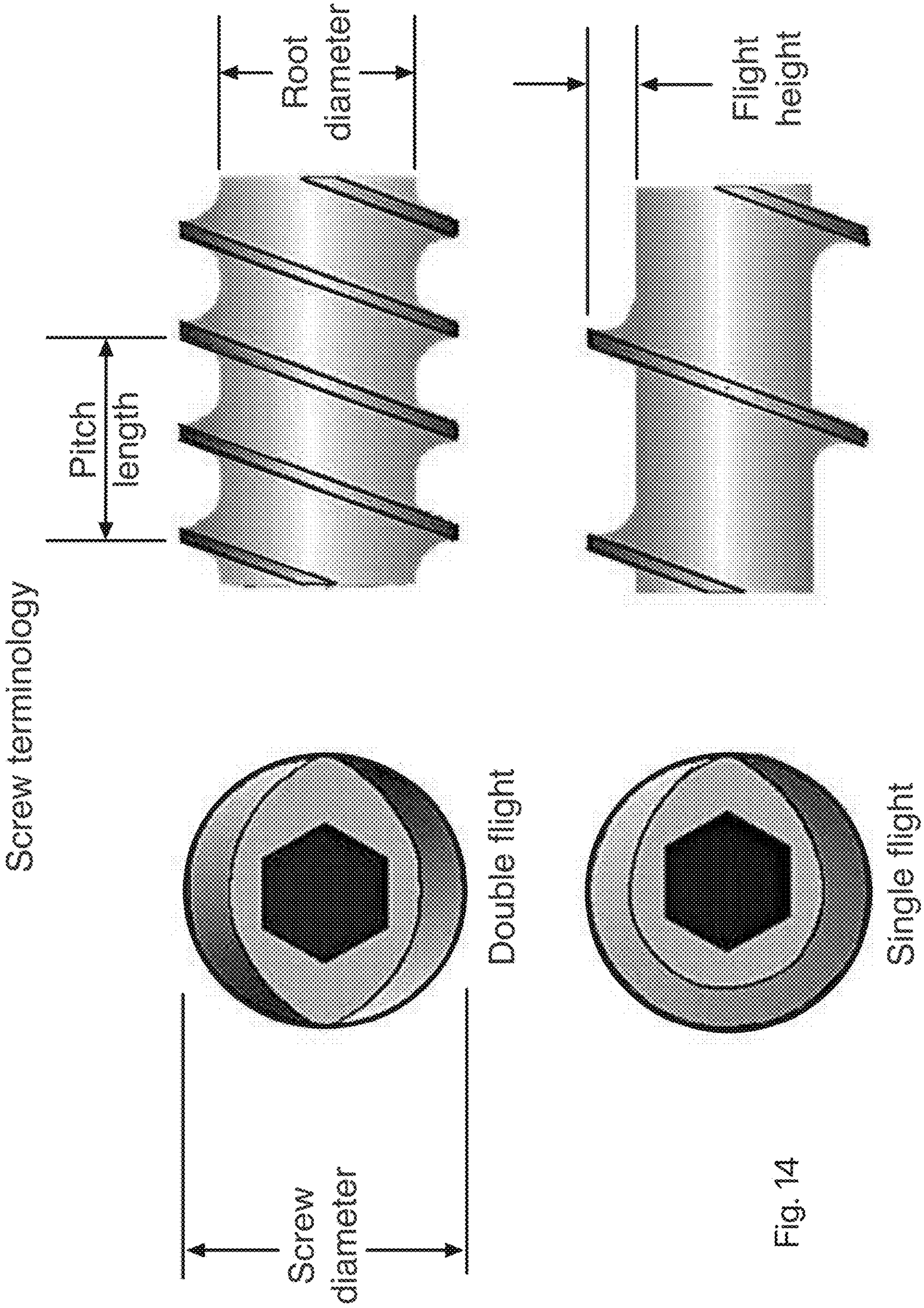
FIG. 14 provides a description of the screw terminology using a single-screw extruder screw elements.
Figure 15:
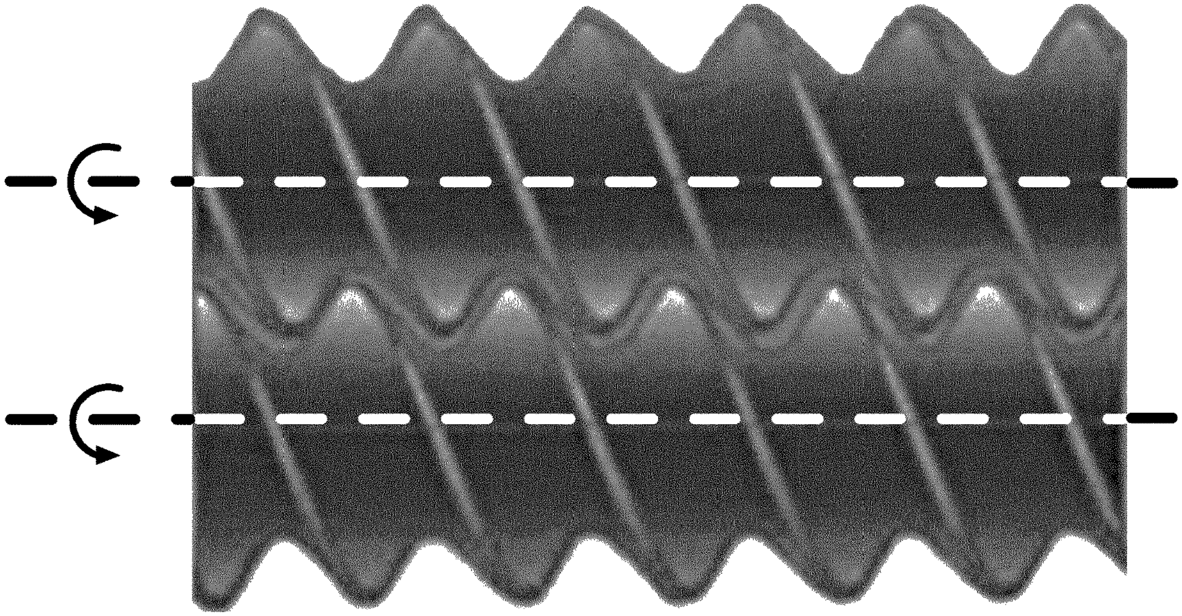
FIG. 15 shows a diagram illustrating schematically exemplary corotating and counterrotating intermeshing screws.
Figure 15:
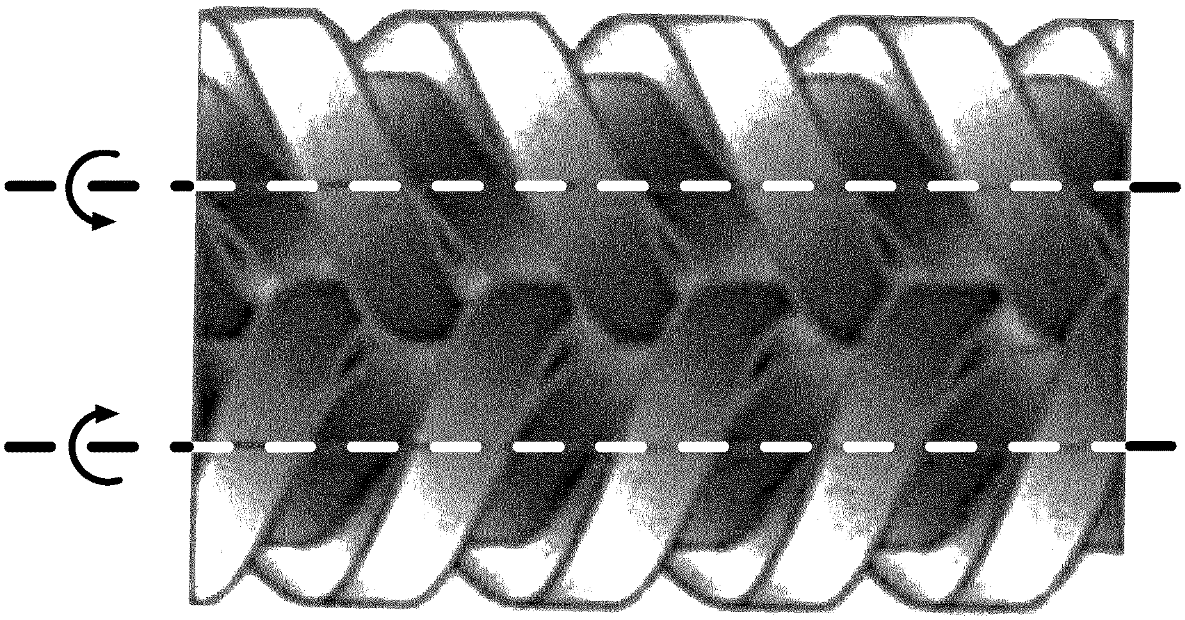
Figure 16:
FIG. 16 shows a diagram illustrating schematically exemplary intermeshing corotating double flight screws and a 45° kneading block.
Figure 17:
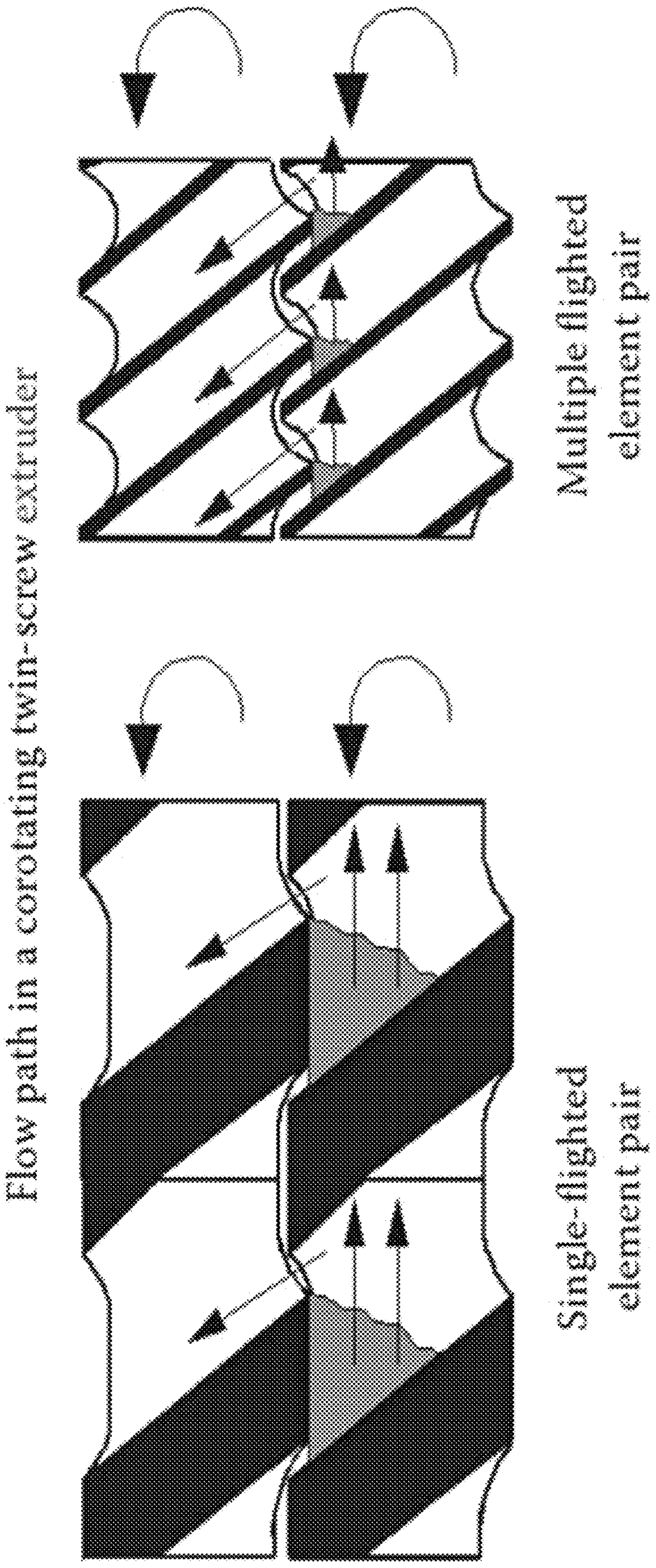
FIG. 17 shows a diagram illustrating schematically exemplary corotating screws showing open channel in the intermeshing region.

Furthermore, the digital controller 502 comprises a machine learning unit 510 monitoring and classifying input parameter values 200 patterns and adapting the operational setting parameter values 208 of operational units 105 of the feeder 101 and/or the extruder 102 and/or the shaping opening 103 and/or the collection means 104 to align measured material characteristics parameters values 202 of the extrudate 300 within the predefined tolerance ranges. The machine learning unit 510 can e.g. realized by comprising a Deep Learning (DL) structure e.g. comprising one or more Neural Network (NN) structures as illustrated in FIG. 7. The one or more Neural Network (NN) structures can e.g. comprise an input layer 601, at least one hidden layer 602 and an output layer 603; and/or one or more statistical modelling structures providing output parameter values 213 based on the input parameter values 200 indicating parameter values adaptions required to align the measured material characteristics parameters values 202 of the extrudate 300 within the predefined tolerance ranges. The machine-learning based DL structure at least comprise a cascade of multiple layers of nonlinear processing units 512 for feature extraction 512*a* and signal transformation 512*b*, and wherein each successive layer uses the output of the previous layer as an input providing supervised learning at least for classification and/or unsupervised learning at least for pattern recognition. Supervised learning be separated into two types of problems when data mining: classification and regression: (i) Classification problems use an algorithm to accurately assign test data into specific categories. Or, in the real world, supervised learning algorithms can be used to classify spam in a separate folder from your inbox. Linear classifiers, support vector machines, decision trees and random forest are all common types of classification algorithms. Preferable the DL structure at least comprises a Convolutional Neural Network (CNN) as illustrated in FIG. 8, structure as deep neural network.

Regression is another type of supervised learning method that uses an algorithm to understand the relationship between dependent and independent variables. Regression models are helpful for predicting numerical values based on different data points, such as sales revenue projections for a given business. Some popular regression algorithms are linear regression, logistic regression, and polynomial regression. Unsupervised learning uses machine learning algorithms to analyze and cluster unlabeled data sets. These algorithms discover hidden patterns in data without the need for human intervention hence, they are "unsupervised"). Unsupervised learning models are used for three main tasks: clustering, association, and dimensionality reduction: (i) Clustering is a data mining technique for grouping unlabeled data based on their similarities or differences. For example, K-means clustering algorithms assign similar data points into groups, where the K value represents the size of the grouping and granularity. This technique is helpful for market segmentation, image compression, etc. (ii) Association is another type of unsupervised learning method that uses different rules to find relationships between variables in a given dataset. These methods are frequently used for market basket analysis and recommendation engines, along the lines of "Customers Who Bought This Item Also Bought" recommendations; (iii) Dimensionality reduction is a learning technique used when the number of features or dimensions) in a given dataset is too high. It reduces the number of data inputs to a manageable size while also preserving the data integrity. Often, this technique is used in the preprocessing data stage, such as when autoencoders remove noise from visual data to improve picture quality. The measured and/or captured input parameter value 200 pattern are classified and selected by means of convolutional layers 612 and pooling layers 613 of the CNN structure, the pooling layers 613 reducing the dimension of a feature map of the measured and/or captured input parameter value (200) pattern and thus reducing the processing complexity within the machine learning unit 510 to adapt the operational setting parameter values 201 of operational units 105.

Failures during the extrusion process are automatically detected by the machine-learning unit based on the measured and monitored input parameter values 200, wherein an alert signaling and/or steering signaling is generated upon detection of a predicted failure within the extrusion process. Preferable the digital controller 502 comprises a failures handling unit generating based on alert signaling and/or steering signaling an error signal. Operating setting parameter comprising the error signal for steering program logic 501, in particular, for setting an error function of the respective program logic controller of the respective operational unit 105. The failure handling unit is configurable for a given alert signaling and/or steering signal. Preferable the digital controller comprises a human machine interface for signaling alert signaling.

An extruder network 2 comprising two or more extruder systems 1 and a central digital controller 514 comprising a central repository 512 having at least one adaptive central digital database 513 containing structured data sets 515 for storing digital recipes and/or ingredients and/or products, and wherein at least one of the digital controller of the plurality of extruder systems 1 is to be given read and/or write access to the structured central data records 515 via the data transmission network 505 for selecting and/or adapting and/or generating the structured central data records 515, and wherein the central data records generated by an extruder system 1 have at least one data classification parameter 211 charactering this generating extruder system or factors influencing the generating extruder system 1. the data classification parameter 211, comprises the country of operation of the generating extruder system and/or the operator of the generating extruder system 1 and/or the generating extruder system 1 identification and/or the extruder type, in order to classify the centrally stored data records in the at least one central database with data classification.

I. Uniform Product Quality & Man Less Operation

Figure 18:
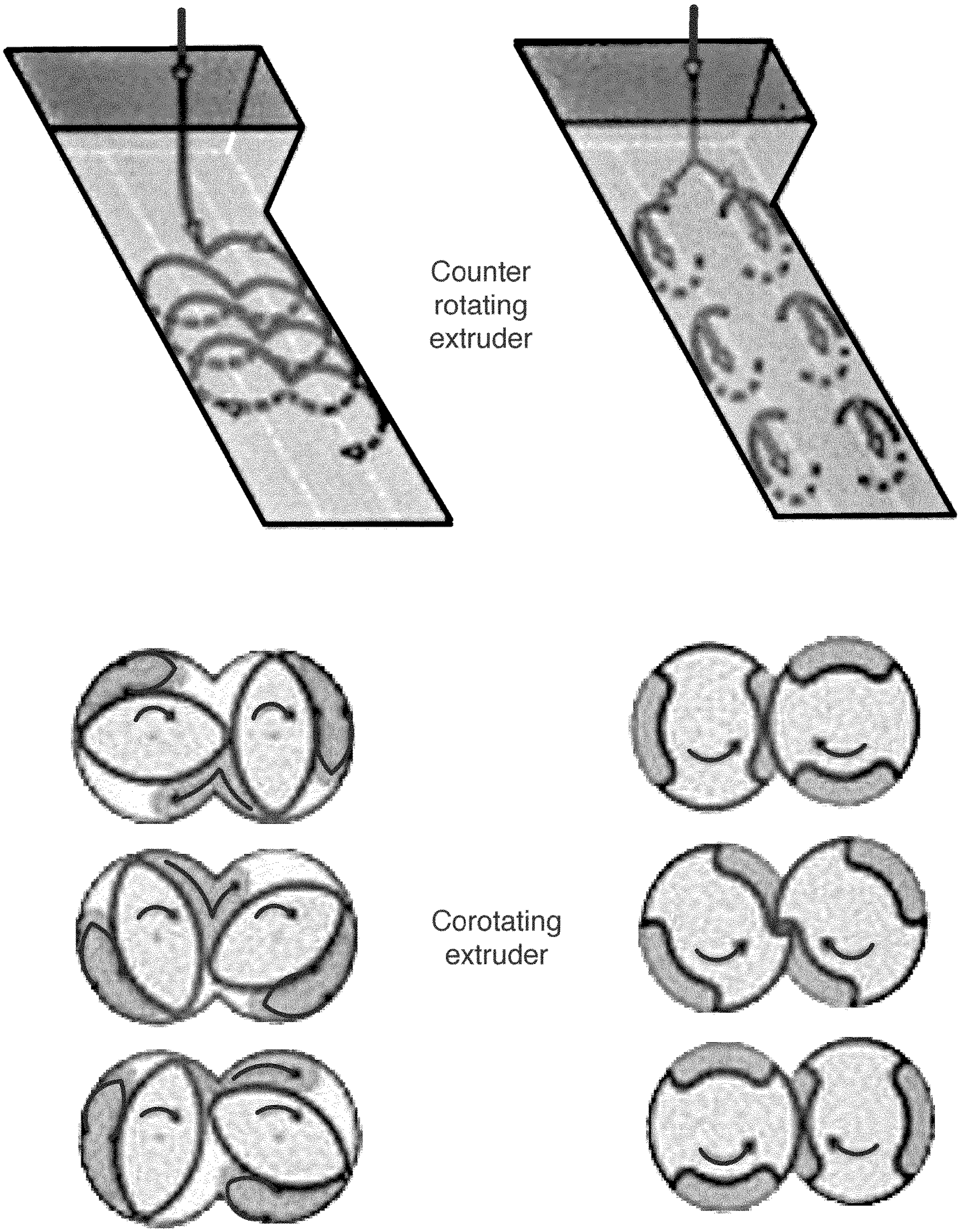
FIG. 18 shows a diagram illustrating schematically exemplary general flow patterns in corotating and counterrotating twin-screw extruders (two flight screws in both cases).
Figure 19:
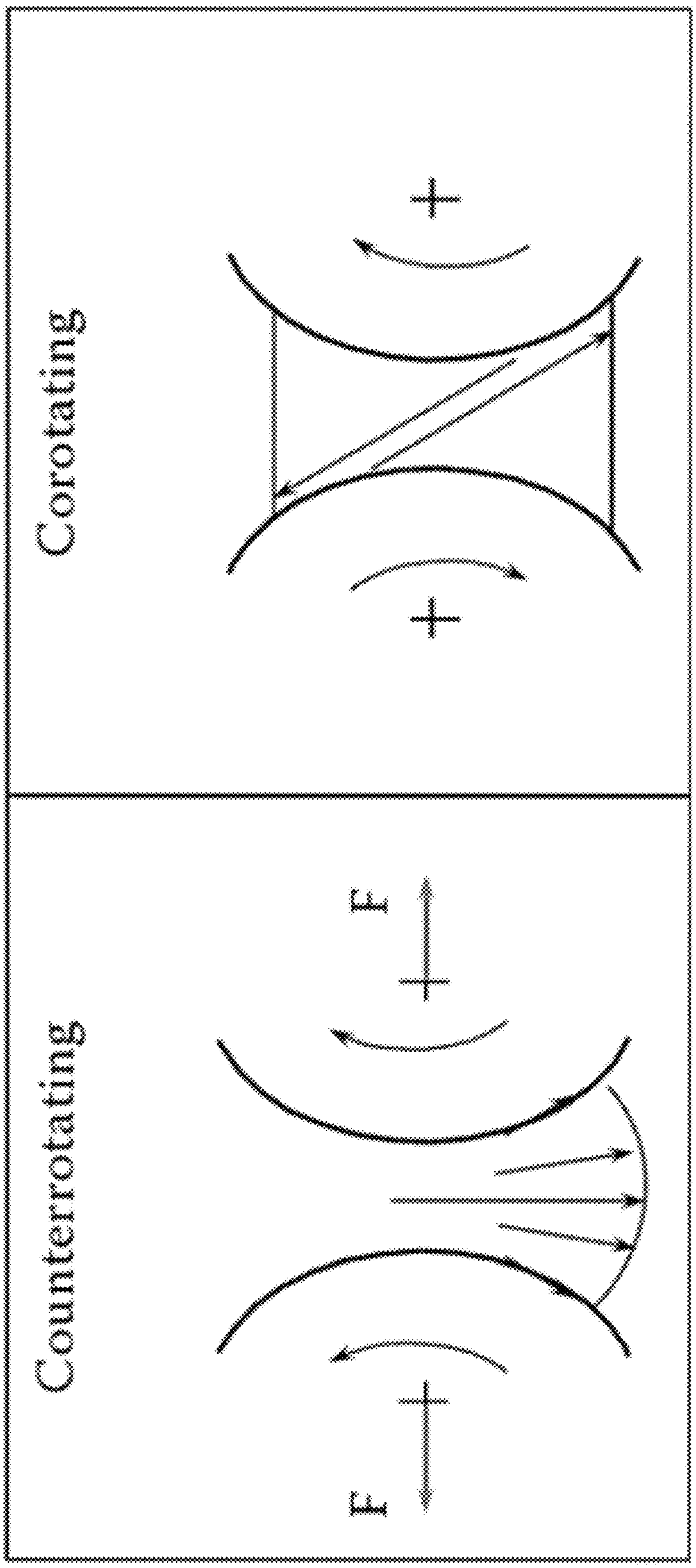
FIG. 19 shows a diagram illustrating schematically an exemplary shear stress profile in counterrotating and corotating twin-screw extruders.

Extrusion is a continuous thermo-mechanical process technology combining several unit operations like conveying, mixing, shearing, plasticization, melting, cooking, and polymerization. Those numerous unit operations lead to complex correlations between several variable parameters and their respective process response and thus, determining the product quality (see FIG. 18). The current situation requires time- and cost-intense offline analysis, well-educated operators, and lab personnel to evaluate product quality and to adjust the process and thus product quality accordingly. Due to the nature of offline analyses, process adjustments are done time-delayed only. Hence, online measurements to evaluate product quality in real-time would allow immediate process adjustments and consistent product quality. Further, offline analysis would be reduced lowering the expenses on both, analysis, and personnel.

The set-up of an extruder and its periphery accounts for the fixed parameters being screw configuration, barrel length, cooling die geometry, and cooling die inserts. Variable parameters are temperature, screw speed, moisture addition rate, solid addition rate, oil addition rate, and locations of liquid addition like water, oil, flavors, mineral solution, acids, caustics. Besides that, the introduction of nitrogen (N2) as part of aeration technology is a variable parameter as well. The variable parameters determine the process response like specific mechanical energy (SME), thermal stress (STE), pressure at endplate, temperature at endplate, residence time (distribution), weighted average total strain (WATS, Forte), and flow profile/velocity at cooling die exit. All the previous mentioned process responses are quantities that are measurable. The SME is a calculated quantity from power consumption/torque measurements recorded from the main drive of the extruder, STE is calculated based on inlet and outlet temperatures, and volume flows of the heating cycles, pressure and temperature at the endplate are measured by pressure and temperature probes, flow profile and velocity is accessible by HD-cameras and underlying video analysis programming, residence time (distribution) is measured by using an inert indicator, e.g. colorant which is then also recorded by HD-cameras and tracked over time, the WATS (weighted average total strain) is a quantity calculated using fixed parameters (screw configuration, barrel length, cooling die geometry, and inserts), the screw speed and the residence time. As an embodiment variant, the ML-based or AI-based core engine 11 comprises an AI-controlled loop to alter the process response by adapting the variable parameters. Further, complex interactions among the process response and variable parameters with the product quality of the extrudates can be established. Since a change of one single variable parameter can have more than one effect on the process response, and thus affecting the product quality without clear correlation, Artificial intelligence, as realized by the invention, is a powerful tool to unveil these interactions for both daily production and quality assurance, but also for R&D purposes. Exemplary for that, there are prior art systems intended to measure and study the effect of SME on final product's anisotropy, however, it turned out, that when increasing the screw speed to change SME, also the temperature at the endplate was increased. Hence, by prior art systems, it was not possible to correlate the observed effects on product quality clearly.

The product quality of wet extrudates is most described by its texture, anisotropy, density, chemical composition, color, and degree of polymerization. To set-up an artificially controlled loop for real-time adjustments of the variable parameters the product quality must be analyzed online. The following table (table 2 is a non-exhaustive list) is showing applicable methodologies to enable consistent product quality throughout production.

| Product quality | Possible online methodology |
|---|---|
| Texture | Cutting force (torque) of cutter at die outlet |
| Anisotropy | Ultrasonic transducers to measure phase velocity and attenuation coefficient. The phase velocity and attenuation are correlated with offline samples exhibiting different anisotropic qualities being analyzed by tensile testing or compression tests. |
| Density | Ultrasonic transducers to measure phase velocity and attenuation coefficient. The phase velocity and attenuation are correlated with offline density measurements e.g., water displacement method. |
| Chemical composition | Near infrared spectroscopy (NIR)<br>Raman spectroscopy |
| Color | HD-Camera, image analysis algorithm<br>Color spectrophotometers (e.g., L*a* b*, CIELAB) |
| Degree of polymerization | Ultrasonic transducer/Raman spectroscopy/NIR to measure specific signal in the product flow. Both techniques must be correlated to protein extractability offline to calibrate the sensors accordingly. |
| Thickness | Ultrasonic transducers |

Table 2 Shows Examples of Product Quality and Applicable Online Methodology

If it is not possible to directly measure some of the above stated product qualities, mapping needs to be achieved between measurable process parameters such as temperatures, pressures, and SME, as well as the above stated methods towards the stated product quality indicators. As an embodiment variant, machine learning modelling structures are e.g. used to perform the appropriate mapping.

The resulting final product quality indicators can be used for a multitude of different applications inside the extrusion process, for example as validation data of AI applications used previously in the process chain, such as automated process optimization, to define process targets by operators instead of using conventional recipes where it then is possible to decide between good and bad product, ingredient databases where ingredients can be mapped to achievable products.

II. Automated Recipe Management & Optimization

Figure 28:
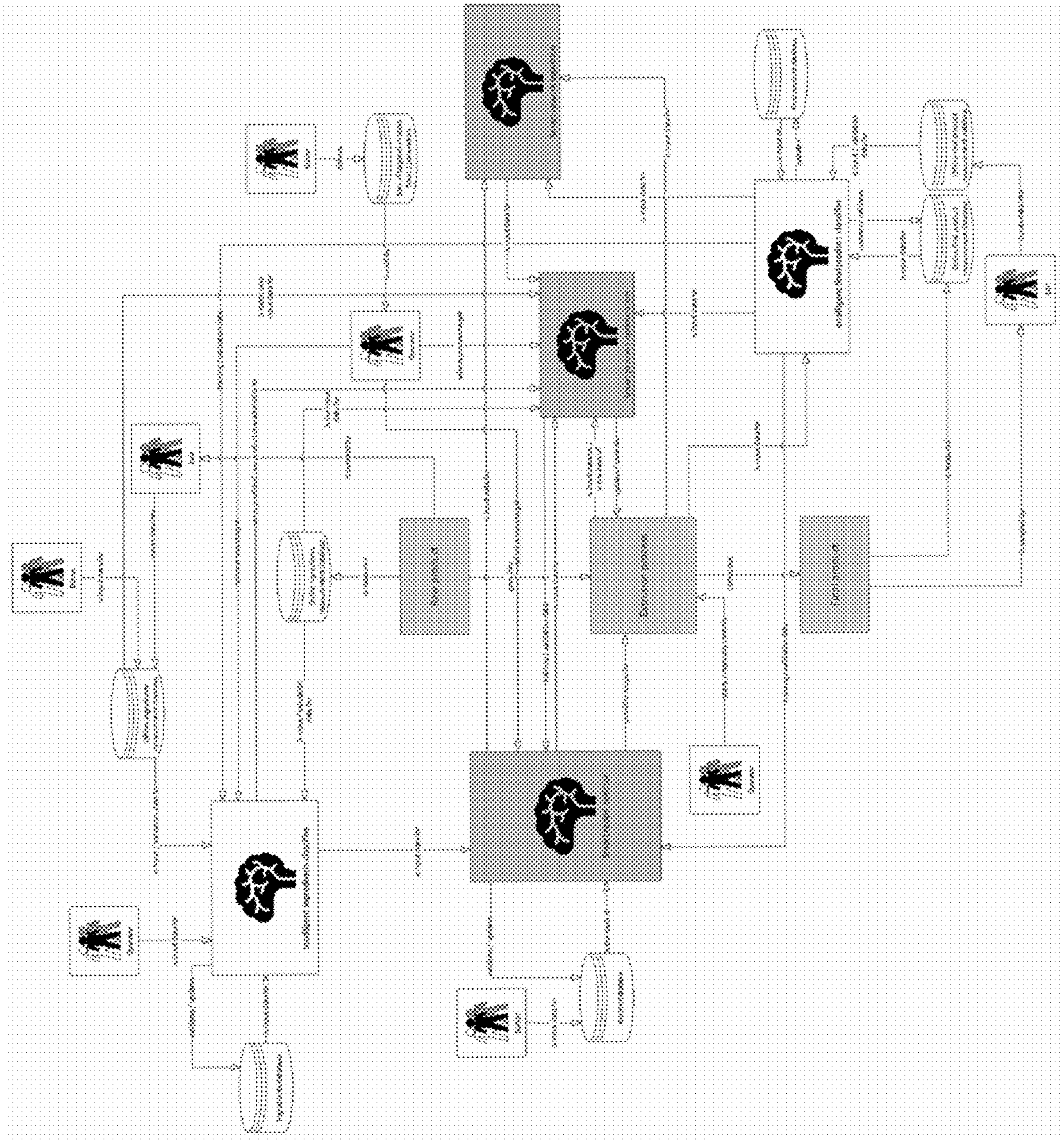
FIG. 28 shows a diagram illustrating schematically an exemplary AI-based or ML-based automated recipe management and optimization in an inventive extrusion process and inventive extrusion system.

Regarding automated recipe management and optimization, there are various technical problems which are solved by the inventive extruder and extrusion system: (i) In the prior art systems, it is typically unclear whether the maximum potential of any extrusion machine has been reached; (ii) In the prior art systems, operators tend to have less know how as well as customers tend to have less know how; (iii) In the prior art systems, optimizing a recipe is typically very time consuming. All happens in the head of the technologist, i.e. empirically; (iv) In the prior art systems, optimized product characteristics are typically not clear and need to be defined approached by an empirical approximation process; and (v) In the prior art system, recipe management and optimization is still needed to be embedded in the extrusion process, i.e. forming a part of the standard extrusion process. FIG. 28 shows a diagram illustrating schematically an exemplary full overview with structures applicable to achieve the inventive automated recipe management and optimization.

(a) Smart Recipe Selection

Figure 20:
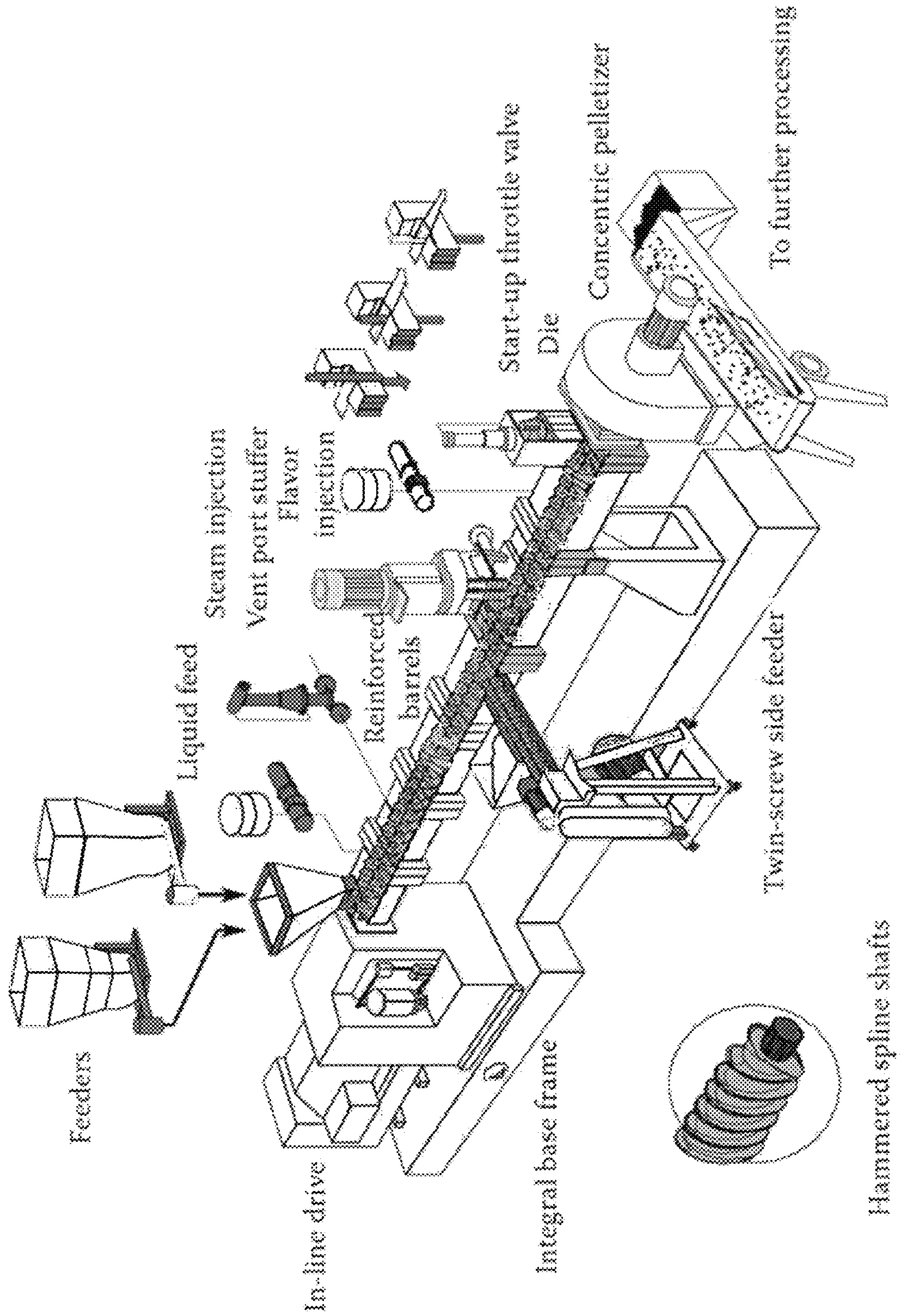
FIG. 20 shows a diagram illustrating schematically an exemplary possible arrangement of a corotating twin-screw extruder for a multi-process food extrusion system.

Smart recipe selection is the process of selecting a fitting recipe out of a set of predefined recipes based upon given descriptors of a product (see FIG. 20). The descriptor is defined as set of different characteristics of a product. Example characteristics would be color, fibrosity etc., Such sets would be nameable (in the context of high moisture extrusion) like "Chicken" or "Fish" etc., Based on sets, included characteristics can be altered by the operator after selection. For example: The operator changes the color of the final product.

The selection process of the recipe builds up on different data sources:

- Recipe database RDB.
- Intelligent ingredients classification IIC
- Intelligent final product classification IFPC (described in a later chapter)
- Process target PT (described in a later chapter)
- Selection of the operator Recipe Database (RDB)

Figure 21:
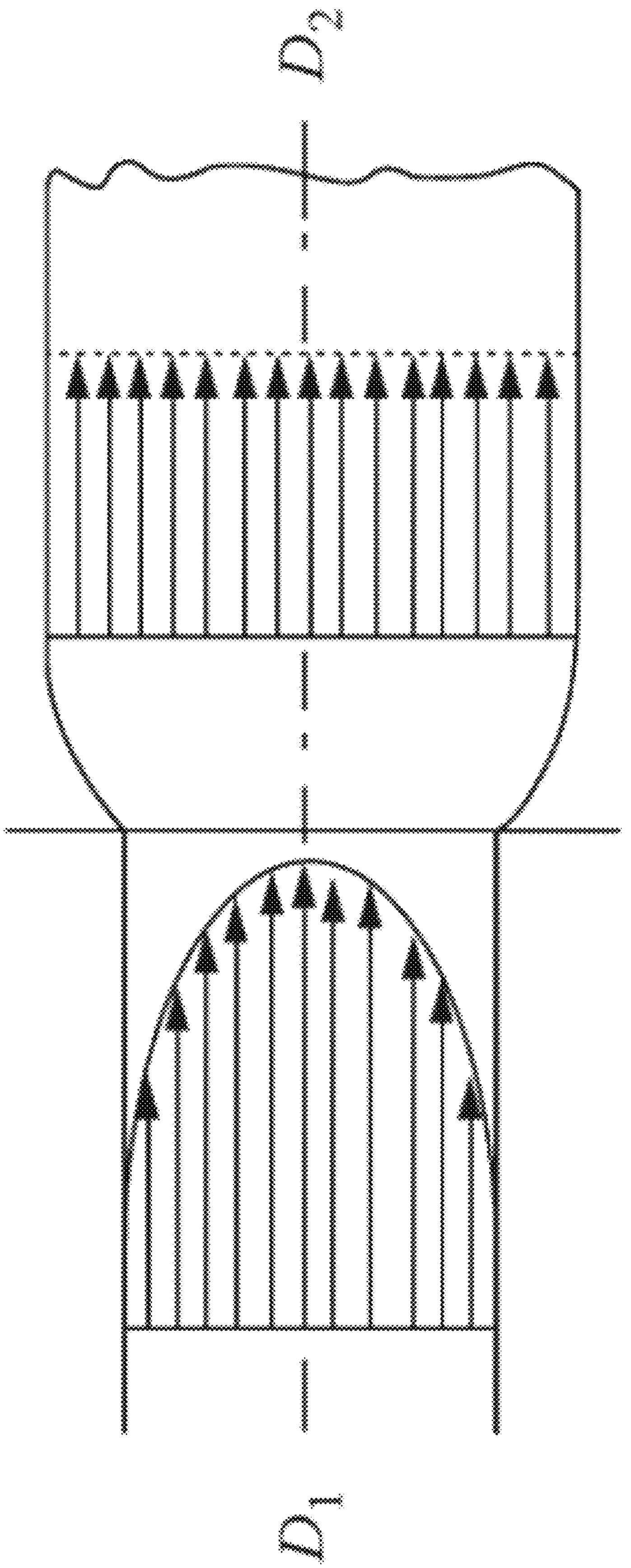
FIG. 21 shows a diagram illustrating schematically an exemplary extrudate swelling at the die exit.

The RDB is a database maintained by the inventive system that can be used by the Operator to search/download new recipes (cf. FIG. 21). The database acts as storage for the automatic recipe selection, which validates and updates the recipe data by inserting insights of process runs that were recorded. It is based on ingredients characteristics such as color, fibrosity etc. and maps to achievable final product characteristics.

Ingredients Classification (IIC)

The IRPC system yields data on raw materials used for the extrusion process. Its target is to act as the following:

- an input data for the automatic recipe selection by mapping types of raw ingredients based on possible achievable product characteristics to the wished product of the customer/operator. It acts as an advisor: The customer/operator can either choose a specific recipe and the IIC will return whether with the given ingredient, the wished final product is feasible, or itself give a proposal on which ingredients should be used for the final product to receive the best results.
- An input for the smart process optimization system through predicted/anticipated raw product data.

Figure 22:
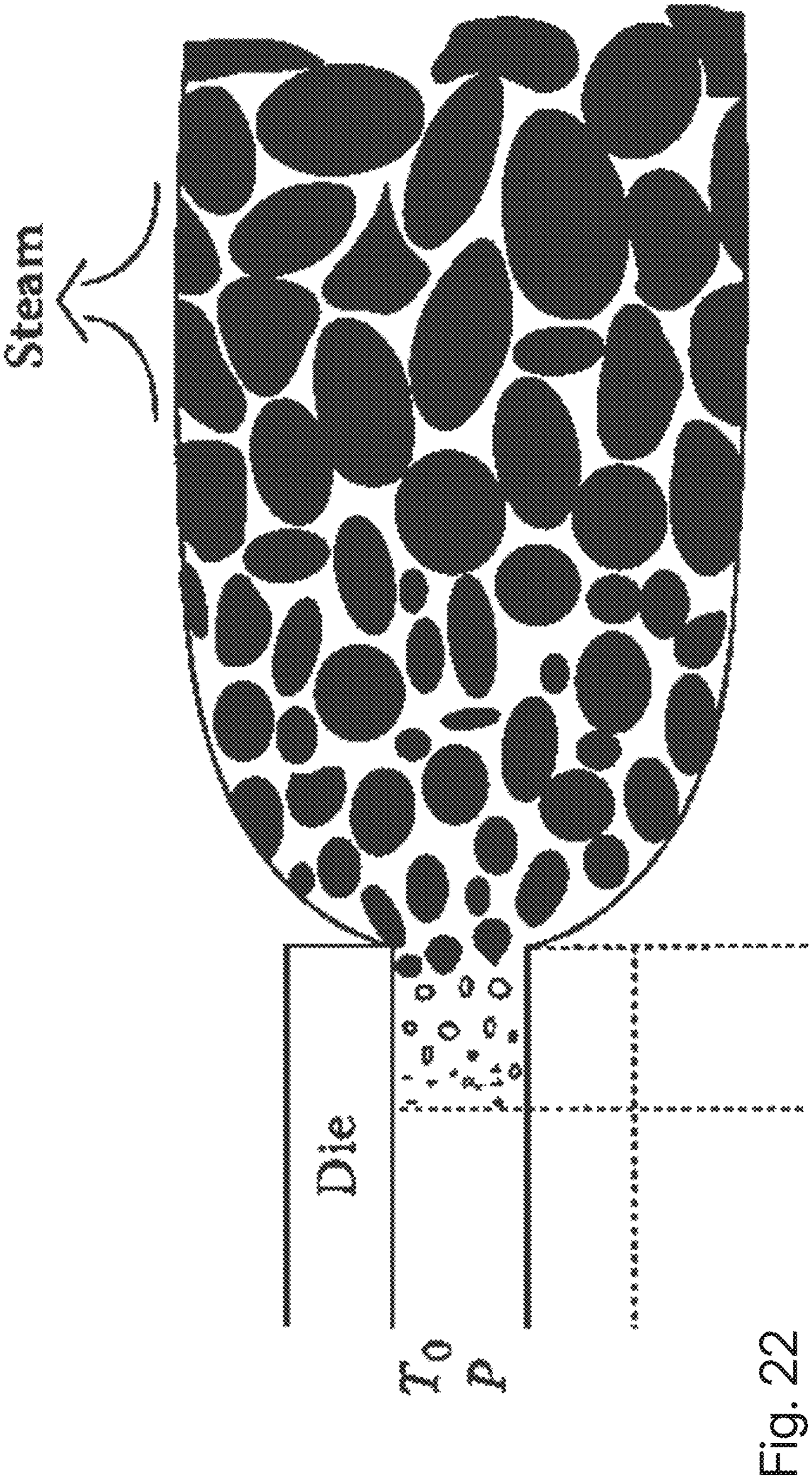
FIG. 22 shows a diagram illustrating schematically an exemplary product expansion after exiting the die due to vapor pressure difference.
Figure 23:
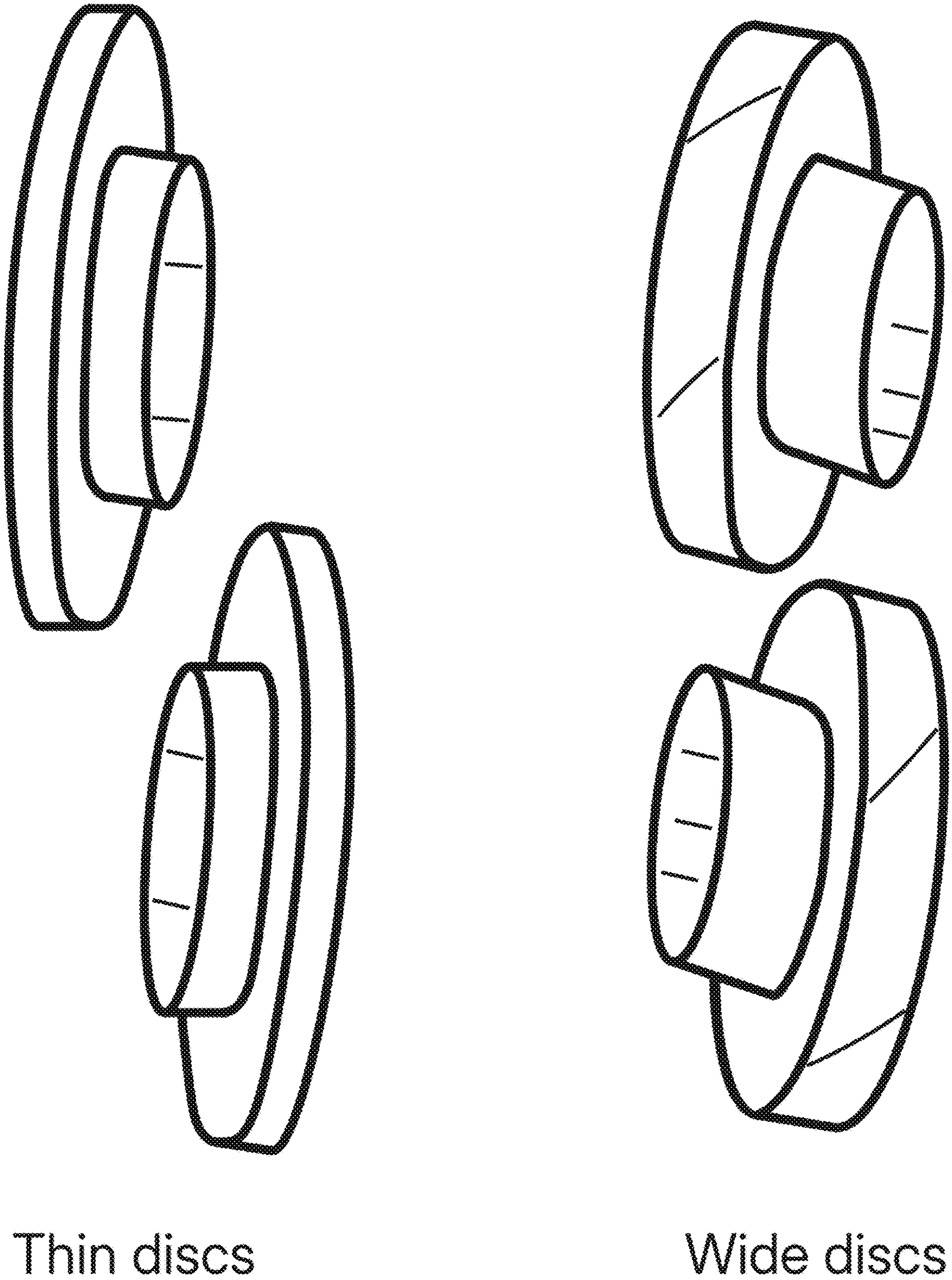
FIG. 23 shows a diagram illustrating schematically an exemplary intermeshing orifice plugs (discs) for severe screw restriction and dispersive mixing.
Figure 24:
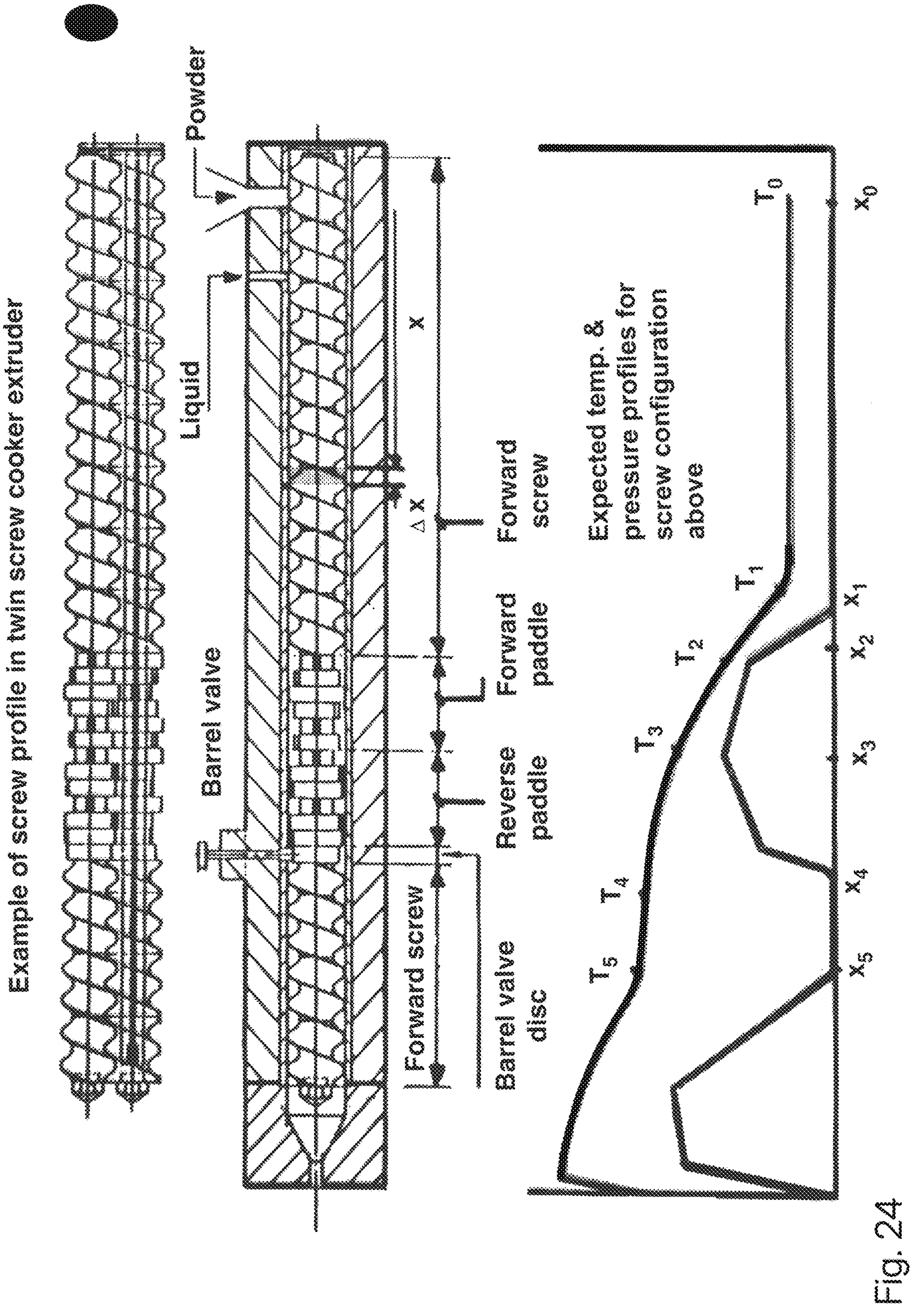
FIG. 24 shows a diagram illustrating schematically an exemplary twin-screw extruder showing the simulated pressure and temperature profiles within the extruder.
Figure 25:
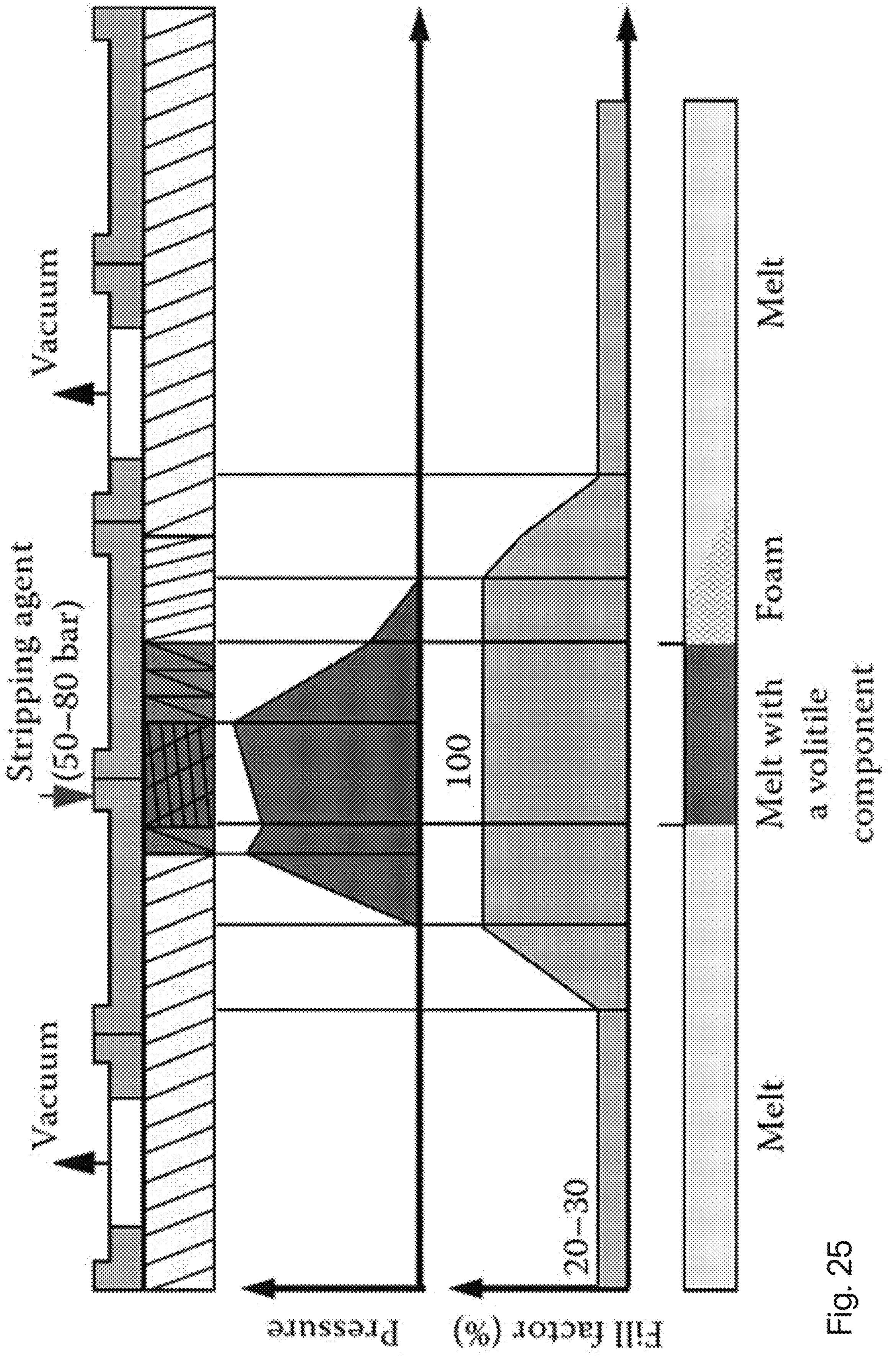
FIG. 25 shows a diagram illustrating schematically an exemplary screw design with two venting ports for degassing of volatiles.
Figure 25:
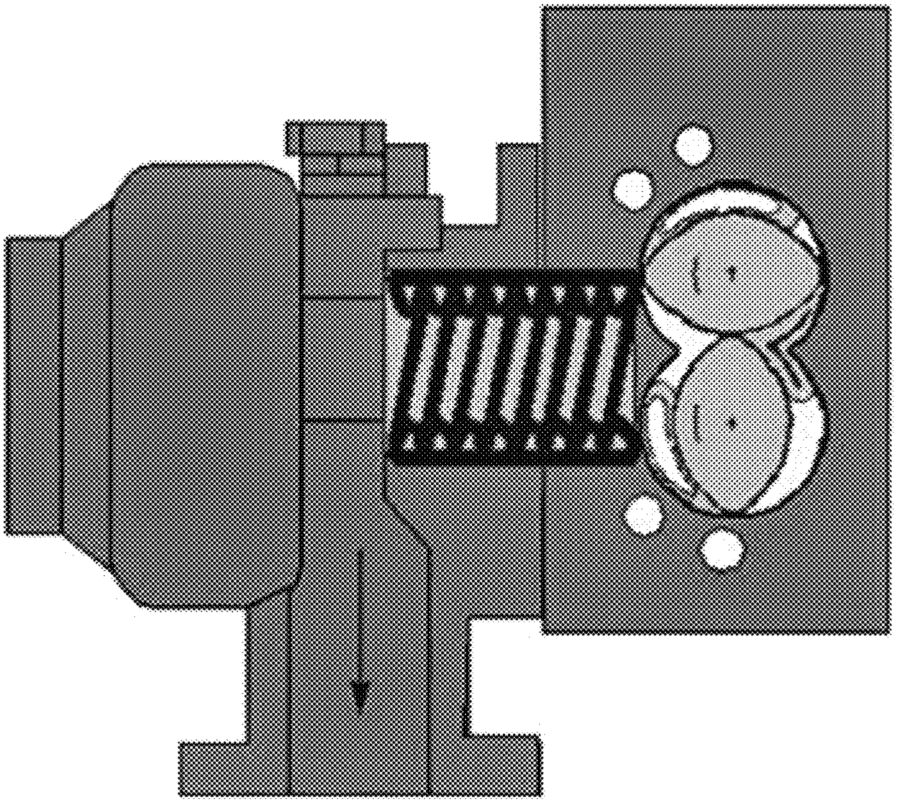

It can be fed from the following sources:
The ingredients database IDB (see below).
online raw product analysis by inline devices such as NIR.
offline raw product analysis such as a lab
the final product classification IFPC that returns observed final product characteristics
the process target selected by the operator
an operator inserting raw product information manually The IRPC uses measured online and offline raw product analytics data to detect deviations in the product. These deviations are stored in the raw ingredients database for training and validation of the IRPC model as well as its input data from the database. The IRPC sends its predicted raw product characteristics to the automatic process optimization, therefore taking influence into the process (see also FIG. 22).

Ingredients Database (IDB)

The ingredients database, maintained by the inventive system, contains entries to raw product characteristics such as moisture, protein content etc.; process target information such as $CO_2$ relevance etc. that can be opposed by measured outcomes of the final product classification that uses product characteristics as classification.

Smart Process Optimization (SPO)

Smart process optimization is the act of adjusting parameters of the extrusion process during production based on given targets, where targets are process targets (PT) as well as product targets (given by the recipe). The optimization process has to fulfill or exceed the targets given by the operator. The process optimizer is restricted in his optimization by deviation of product target, where the target is either a machine recipe or product characteristics. Process targets (PT) come in form of pre-engineered chains of commands.

SPO uses the following data sources:
The intelligent final product classifier (IFPC) returns the measured final product characteristics that leaves the process.
The extrusion process yields live data from the process, such as product temperatures at given locations in the process chain, pressures of endplate and (cooling) dies, SME etc., These values act as deviation limit if recipe deviation is used.
The smart recipe selector (SMR) sends final product characteristics to be achieved.
The intelligent ingredients classifier (IIS) sends its predicted raw product characteristics information.
The online/offline product measurement sends live/batch ingredient information
The operator selects a process target (PT)
The smart rework ingestion that inputs data on possible rework to be fed into the process.

The intelligent process optimizer can run in two different modes: Given that a smart recipe selector as well as the final product classifier is available, it can run in characterized product mode, where it controls the process based on achieved product character. Given that no smart recipe selector is available or no final product classifier is available, it could run in actual data only mode, where it would optimize based on inline measurement.

Intelligent Final Product Classification (IFPC)

The intelligent final product classifier uses sensorics' information retrieved from the final product out of the extruder to map the product to final product characteristics. As information sources, the final product classifier can e.g. use data from the process itself (Temperatures, Pressures, SME etc.), as well as online final product measurements. To verify its measurements and to train the system, offline final product measurements can e.g. be used.

Its output data, that reflects the characteristics of the final product, is reused by a multitude of systems:
The smart process optimizer that uses this data to regulate the process. The measurement is used as quality metric where the target product characteristics are trying to be achieved.
The smart rework ingestion process where the analysis of the not-yet-usable product is used to analyze how much of it can be fed back into the process right away to reduce waste
The intelligent ingredients classifier that uses the output of the IFPC to map ingredients to achievable final products.

Process Targets (PT)

Figure 26:
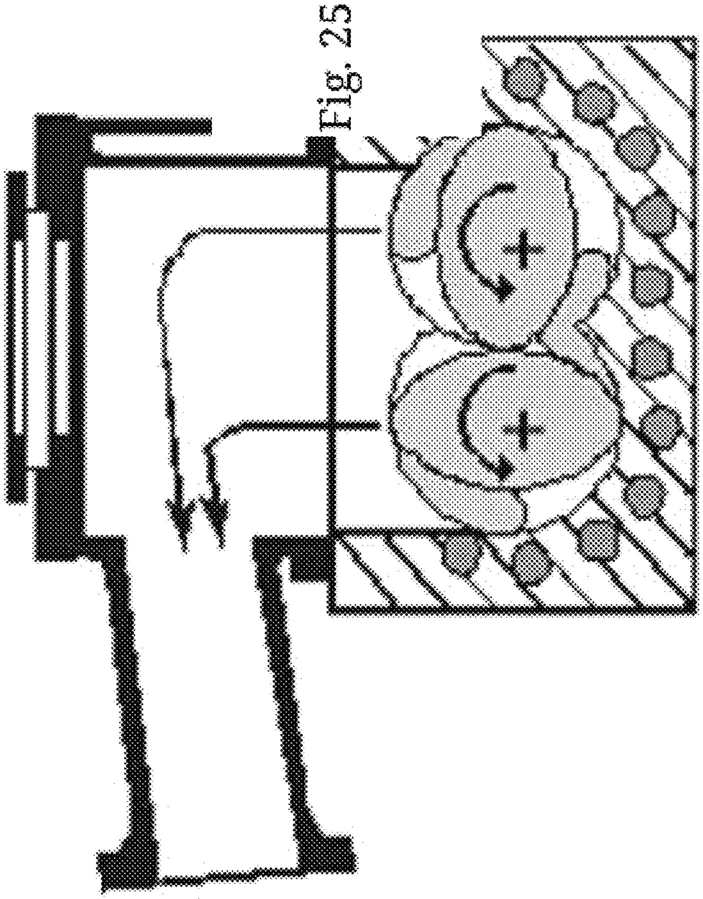
FIG. 26 shows a diagram illustrating schematically an exemplary vent port adaptor design.

Process targets are sets of process commands that affect how the process is run (see FIG. 26). Possible process targets are:
Minimizing energy consumption of the process
Maximizing the throughput of the process
Minimizing $CO_2$ emissions Process targets work as inputs for the following systems:
Intelligent ingredients classifier, where they have an influence on its advisory function based on the target. For example, if the target $CO_2$ emissions is chosen, ingredients will be selected based on their $CO_2$ relevance.
Smart recipe selector, where recipes are proposed and selected based on their fulfillment of specific targets
Smart process optimizer, where command chains have an influence on the production process itself.

Automated Rework

Figure 27:
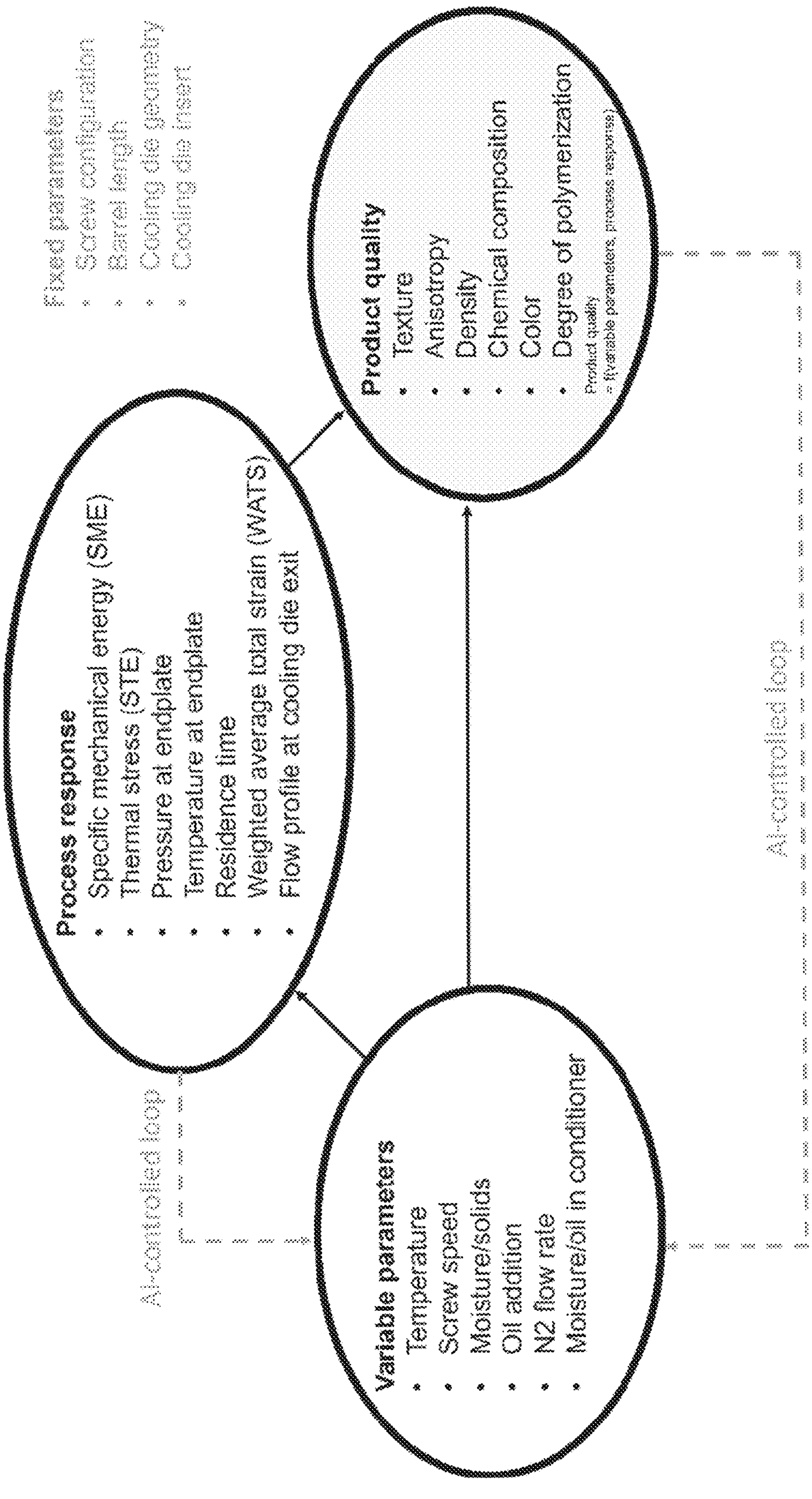
FIG. 27 shows a diagram illustrating schematically an exemplary extrusion process realized by the typical continuous thermo-mechanical process technology combining several unit operations like conveying, mixing, shearing, plasticization, melting, cooking, and polymerization. Those numerous unit operations lead to complex correlations between several variable parameters and their respective process response and thus, determining the product quality.

Smart rework ingestion is the process of using non-usable product coming out of the extrusion process again by feeding the product back into the process, where the amount of product to be reused can be varied (see FIG. 27). This service gathers its input data from the following sources: The extrusion process itself, as well as the final product classification, that yields information on the products state. Whether product can be fed back into the extrusion process depends on the following parameters:
Product characterization values set as target. Product that does not achieve the target can be reused.
Product moisture. If the product is too moist, feeding back is not possible without the product sticking.
Product chunk size. To big pieces will not be transportable.

Rework ingestion will have influence on smart process optimization. The product cannot be understood as normal "ingredient" of the process. Smart process optimization will receive a proposal of amount of rework to be ingested from the smart rework ingestion controller.

III. Ingredient Database (Cloud-Based) to Optimize Process Based on Historical Data Extrusion allows to process a wide range of different ingredients. The ingredients and their characteristics are dependent on several environmental factors, but also on applied process steps during their production. Therefore, ingredients are prone to vary in their composition and functionality.

For high moisture extrusion of meat analog products, commonly different protein sources are used, being flours (protein about 50%), concentrates (protein 60-80%), and isolates (protein >80%), or even intermediate products like slurries from their production processes. In an embodiment variant, to enhance the intelligent extruder system, an ingredient database is created to optimize the extrusion process continuously. Besides different protein sources and water, formulations also include carbohydrates (i.e., starches, fibers, sugars), fat/oils, minerals, salts, acids, caustics, flavors. A comprehensive ingredient database must be compromised of compositional and functionality-related properties of the respective ingredient.

First, an ingredient is analyzed to determine its chemical composition being solid content (moisture content), protein content, fat content, carbohydrate content, and minerals.

Further, specific knowledge about protein fractions of an ingredient is of high importance as they determine the potential of the later texturization ability during the process. More specifically, the inter- and intramolecular interactions during texturization are a function of a specific amino acid profile. The most interactions among proteins upon high moisture extrusion are non-covalent interactions like hydrogen bonding, hydrophobic interactions, van der Waals interactions, and electrostatic interactions. In addition, sulfur-rich amino acids, in particular cysteine, form covalent disulfide bridges which are the dominant interactions to form thermo-stable high moisture extrudates. Consequently, a detailed analysis of the ingredients is required. Besides knowledge about the amino acid profile, advanced knowledge like denaturation temperature and kinetics, and aggregation temperature and polymerization kinetics are part of the ingredient database. Consequently, the ingredient database facilitates recipe development and gives insights whether an ingredient takes part in texturization or is acting as an inert filler in the final product.

Further analyses can be required to identify the specific carbohydrates to distinguish between sugars, fibers, and starches. For starch-rich ingredients it can be important to include knowledge about amylose-amylopectin ratio and gelatinization kinetics, and degradation. For sugar-rich ingredients it is of importance to include knowledge about melting temperatures, and caramelization.

In general, characteristics of the ingredients like true density, particles size distribution, flowability, wettability, dispersibility, water absorption, ionic strength and pH of slurries, viscosity, elastic modulus, phase transition from dispersion (viscoelastic liquid) into plasticized mass (viscoelastic solid), as well as time, temperature, and strain dependence of all these parameters are required for the ingredient database. The ingredient database is a continuous growing database which facilitates new ingredient evaluation and new recipe development. Further, optimized variable parameters for the extrusion process can be derived.

Considering the above list of required fluid and solid properties and the lack of detailed understanding of cooking, kneading, and conveying, it is unlikely that physics-based models of the full extrusion process will be available any time soon. However, notable attempts are currently being made on subsystems of the extrusion process, in particular the die flow of wet texturized proteins.

The quantification of many of the above-mentioned properties is a challenge on its own because laboratory devices often cannot mimic the real process, and online measurements are inaccurate since available sensors are either inadequate or unsuitably located. Often, only pressure and surface temperatures are available when viscosity and density values are needed to feed the material model.

Modelling viscoelastic flows in industrial processes with complex and interlocking geometries is exceedingly difficult and time consuming, but in principle feasible. Including phase transformation of complex fluids and semi-solids requires innovative simulation techniques, such as meshless methods. This is currently not the industry standard and an ongoing academic field of research. In the prior art, three software codes are known to have been used for similar challenges, or to be able to capture the main physics of such processes.

However, such simplified modelling approaches of the extrusion process could achieve only limited success. From today's perspective, creating material models and measuring corresponding material properties would require a vast amount of resources and time to get to the point where it is usable industrially. Therefore, data-based methods offer an alternative and more accessible way to (try to) relate input parameters with result quantities and build a "model" that would eventually allow to predict and optimize the process.

IV. Optimized & Fully Automated Startup Time

The today's situation for an extrusion process requires an individual start-up procedure by each operator resulting in a waste of raw materials and time (about 30 min), as start-up phase is evaluated objectively only. Hence, the inventive intelligent extruder system enables a more precise and optimized start-up phase when considering measured quantities to evaluate texture (e.g., cutting force at die) online and process responses (e.g. pressure at endplate). For example, the pressure probe at the endplate (transition from extruder barrel to cooling die) is a suitable quantity to rely on for automation of the start-up process. When the pressure at endplate rises above 2 bar, a filled screw section is indicated. Hence, in this embodiment variant, the production phase is initiated automatically.

In addition, online measurement (chemical composition e.g., by NIR) of the slurry during start phase enables its use as rework. For example, as an embodiment variant, the rework is injected into the barrels. In this case, the intelligent extruder system relies on the ingredient database to adjust variable parameters and finally preserve consistent product quality during production.

V. Safe Production

It is known in the prior art that plant-based meat analogues are more perishable and more susceptible to spoilage compared to meat due to high protein and moisture content as well as neutral pH, therefore more attention is needed in meat analogue production. In particular, an effective food safety management system is of great importance to ensure the safe production.

Online/inline CCP monitoring

Critical Control Point (CCP):

Temperature in the end plate

A temperature sensor is installed in end plate to record the temperature every 1 second. The real-time temperature curve will be displayed in a dashboard, which has following functionalities:

- Calculates the Log 5 reduction conditions based on the recipe
- Sets critical values (temperature, duration etc.) for key food safety parameters based on the Log 5 reduction conditions
- Alarm & warning functions when the temperature is below the critical threshold (CCP errors)
- Display a summary of alarms and a list of all time windows/time periods when the CCP errors occur
- Each alarm and CCP error can be selected for further analysis.
- Ability to trace the product to the errors and see what happened with the product as well as the actions taken (e.g. equipment cleaned and sanitized etc.)
- Generates reports showing CCP, critical limits, CCP errors, recipe, time frame, operator, corrective actions etc.

Online/Inline CCP Control.

When CCP errors occur and no corrective actions are taken from the operator, the control system will automatically adjust the process to increase the temperature to be above the critical threshold based on the recipe.

Figure 30:
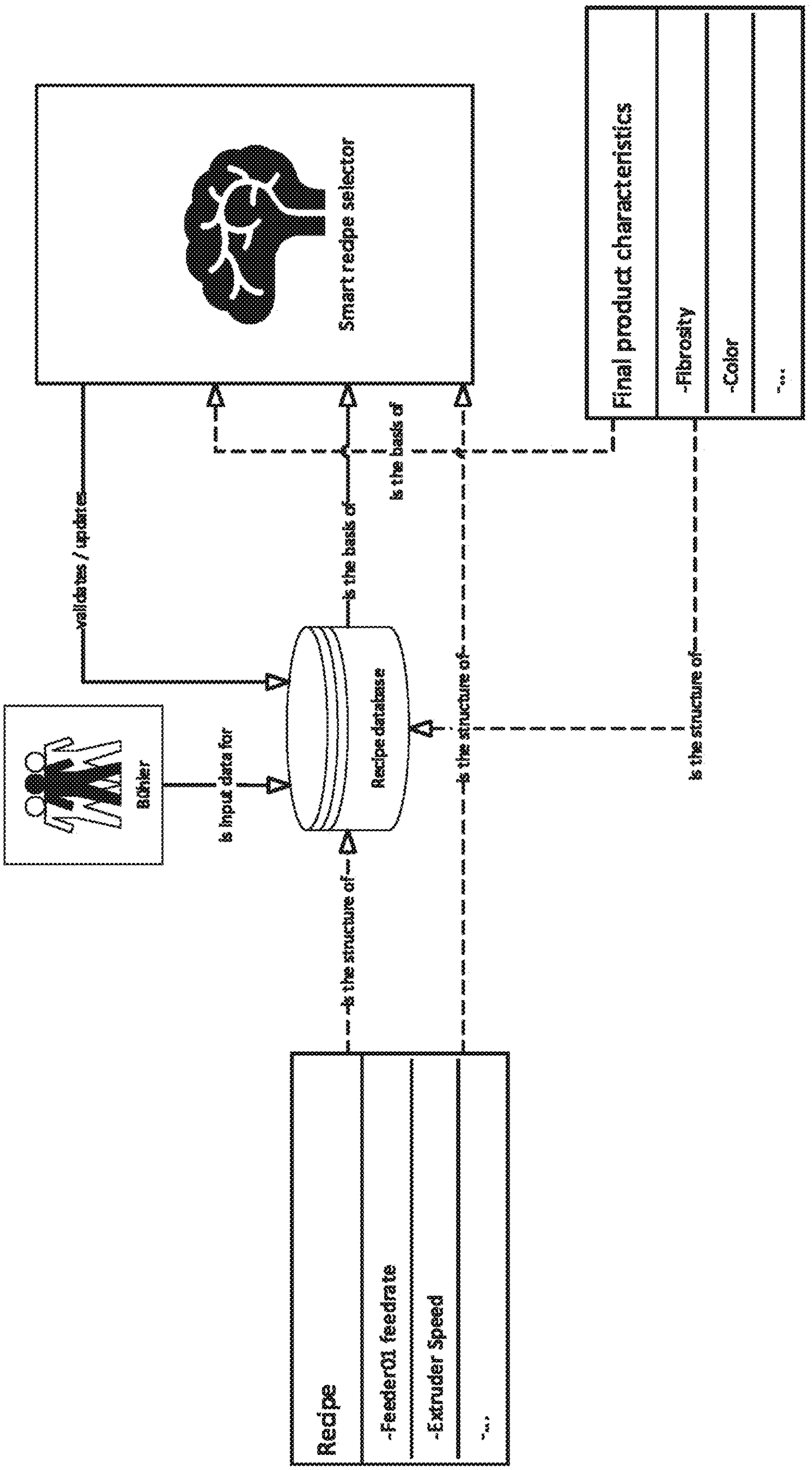
FIG. 30 shows a diagram illustrating schematically an exemplary RDB, where RDB is a database maintained by the inventive system that can be used by the Operator to search/download new recipes. The database acts as storage for the automatic recipe selection, which validates and updates the recipe data by inserting insights of process runs that were recorded. It is based on ingredients characteristics such as color, fibrosity etc. and maps to achievable final product characteristics.
Figure 31:
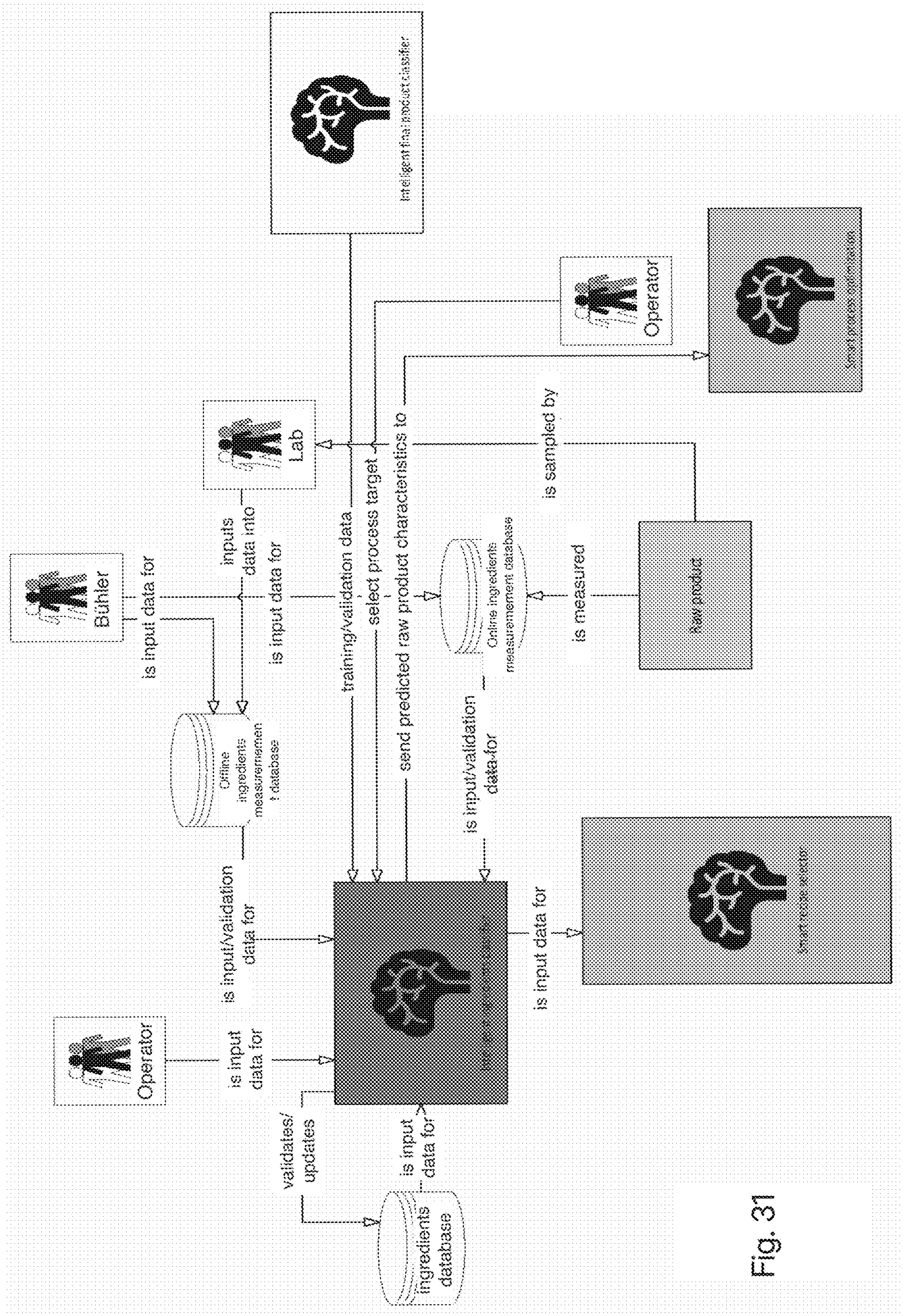
FIG. 31 shows a diagram illustrating schematically an exemplary IRPC system yielding data on raw materials used for the extrusion process. Its target is to act as the following: (a) an input data for the automatic recipe selection by mapping types of raw ingredients based on possible achievable product characteristics to the wished product of the customer/operator. It acts as an advisor: The customer/operator can either choose a specific recipe and the IIC will return whether with the given ingredient, the wished final product is feasible, or itself give a proposal on which ingredients should be used for the final product to receive the best results, and (b) An input for the smart process optimization system through predicted/anticipated raw product data.
Figure 32:
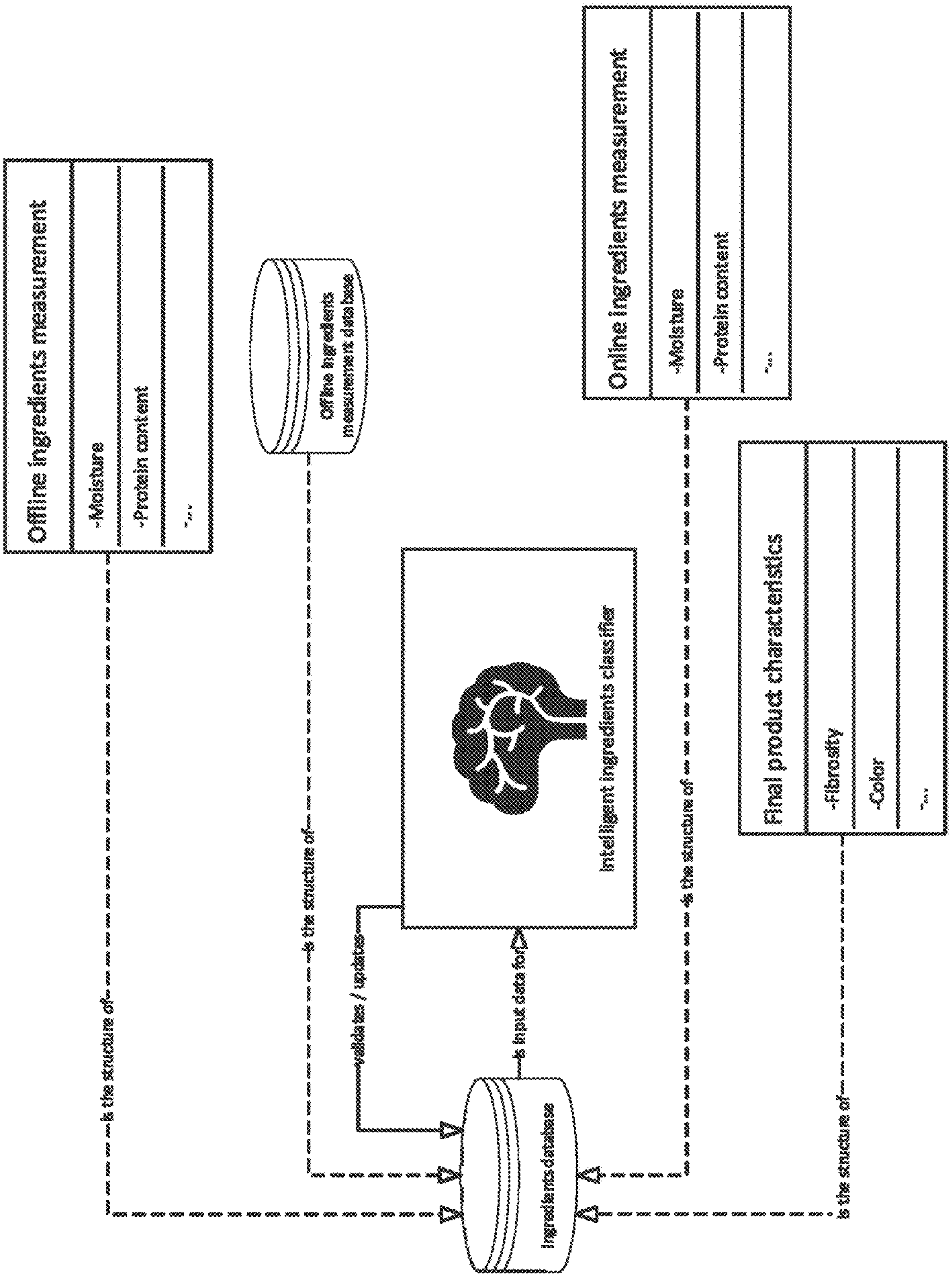
FIG. 32 shows a diagram illustrating schematically an exemplary ingredients database of the inventive system, contains entries to raw product characteristics such as moisture, protein content etc.; process target information such as $CO_2$ relevance etc. that can be opposed by measured outcomes of the final product classification that uses product characteristics as classification.
Figure 33:
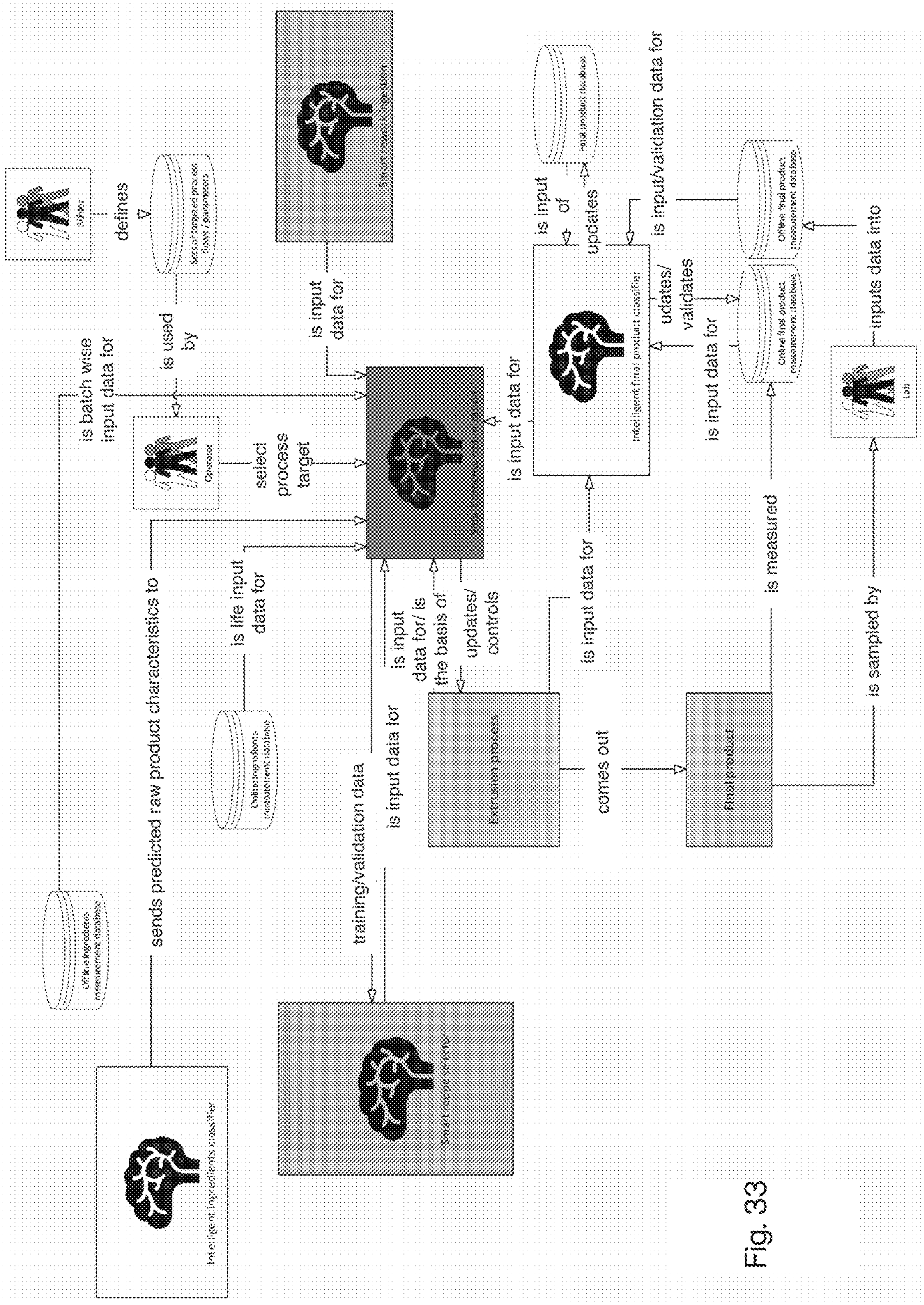
FIG. 33 shows a diagram illustrating schematically an exemplary smart process optimization which is the act of adjusting parameters of the extrusion process during production based on given targets, where targets are process targets (PT) as well as product targets (given by the recipe). The optimization process has to fulfill or exceed the targets given by the operator. The process optimizer is restricted in his optimization by deviation of product target, where the target is either a machine recipe or product characteristics. Process targets (PT) come in form of pre-engineered chains of commands.
Figure 34:
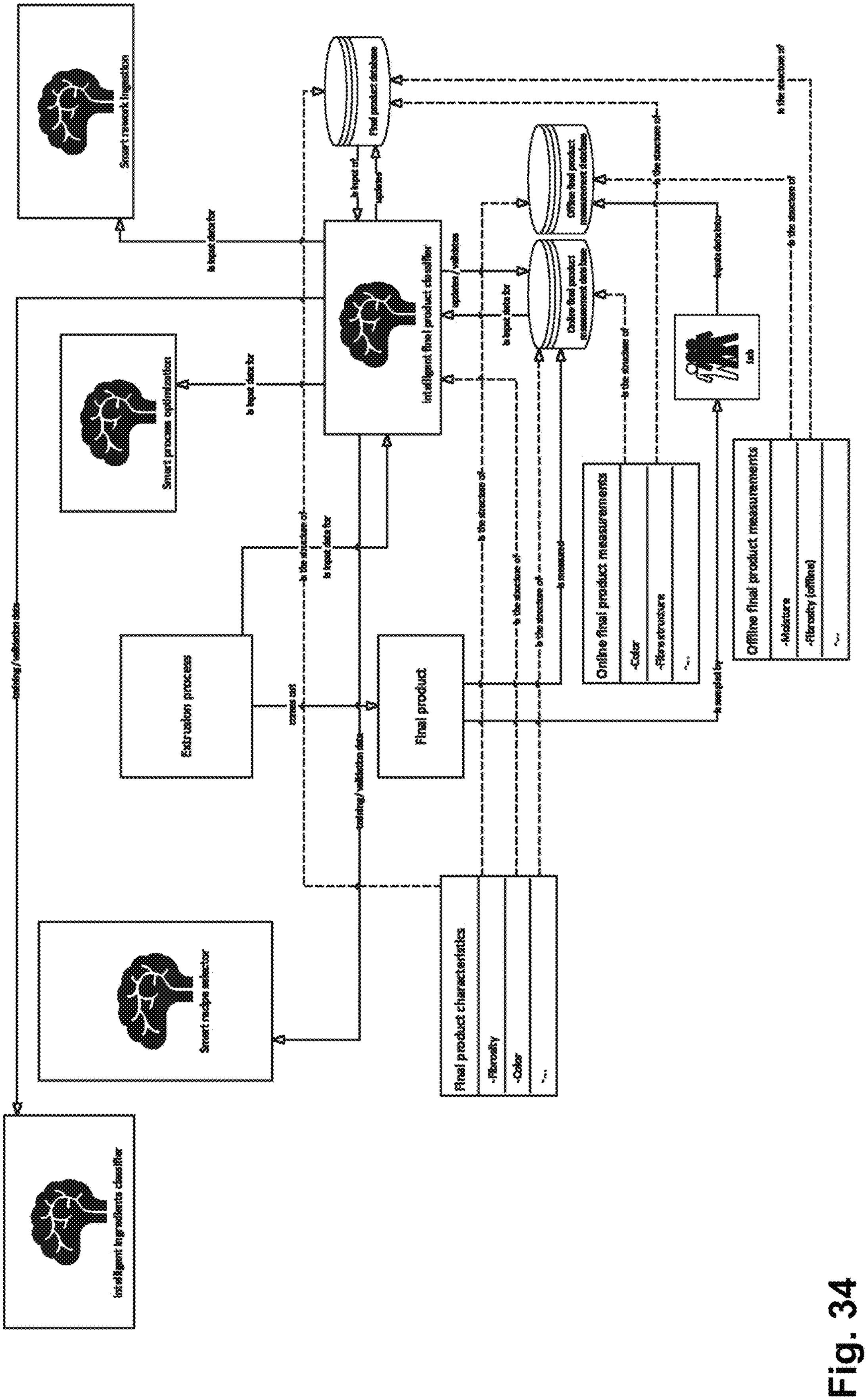
FIG. 34 shows a diagram illustrating schematically an exemplary intelligent final product classifier which can e.g. use sensorics' information retrieved from the final product out of the extruder to map the product to final product characteristics. As information sources, the final product classifier can e.g. use data from the process itself (Temperatures, Pressures, SME etc.), as well as online final product measurements. To verify its measurements and to train the system, offline final product measurements can e.g. be used.
Figure 35:
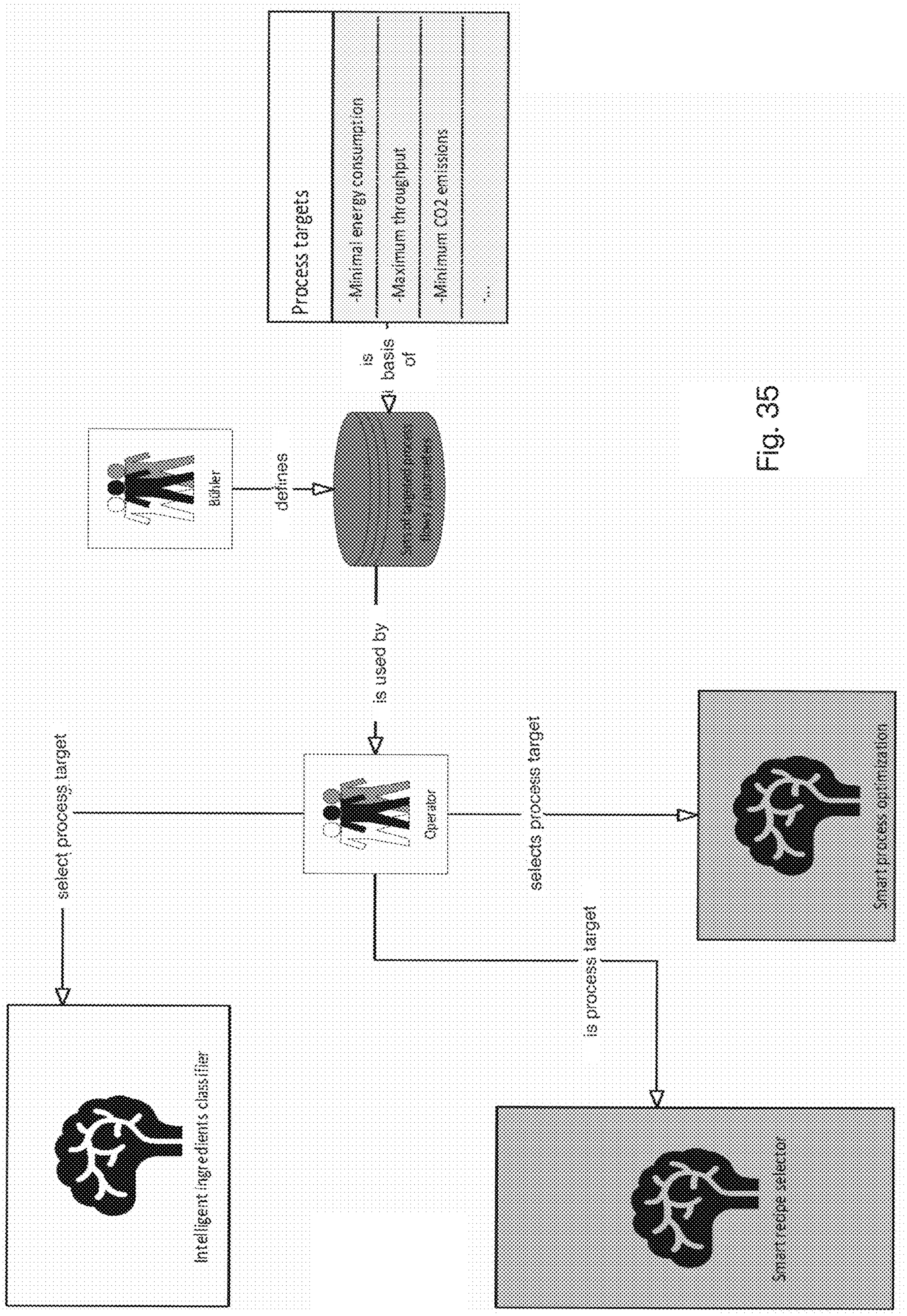
FIG. 35 shows a diagram illustrating schematically exemplary process targets. Process targets are sets of process commands that affect how the process is run. Possible process targets are (i) minimizing energy consumption of the process, (ii) maximizing the throughput of the process, and (iii) minimizing $CO_2$ emissions.
Figure 36:
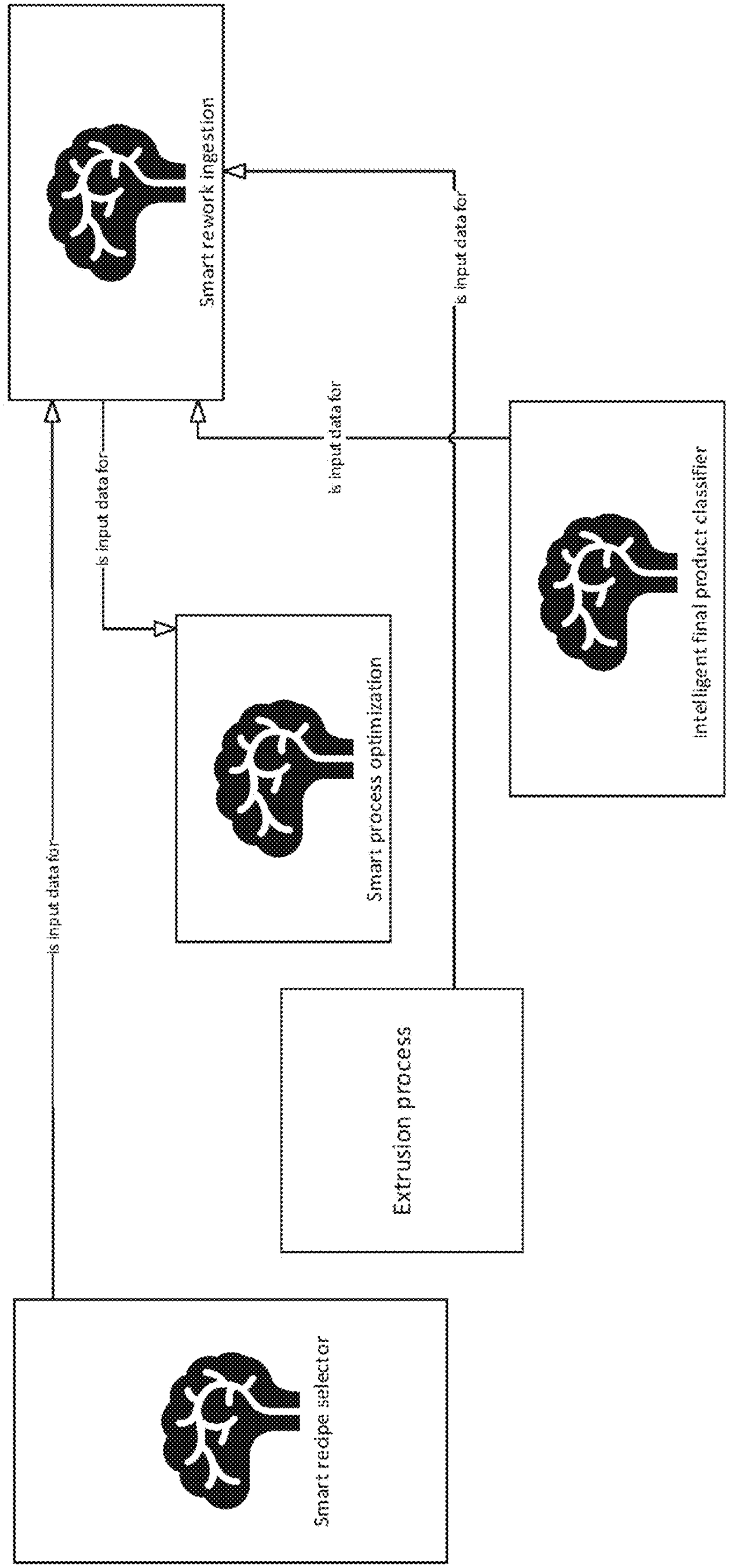
FIG. 36 shows a diagram illustrating schematically an exemplary automated rework process. Smart rework ingestion is the process of using non-usable product coming out of the extrusion process again by feeding the product back into the process, where the amount of product to be reused can be varied. This service gathers its input data from the following sources: The extrusion process itself, as well as the final product classification, that yields information on the products state.
Figure 37:
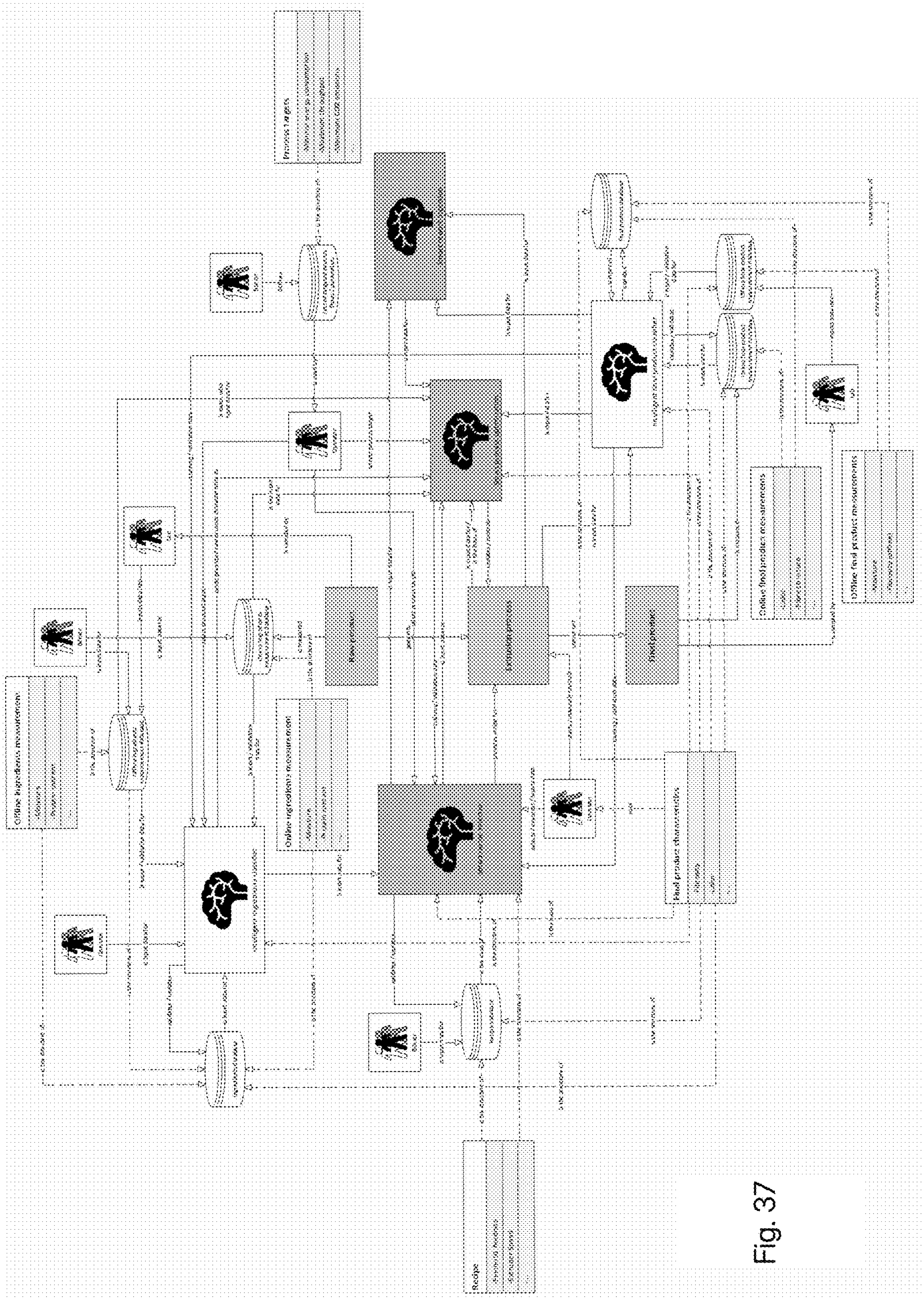
FIG. 37 shows a diagram illustrating schematically an exemplary full overview with structures required for the inventive automated recipe management and optimization.
Figure 38:
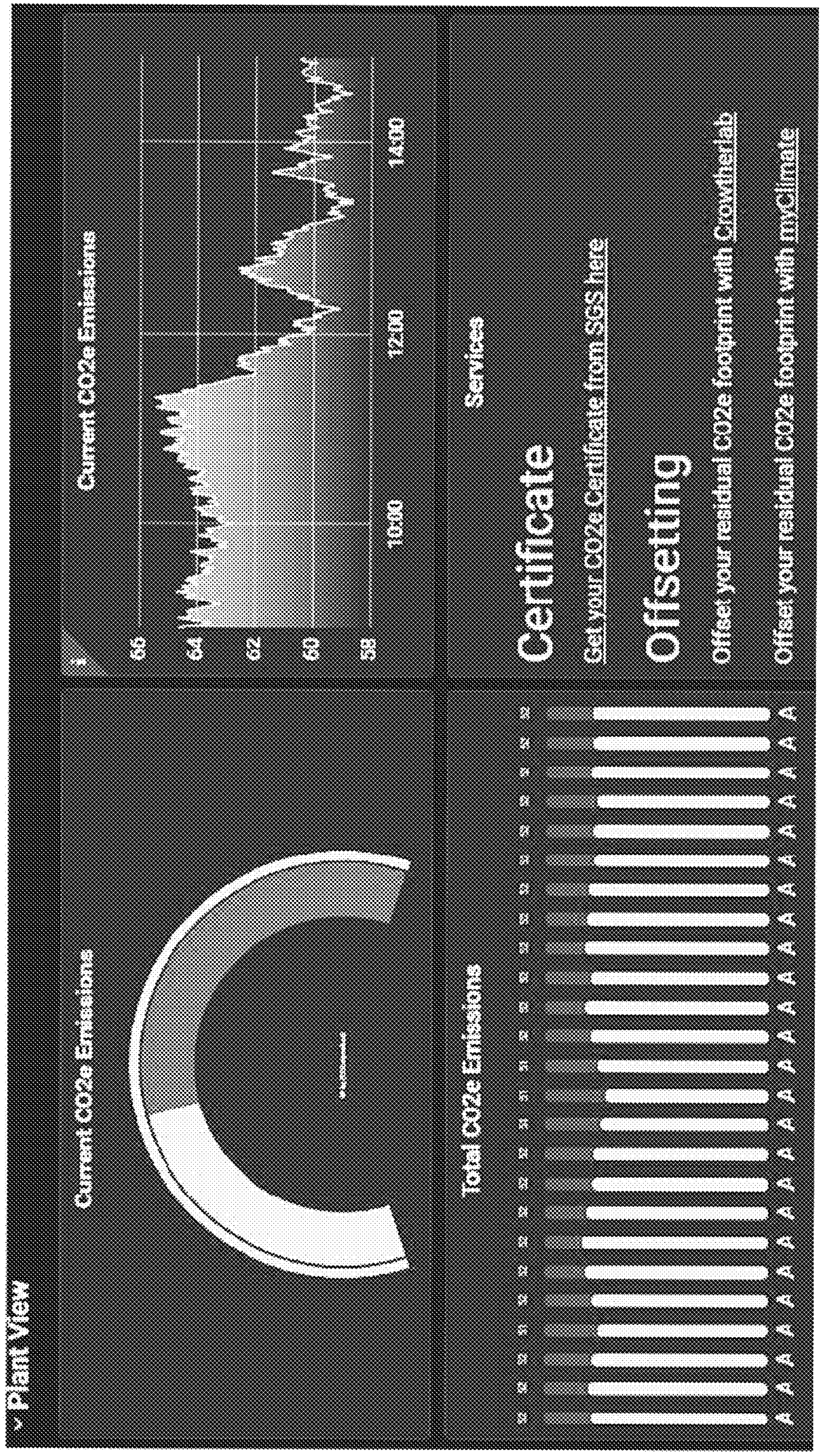
FIG. 38 shows a diagram illustrating schematically an exemplary $CO_2$e monitoring dashboard according to an embodiment variant of the inventive system.
Figure 39:
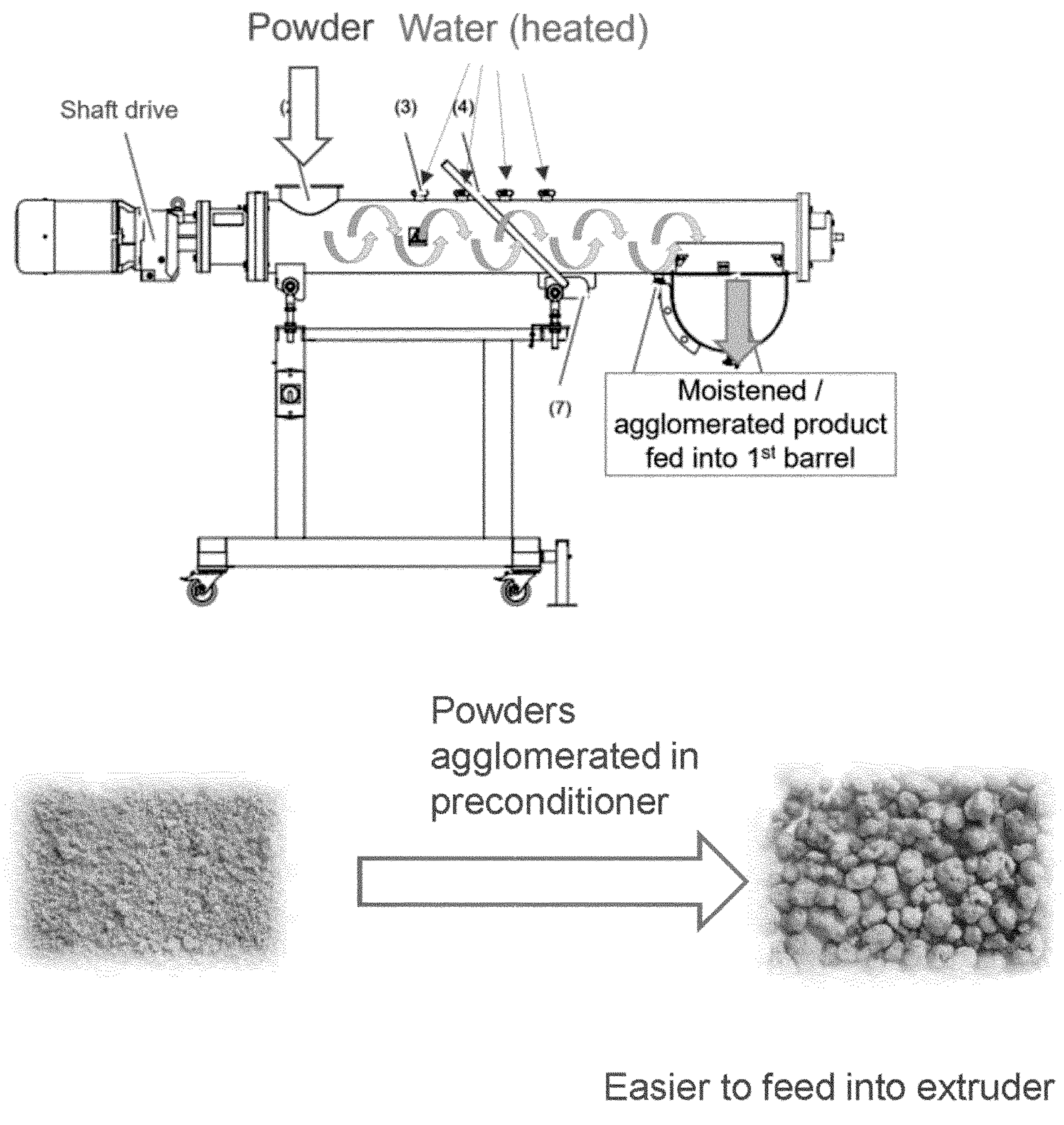
FIG. 39 shows a diagram illustrating schematically an exemplary pre-conditioning process of an exemplary extrusion process.
Figure 40:
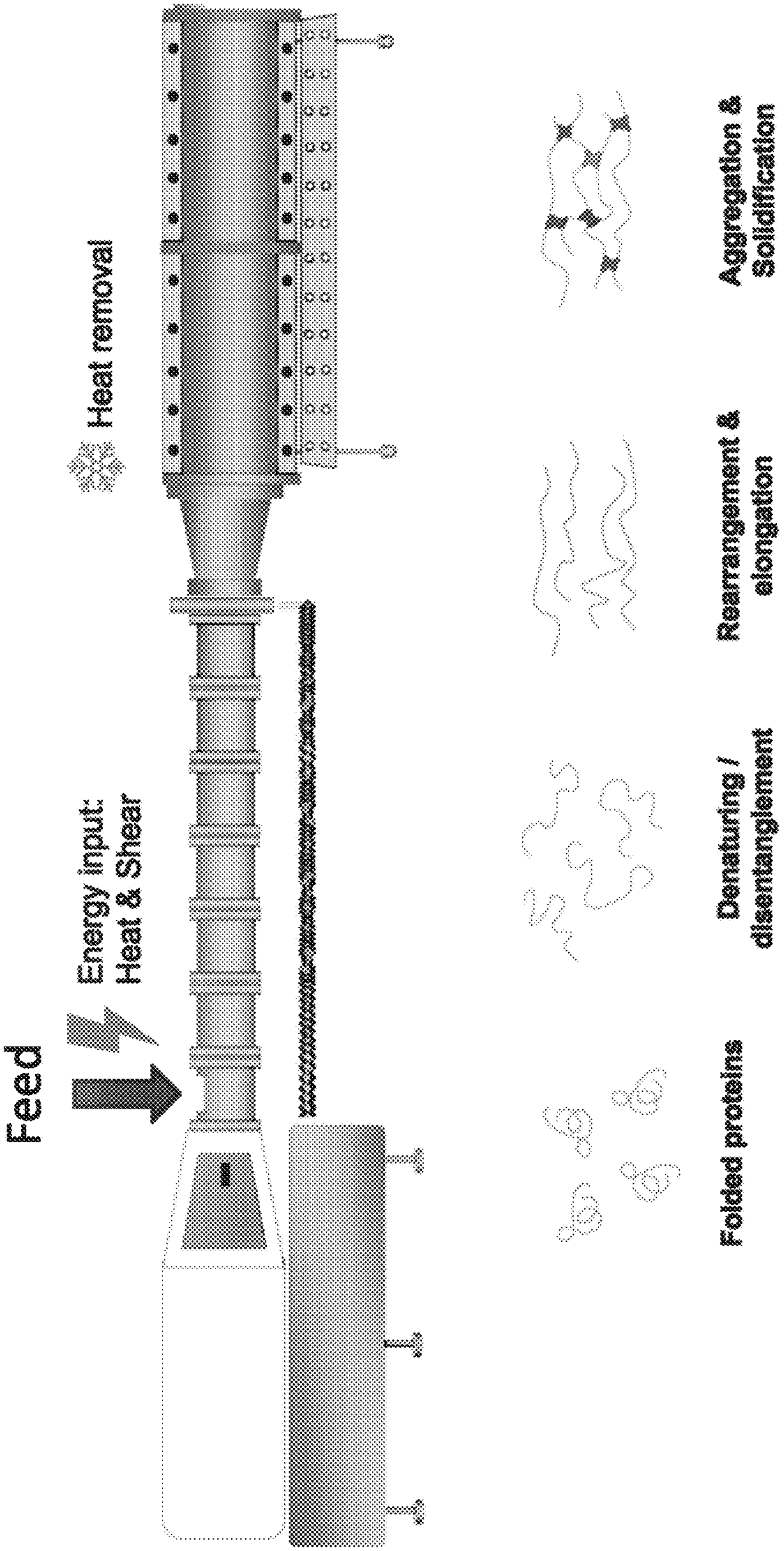
FIG. 40 shows a diagram illustrating schematically an exemplary extrusion process of an exemplary extrusion process. Pre-conditioning (see FIG. 39) and extrusion (see FIG. 31) form the basics of the whole extrusion process.

A diversion flap is installed at the exist of the cooling die and the product which is produced in the time periods where CCP criteria is not reached will go to the waste bin Verification of Machine Cleanliness Optical sensors are installed in preconditioner (cf. FIG. 30), extruder (cf. FIG. 31), cooling die, conveyor, and cutter. After the cleaning, optical sensors are used to assess the cleanliness (by detecting residues and microorganism contamination etc.), An alarm system is set up to give warnings when the cleanliness does not meet the criteria and the corrective actions are needed. For the wet cleaning, visual check is normally not enough. A microbiological test should be conducted. An ATP test can be recommendable (rapid test: 5 min). A tick box is created in the dashboard, where the operator has to tick if a microbiological test has been carried out or not. Alternatively, the machine cleanliness can be determined by an indirect approach (e.g. microbiological test on the downstream product)

Safety Check Before Starting the Extrusion Process

Before starting the extrusion process, the control system will execute a self-check procedure:

Checking the cleaning history (e.g. when was the last cleaning)

Checking the microbiological test (e.g. when was the last test)

Optical cleanliness check

Based on the feedback from the above-mentioned checks, the control system will decide if the extrusion process can be started, or further cleaning/test is required.

VI. Sustainability $CO_2$ equivalent ($CO_2$e) is the standard unit for measuring carbon footprints and it is used as a common metric due to the fact that it takes all greenhouse gases into account and is readily available. It simplifies the problem of climate change and highlights carbon hotspots for targeted actions. Furthermore, it aligns to the ISO standards.

Ingredient Database for Consulting Service

For all relevant ingredients, their potential suppliers and associated product specification, cost and $CO_2$e emission factor etc. are documented in the ingredient database.

Based on the specific requirements of customers, suitable ingredient suppliers could be suggested.

A summary of $CO_2$e emission can be generated based on the selected ingredients, suppliers, and transportation etc.

A comparison of $CO_2$e emission of different ingredients, suppliers and transportation can be generated.

$CO_2$e Monitoring of Process

When the system is connected to an expert insights system, the information on the ingredients, throughput, and energy consumption will be obtained, which can be used for the $CO_2$e emission quantification of the whole process.

Figure 29:
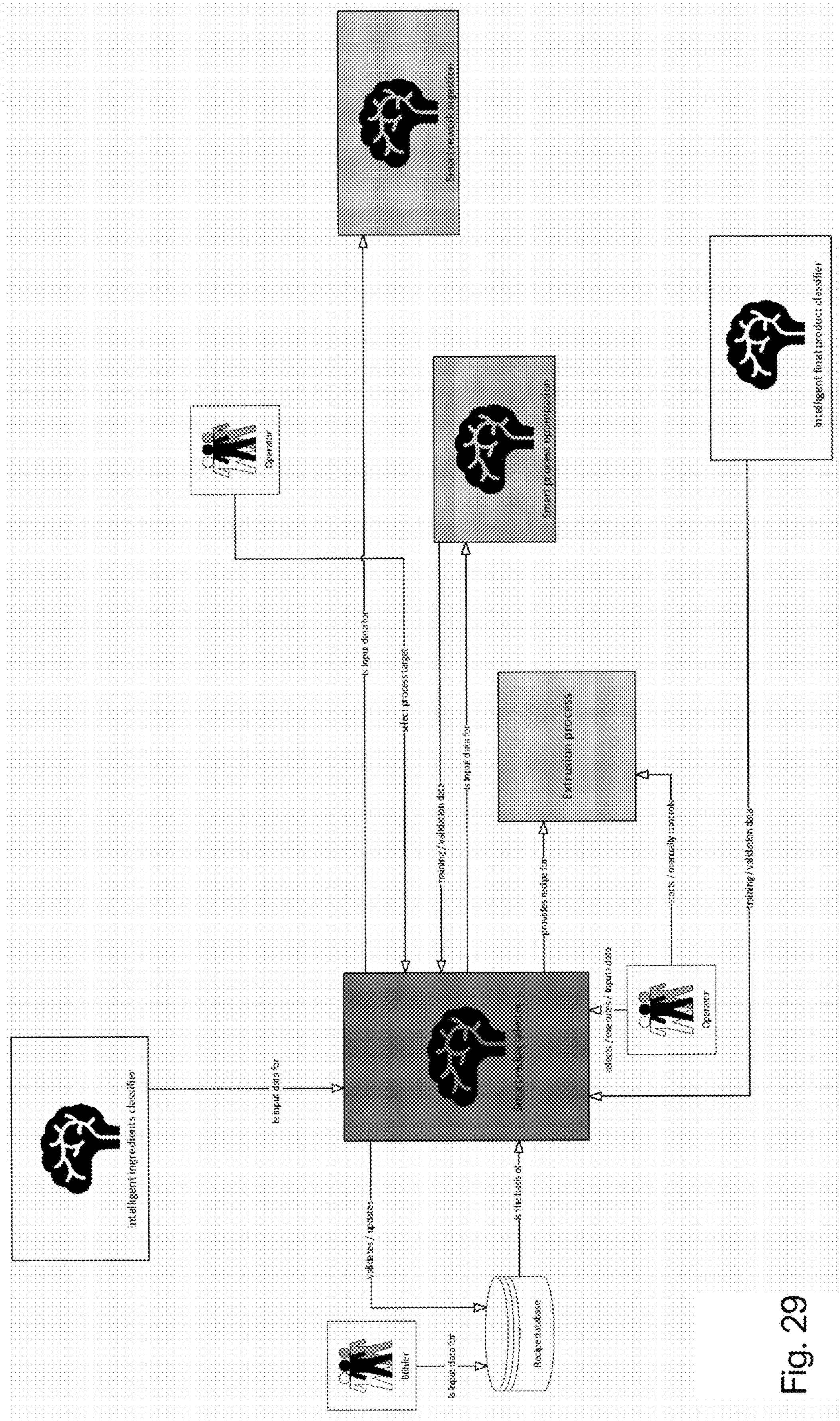
FIG. 29 shows a diagram illustrating schematically an exemplary smart recipe selection, where smart recipe selection is the process of selecting a fitting recipe out of a set of predefined recipes based upon given descriptors of a product. The descriptor is defined as set of different characteristics of a product. Example characteristics would be color, fibrosity etc. Such sets would be nameable (in the context of high moisture extrusion) like “Chicken” or “Fish” etc.

Following digital monitoring and expert services can be provided, e.g. using, inter alia, an appropriate $CO_2$e monitoring dashboard (see FIG. 29):

Real-time $CO_2$e emissions of the whole process

Breakdown of $CO_2$e emission of each processing step (the carbon hot spot can be identified)

$CO_2$e certification from SGS

Track sustainability performance over time

The expert insights system can be realized as a central platform intended for connected products and services, optimizing plant's efficiency, and reducing maintenance times, energy consumption and wastage. Turning machinery into connected devices allows the free flow of data from sensors, machines, and control units to a single secure storage location. Connecting plants to the central platform forming a gateway and harnessing the benefits of digitalization. The central platform allows to bring transparency into processes and machine data—e.g. equipped with individual dashboards displaying most important KPIs. Such a transparency enables to provide or initiate or electronically signal concrete actions to increase performance and optimize processes. Thus, connected devices, operational metrics and analytics help optimize efficiency at a plant. Choose from a wide range of digital services to improve productivity, enhance product quality, and reduce wastage and energy consumption. With access via a tablet or smartphone, as embodiment variant, this allows even to control plant on the move.

REFERENCE LIST

1 extruder system
2 decentralized extruder networked system
101 feeder
102 extruder
103 shaping opening
104 collection mean
105 operational unit
111 sensor
120 Screw
121 Barrel
122 conditioning unit
123 motor
200 input parameter
201 operational setting parameter
202 material characteristics parameter
203 environmental measuring parameter
204 target material characteristics parameters
206 predefined target parameter values
207 sensory parameter
208 operational setting parameters
209 environmental measuring parameter
211 initial operational setting parameters
212 digital recipes
213 Output material
300 extrudate
301 input material
302 Output material
303 Ingredient
401 operational setting
500 extruder control
501 programable logic
502 digital controller
503 repository storage unit
504 digital database
505 data transmission network
506 network interface
507 data records
511 operational data storage
512 nonlinear processing units
512 central repository
513 central digital database
514 central digital controller
515 operational units
515 central data records

601 input layer
602 hidden layer
603 output layer
610 machine learning unit
611 deep Learning (DL) structure
612 convolutional layer
613 pooling layer

The invention claimed is:

1. An extruder system, comprising:

a feeder, an extruder, a shaping opening, a collector, and an extruder control, the feeder feeding plastically deformable and/or viscous input material to the extruder, the extruder continuously pressing the input material to and out of the shaping opening forming an output material as extrudate, wherein the collector collects the extrudate for further processing, the extrusion process is controllably steered during operation by the extruder control, the extruder control comprises programmable logic to set and adapt operational setting parameter values of operational units of the feeder, the extruder, the shaping opening, and the collector, the extruder control further comprises a digital controller to signal and steer the programmable logic, for steering the programmable logic, the digital controller captures input parameter values at least comprising process parameter values and/or operational setting parameter values and/or material characteristics parameters values and/or environmental measuring parameter values, the input parameter values comprise sensory parameter values measured by sensors with the feeder and/or the extruder and/or the shaping opening and/or the collector, the extruder control includes a repository storage with an adaptive, digital database holding a plurality of selectable, structured data records for storing digital recipes, each of the selectable data record at least comprising material characteristics parameters of the input material and target material characteristics parameters of the extrudate and initial operational setting parameters giving an initial setting of operational setting parameters for the operational of the extruder system, the input parameter values further include parameter values of a selected data record, the digital controller includes a machine learner to monitor and classify value patterns of the input parameter values and adapting the operational setting parameter values of operational units of the feeder and/or the extruder and/or the shaping opening and/or the collector to align measured material characteristics parameters values of the extrudate within the predefined tolerance ranges, wherein the machine learner at least comprises at least a Deep Learning (DL) structure comprising a plurality of Neural Network (NN) structures to provide output parameter values based on the input parameter values indicating parameter values adaptions required to align the measured material characteristics parameters values of the extrudate within the predefined tolerance ranges, and the machine-learning based Deep Learning (DL) structure at least comprise a cascade of multiple layers of nonlinear processors for feature extraction and signal transformation, each successive layer of the multiple layers using the output of a previous layer as an input providing supervised learning at least for classification and unsupervised learning at least for pattern recognition, and the extruder system includes digital signaling to steer the programmable logic and associated operational units via the digital controller to controllably and steered extrude an extrudate having material characteristics parameters values within a predefined tolerance range of predefined target parameter values, the extrusion process is autonomously adapted by the machine learner by automatically adapting the operational setting parameter values of operational units of the feeder and/or the extruder and/or the shaping opening and/or the collector to align measured material characteristics parameters values of the extrudate within the predefined tolerance ranges by time-based monitoring of the input measuring parameter values.

2. The extruder system according to claim 1, wherein the adaptive, digital database is a digital library, the repository storage includes a network interface to provide access via a data transmission network to the structured data records for selection and/or adaption and/or generation of the structured data records.

3. The extruder system according to claim 1, wherein failures during the extrusion process are automatically detected by the machine learner based on the measured and monitored input parameter values, wherein an alert signaling and/or steering signaling is generated upon detection of a predicted failure within the extrusion process.

4. The extruder system according to claim 1, wherein the DL structure at least comprises a Convolutional Neural Network (CNN) structure as deep neural network.

5. The extruder system according to claim 4, wherein measured and/or captured input parameter value pattern are classified and selected by convolutional layers and pooling layers of the CNN structure, the pooling layers reducing a dimension of a feature map of the measured and/or captured input parameter value pattern and reducing processing complexity within the machine learner to adapt the operational setting parameter values of operational units.

6. The extruder system according to claim 1, wherein the repository storage further comprises an operational data storage to store historical operation data, historical operation data comprising historical input parameter values, historical material characteristics parameter values and predefined target parameter values, the machine learner being trained by applying historical operation data.

7. The extruder system according to claim 1, wherein the material characteristic parameters include texture and/or density and/or color and/or anisotropy and/or chemical composition and/or thickness and/or degree of polymerization and/or moisture content and/or protein content and/or starch content and/or fiber content and/or particle size and/or surface structure and/or tolerance range.

8. The extruder system according to claim 1, wherein the operational setting parameter comprises a screw speed of a screw of the extruder pressing the input material and/or addition rate by the feeder of at least one ingredient for composing the input material and/or conditioning setting of a conditioner of the extruder for cooling or heating the input material in the extruder and/or conditioner of the shaping opening and/or positioning size for the shaping opening area.

9. The extruder system according to claim 1, wherein the target parameters comprise at least one of the material characteristic parameters, and/or process parameters at least comprising energy consumption of the extruder system.

10. The extruder system according to claim 1, wherein material parameter values of the input material and/or an ingredient of the input material are automatically determined by the machine learner adapting a dosing process of the feeder by adapting operational setting parameters of the feeder.

11. A decentralized extruder networked system comprising:

two or more extruder systems according to claim 1 and a central digital controller comprising a central repository having at least one adaptive central digital database containing structured data sets for storing digital recipes and/or ingredients and/or products, wherein at least one of the digital controller of the plurality of extruder systems is to be given read and/or write access to the structured central data records via the data transmission network for selecting and/or adapting and/or generating the structured central data records, and the central data records generated by an extruder system have at least one data classification parameter charactering this generating extruder system or factors influencing the generating extruder system.

12. The decentralized extruder networked system according to claim 11, wherein the data classification parameter comprises the country of operation of the generating extruder system and/or the operator of the generating extruder system and/or the generating extruder system identification and/or the extruder type, in order to classify the centrally stored data records in the at least one central database with data classification parameter.

* * * * *